(12) United States Patent
Yu et al.

(10) Patent No.: US 8,374,156 B2
(45) Date of Patent: Feb. 12, 2013

(54) CAPACITY INCREASING DEVICES AND METHODS FOR WIRELESS COMMUNICATION

(75) Inventors: Zhi-Zhong Yu, Reading (GB); Mukund Agarwal, Farnborough (GB); Mungal Singh Dhanda, Slough (GB); Simon Walke, Basingstoke (GB)

(73) Assignee: Qualcomm Incorporated, San Diego, CA (US)

( * ) Notice: Subject to any disclaimer, the term of this patent is extended or adjusted under 35 U.S.C. 154(b) by 86 days.

(21) Appl. No.: 12/704,337

(22) Filed: Aug. 20, 2010

(65) Prior Publication Data

US 2011/0077017 A1   Mar. 31, 2011

Related U.S. Application Data

(63) Continuation of application No. PCT/US2008/076312, filed on Sep. 12, 2008.

(60) Provisional application No. 61/090,544, filed on Aug. 20, 2008, provisional application No. 60/989,104, filed on Nov. 19, 2007, provisional application No. 60/974,422, filed on Sep. 21, 2007, provisional application No. 60/971,851, filed on Sep. 12, 2007.

(30) Foreign Application Priority Data

Apr. 8, 2008  (GB) .................................. 0806385.1

(51) Int. Cl.
*H04L 12/56* (2006.01)
*H04J 1/16* (2006.01)

(52) U.S. Cl. ........ 370/337; 370/252; 370/329; 370/442; 370/478

(58) Field of Classification Search .................. 370/252, 370/329, 442, 337, 478
See application file for complete search history.

(56) References Cited

U.S. PATENT DOCUMENTS

| | | | | |
|---|---|---|---|---|
| 6,154,661 A | * | 11/2000 | Goldburg | .................. 455/562.1 |
| 6,868,277 B1 | * | 3/2005 | Cerwall et al. | ................. 455/509 |
| 2007/0037541 A1 | | 2/2007 | Wu et al. | |
| 2008/0181170 A1 | * | 7/2008 | Branlund et al. | ............. 370/328 |
| 2010/0067440 A1 | * | 3/2010 | Dick et al. | .................... 370/328 |

FOREIGN PATENT DOCUMENTS

| | | |
|---|---|---|
| EP | 1720265 A1 | 11/2006 |
| JP | 2002500467 A | 1/2002 |
| JP | 2002232396 A | 8/2002 |
| JP | 2003174431 A | 6/2003 |
| KR | 20000002214 A | 1/2000 |
| KR | 100265020 B1 | 9/2000 |
| KR | 1020030044072 | 6/2003 |
| KR | 20050053714 A | 6/2005 |

(Continued)

OTHER PUBLICATIONS

European Search Report—EP10160741—Search Authority—Munich—Jun. 16, 2010.

(Continued)

*Primary Examiner* — John Pezzlo
(74) *Attorney, Agent, or Firm* — Qualcomm Patent Group; Larry Moskowitz; James H. Yancey, Jr.

(57) ABSTRACT

The present patent application improves DARP by allowing multiple users on one time slot (MUROS). It comprises means and instructions for sharing signals on a single channel, comprising setting up a new connection, allocating a new time slot if there is an unused time slot on a channel frequency, selecting an used time slot for the new connection to share with an existing connection if there is not an unused time slot on the channel frequency, and selecting a different training sequence code for the new connection if the used time slot on the channel frequency has been selected for the new connection to share with an existing connection.

155 Claims, 38 Drawing Sheets

FOREIGN PATENT DOCUMENTS

RU          2150789 C1      6/2000
WO          WO9627250       9/1996

OTHER PUBLICATIONS

European Search Report—EP10160762—Search Authority—Munich—Jun. 16, 2010.
European Search Report—EP10161078, Search Authority—Munich Patent Office, Oct. 8, 2010.
European Search Report—EP10161085—Search Authority—Munich—Jun. 16, 2010.
The International Search Report and the Written Opinion of the International Searching Authority mailed on Jun. 15, 2009 for PCT/US2008/076312.
Ericsson, "Single antenna interference cancellation A capacity estimation in unsynchronised networks" 3GPP draft; GP-031202, 3rd Generation Partnership Project (3GPP), Mobile Competence Centre; 650, Route Des Lucioles; F-06921 Sophia-Aritipolis Cedex, France, Jun. 19, 2003.
Digital cellular telecommunications system (Phase 2+); Feasibility study on Single Antenna Interference Cancellation (SAIC) for GSM networks (3GPP) TR 45.903 version 6.0.1 Release 6); ETSI TR 145 903, ETSI Standards, LIS, Sophia Antipolis Cedex, France, vol. 3-G1, No. V6.0.1, Nov. 1, 2004.
Geran, "Introduction of Downlink Advanced Receiver Performance—phase II capability," 3GPP Draft; c1-070601, 3rd Generation Partnership Project (3GPP), 650, Route Des Luclotes; F-06921 Sophia-Antipolis Cedex, France, Feb. 9, 2007.
Rohde & Schwarz, "269.7 and 26.9.8—Support for Transmission of Access Bursts on the SACCH," 3GPP Draft; GP-061375, 3rd Generation Partnership Project (3GPP), 650, Route Des Lucioles; F-06921 Sophia-Antipolis Cedex, France, vol. TSG Geran, no. Lisbon; Jun. 28, 2006.
Nokia, "Header Removal in Geran," 3GPP Draft; GP-010064, 3rd Generation Partnership Project (3GPP), 650, Route Des Lucieles; F-06021 Sophia-Antipolis Cedex, France, vol. SA WG2, no. Gothenburg, Feb. 9, 2001.
Japanese Translation of First Office Action mailed Sep. 25, 2012, pp. five pages.

* cited by examiner

| 9.67 | 9.53 | 9.44 | 9.42 | 9.43 | 9.83 | 9.63 | 10.12 |
|---|---|---|---|---|---|---|---|
| 12.01 | 12.12 | 12.06 | 12.06 | 12.03 | 12.39 | 11.93 | 12.49 |
| 10.9 | 11.4 | 11.58 | 10.6 | 11.22 | 11.68 | 10.76 | 11.16 |
| 12.69 | 13.32 | 13.62 | 12.59 | 13.26 | 13.8 | 13.17 | 13.15 |

CAPACITY INCREASING DEVICES AND METHODS FOR WIRELESS COMMUNICATION

FIELD OF THE INVENTION

The invention relates generally to the field of radio communications and in particular to the increasing of channel capacity in a radio communications system.

BACKGROUND

More and more people are using mobile communication devices, such as, for example, mobile phones, not only for voice but also for data communications. In the GSM/EDGE Radio Access Network (GERAN) specification, GPRS and EGPRS provide data services. The standards for GERAN are maintained by the 3GPP (Third Generation Partnership Project). GERAN is a part of Global System for Mobile Communications (GSM). More specifically, GERAN is the radio part of GSM/EDGE together with the network that joins the base stations (the Ater and Abis interfaces) and the base station controllers (A interfaces, etc.). GERAN represents the core of a GSM network. It routes phone calls and packet data from and to the PSTN and Internet and to and from remote stations, including mobile stations. UMTS (Universal Mobile Telecommunications System) standards have been adopted in GSM systems, for third-generation communication systems employing larger bandwidths and higher data rates. GERAN is also a part of combined UMTS/GSM networks.

The following issues are present in today's networks. First, more traffic channels are needed which is a capacity issue. Since there is a higher demand of data throughput on the downlink (DL) than on the uplink (UL), the DL and UL usages are not symmetrical. For example a mobile station (MS) doing FTP transfer is likely to be given 4D1U, which could mean that it takes four users resources for full rate, and eight users resources for half rate. As it stands at the moment, the network has to make a decision whether to provide service to 4 or 8 callers on voice or 1 data call. More resources will be necessary to enable DTM (dual transfer mode) where both data calls and voice calls are made at the same time.

Second, if a network serves a data call while many new users also want voice calls, the new users will not get service unless both UL and DL resources are available. Therefore some UL resource could be wasted. On one hand there are customers waiting to make calls and no service can be made; on the other hand the UL is available but wasted due to lack of pairing DL.

Third, there is less time for UEs working in multi-timeslot mode to scan neighbor cells and monitor them, which may cause call drops and performance issues.

FIG. 1 shows a block diagram of a transmitter 118 and a receiver 150 in a wireless communication system. For the downlink, the transmitter 118 may be part of a base station, and receiver 150 may be part of a wireless device (remote station). For the uplink, the transmitter 118 may be part of a wireless device, and receiver 150 may be part of a base station. A base station is generally a fixed station that communicates with the wireless devices and may also be referred to as a Node B, an evolved Node B (eNode B), an access point, etc. A wireless device may be stationary or mobile and may also be referred to as a remote station, a mobile station, a user equipment, a mobile equipment, a terminal, a remote terminal, an access terminal, a station, etc. A wireless device may be a cellular phone, a personal digital assistant (PDA), a wireless modem, a wireless communication device, a handheld device, a subscriber unit, a laptop computer, etc.

At transmitter 118, a transmit (TX) data processor 120 receives and processes (e.g., formats, encodes, and interleaves) data and provides coded data. A modulator 130 performs modulation on the coded data and provides a modulated signal. Modulator 130 may perform Gaussian minimum shift keying (GMSK) for GSM, 8-ary phase shift keying (8-PSK) for Enhanced Data rates for Global Evolution (EDGE), etc. GMSK is a continuous phase modulation protocol whereas 8-PSK is a digital modulation protocol. A transmitter unit (TMTR) 132 conditions (e.g., filters, amplifies, and upconverts) the modulated signal and generates an RF modulated signal, which is transmitted via an antenna 134.

At receiver 150, an antenna 152 receives RF modulated signals from transmitter 110 and other transmitters. Antenna 152 provides a received RF signal to a receiver unit (RCVR) 154. Receiver unit 154 conditions (e.g., filters, amplifies, and downconverts) the received RF signal, digitizes the conditioned signal, and provides samples. A demodulator 160 processes the samples as described below and provides demodulated data. A receive (RX) data processor 170 processes (e.g., deinterleaves and decodes) the demodulated data and provides decoded data. In general, the processing by demodulator 160 and RX data processor 170 is complementary to the processing by modulator 130 and TX data processor 120, respectively, at transmitter 110.

Controllers/processors 140 and 180 direct operation at transmitter 118 and receiver 150, respectively. Memories 142 and 182 store program codes in the form of computer software and data used by transmitter 118 and receiver 150, respectively.

FIG. 2 shows a block diagram of a design of receiver unit 154 and demodulator 160 at receiver 150 in FIG. 1. Within receiver unit 154, a receive chain 440 processes the received RF signal and provides I and Q baseband signals, which are denoted as $I_{bb}$ and $Q_{bb}$. Receive chain 440 may perform low noise amplification, analog filtering, quadrature downconversion, etc. An analog-to-digital converter (ADC) 442 digitalizes the I and Q baseband signals at a sampling rate of $f_{adc}$ and provides I and Q samples, which are denoted as $I_{adc}$ and $Q_{adc}$. In general, the ADC sampling rate $f_{adc}$ may be related to the symbol rate $f_{sym}$ by any integer or non-integer factor.

Within demodulator 160, a pre-processor 420 performs pre-processing on the I and Q samples from ADC 442. For example, pre-processor 420 may remove direct current (DC) offset, remove frequency offset, etc. An input filter 422 filters the samples from pre-processor 420 based on a particular frequency response and provides input I and Q samples, which are denoted as $I_{in}$ and $Q_{in}$. Filter 422 may filter the I and Q samples to suppress images resulting from the sampling by ADC 442 as well as jammers. Filter 422 may also perform sample rate conversion, e.g., from 24× oversampling down to 2× oversampling. A data filter 424 filters the input I and Q samples from input filter 422 based on another frequency response and provides output I and Q samples, which are denoted as $I_{out}$ and $Q_{out}$. Filters 422 and 424 may be implemented with finite impulse response (FIR) filters, infinite impulse response (IIR) filters, or filters of other types. The frequency responses of filters 422 and 424 may be selected to achieve good performance. In one design, the frequency response of filter 422 is fixed, and the frequency response of filter 424 is configurable.

An adjacent channel interference (ACI) detector 430 receives the input I and Q samples from filter 422, detects for ACI in the received RF signal, and provides an ACI indicator to filter 424. The ACI indicator may indicates whether or not ACI is present and, if present, whether the ACI is due to the higher RF channel centered at +200 KHz and/or the lower RF channel centered at −200 KHz. The frequency response of filter 424 may be adjusted based on the ACI indicator, as described below, to achieve good performance.

An equalizer/detector 426 receives the output I and Q samples from filter 424 and performs equalization, matched filtering, detection, and/or other processing on these samples. For example, equalizer/detector 426 may implement a maximum likelihood sequence estimator (MLSE) that determines a sequence of symbols that is most likely to have been transmitted given a sequence of I and Q samples and a channel estimate.

The Global System for Mobile Communications (GSM) is a widespread standard in cellular, wireless communication. GSM employs a combination of Time Division Multiple Access (TDMA) and Frequency Division Multiple Access (FDMA) for the purpose of sharing the spectrum resource. GSM networks typically operate in a number of frequency bands. For example, for uplink communication, GSM-900 commonly uses a radio spectrum in the 890-915 MHz bands (Mobile Station to Base Transceiver Station). For downlink communication, GSM 900 uses 935-960 MHz bands (base station to mobile station). Furthermore, each frequency band is divided into 200 kHz carrier frequencies providing 124 RF channels spaced at 200 kHz. GSM-1900 uses the 1850-1910 MHz bands for the uplink and 1930-1990 MHz bands for the downlink. Like GSM 900, FDMA divides the GSM-1900 spectrum for both uplink and downlink into 200 kHz-wide carrier frequencies. Similarly, GSM-850 uses the 824-849 MHz bands for the uplink and 869-894 MHz bands for the downlink, while GSM-1800 uses the 1710-1785 MHz bands for the uplink and 1805-1880 MHz bands for the downlink.

Each channel in GSM is identified by a specific absolute radio frequency channel identified by an Absolute Radio Frequency Channel Number or ARFCN. For example, ARFCN 1-124 are assigned to the channels of GSM 900, while ARFCN 512-810 are assigned to the channels of GSM 1900. Similarly, ARFCN 128-251 are assigned to the channels of GSM 850, while ARFCN 512-885 are assigned to the channels of GSM 1800. Also, each base station is assigned one or more carrier frequencies. Each carrier frequency is divided into eight time slots (which are labeled as time slots 0 through 7) using TDMA such that eight consecutive time slots form one TDMA frame with a duration of 4.615 ms. A physical channel occupies one time slot within a TDMA frame. Each active wireless device/user is assigned one or more time slot indices for the duration of a call. User-specific data for each wireless device is sent in the time slot(s) assigned to that wireless device and in TDMA frames used for the traffic channels.

Each time slot within a frame is used for transmitting a "burst" of data in GSM. Sometimes the terms time slot and burst may be used interchangeably. Each burst includes two tail fields, two data fields, a training sequence (or midamble) field, and a guard period (GP). The number of symbols in each field is shown inside the parentheses. A burst includes 148 symbols for the tail, data, and midamble fields. No symbols are sent in the guard period. TDMA frames of a particular carrier frequency are numbered and formed in groups of 26 or 51 TDMA frames called multi-frames.

FIG. 3 shows example frame and burst formats in GSM. The timeline for transmission is divided into multiframes. For traffic channels used to send user-specific data, each multiframe in this example includes 26 TDMA frames, which are labeled as TDMA frames 0 through 25. The traffic channels are sent in TDMA frames 0 through 11 and TDMA frames 13 through 24 of each multiframe. A control channel is sent in TDMA frame 12. No data is sent in idle TDMA frame 25, which is used by the wireless devices to make measurements for neighbor base stations.

FIG. 4 shows an example spectrum in a GSM system. In this example, five RF modulated signals are transmitted on five RF channels that are spaced apart by 200 KHz. The RF channel of interest is shown with a center frequency of 0 Hz. The two adjacent RF channels have center frequencies that are +200 KHz and −200 KHz from the center frequency of the desired RF channel. The next two nearest RF channels (which are referred to as blockers or non-adjacent RF channels) have center frequencies that are +400 KHz and −400 KHz from the center frequency of the desired RF channel. There may be other RF channels in the spectrum, which are not shown in FIG. 3 for simplicity. In GSM, an RF modulated signal is generated with a symbol rate of $f_{sym}$=13000/40=270.8 kilo symbols/second (Ksps) and has a −3 dB bandwidth of up to ±135 KHz. The RF modulated signals on adjacent RF channels may thus overlap one another at the edges, as shown in FIG. 4.

One or more modulation schemes are used in GSM to communicate information such as voice, data, and/or control information. Examples of the modulation schemes may include GMSK (Gaussian Minimum Shift Keying), M-ary QAM (Quadrature Amplitude Modulation) or M-ary PSK (Phase Shift Keying), where M=$2^n$, with n being the number of bits encoded within a symbol period for a specified modulation scheme. GMSK, is a constant envelope binary modulation scheme allowing raw transmission at a maximum rate of 270.83 kilobits per second (Kbps).

GSM is efficient for standard voice services. However, high-fidelity audio and data services desire higher data throughput rates due to increased demand on capacity to transfer both voice and data services. To increase capacity, the General Packet Radio Service (GPRS), EDGE (Enhanced Data rates for GSM Evolution) and UMTS (Universal Mobile Telecommunications System) standards have been adopted in GSM systems.

General Packet Radio Service (GPRS) is a non-voice service. It allows information to be sent and received across a mobile telephone network. It supplements Circuit Switched Data (CSD) and Short Message Service (SMS). GPRS employs the same modulation schemes as GSM. GPRS allows for an entire frame (all eight time slots) to be used by a single mobile station at the same time. Thus, higher data throughput rates are achievable.

The EDGE standard uses both the GMSK modulation and 8-PSK modulation. Also, the modulation type can be changed from burst to burst. 8-PSK modulation in EDGE is a linear, 8-level phase modulation with $3\pi/8$ rotation, while GMSK is a non-linear, Gaussian-pulse-shaped frequency modulation. However, the specific GMSK modulation used in GSM can be approximated with a linear modulation (i.e., 2-level phase modulation with a $\pi/2$ rotation). The symbol pulse of the approximated GMSK and the symbol pulse of 8-PSK are identical.

In GSM/EDGE, frequency bursts (FB) are sent regularly by the Base Station (BS) to allow Mobile Stations (MS) to synchronize their Local Oscillator (LO) to the Base Station LO, using frequency offset estimation and correction. These bursts comprise a single tone, which corresponds to an all "0" payload and training sequence. The all zero payload of the frequency burst is a constant frequency signal, or a single tone burst. When in power-on or camp-on mode or when first accessing the network, the remote station hunts continuously for a frequency burst from a list of carriers. Upon detecting a frequency burst, the MS will estimate the frequency offset relative to its nominal frequency, which is 67.7 KHz from the carrier. The MS LO will be corrected using this estimated frequency offset. In power-on mode, the frequency offset can be as much as +/−19 KHz. The MS will periodically wake up to monitor the frequency burst to maintain its synchronization in standby mode. In the standby mode, the frequency offset is within ±2 KHz.

Modern mobile cellular telephones are able to provide conventional voice calls and data calls. The demand for both types of calls continues to increase, placing increasing demands on network capacity. Network operators address this demand by increasing their capacity. This is achieved for example by dividing or adding cells and hence adding more base stations, which increases hardware costs. It is desirable to increase network capacity without unduly increasing hardware costs, in particular to cope with unusually large peak demand during major events such as an international football match or a major festival, in which many users or subscribers who are located within a small area wish to access the network at one time. When a first remote station is allocated a channel for communication (a channel comprising a channel frequency and a time slot), a second remote station can only use the allocated channel after the first remote station has finished using the channel. Maximum cell capacity is reached when all the allocated channel frequencies are used in the cell and all available time slots are either in use or allocated. This means that any additional remote station user will not be able to get service. In reality, another capacity limit exists due to co-channel interferences (CCI) and adjacent channel interferences (ACI) introduced by high frequency re-use pattern and high capacity loading (such as 80% of timeslots and channel frequencies).

Network operators have addressed this problem in a number of ways, all of which require added resources and added cost. For example, one approach is to divide cells into sectors by using sectored, or directional, antenna arrays. Each sector can provide communications for a subset of remote stations within the cell and the interference between remote stations in different sectors is less than if the cell were not divided into sectors and all the remote stations were in the same cell. Another approach is to divide cells into smaller cells, each new smaller cell having a base station. Both these approaches are expensive to implement due to added network equipment. In addition, adding cells or dividing cells into several smaller cells can result in remote stations within one cell experiencing more CCI and ACI interference from neighboring cells because the distance between cells is reduced.

SUMMARY OF THE INVENTION

In a first embodiment, the present patent application comprises a base station controller, comprising a controller processor, a memory subsystem, a data bus operably connected between the controller processor and the memory, wherein the controller processor communicates via the data bus with the memory subsystem to send and receive values for parameters to and from the memory subsystem, and software stored in the memory subsystem, wherein the memory subsystem comprises at least one table of data, wherein the data comprises values of a parameter for at least one set of remote stations, values of training sequence, values of time slot number, and values of channel frequency.

In another embodiment, the present patent application comprises means and instructions for producing first and second signals which share a channel, comprising generating a first data and a second data, generating a first training sequence and a second training sequence, combining the first training sequence with the first data to produce a first combined data, combining the second training sequence with the second data to produce a second combined data, modulating and transmitting both the first combined data and the second combined data using a same carrier frequency and a same time slot to produce first and second transmitted signals, and using both of the training sequences in the same time slot on the same carrier frequency in a same cell by one base station.

In another embodiment, the present patent application comprises means and instructions for sharing signals on a single channel; comprising setting up a new connection, allocating a new time slot if there is an unused time slot on a channel frequency, selecting a used time slot for the new connection to share with an existing connection if there is not an unused time slot on the channel frequency, selecting a different training sequence code (and corresponding new training sequence) for the new connection if the used time slot on the channel frequency has been selected for the new connection to share with the existing connection, and using both said training sequence codes 404, 405 in the same time slot 412 on the same channel frequency 411 in a same cell by one base station 114.

In another embodiment, a cross-correlation ratio between the different training sequence code and the existing connection's training sequence code is low.

In another embodiment, the present patent application comprises an apparatus to produce first and second signals sharing a channel, comprising a plurality of data sources, whereby a plurality of data is generated, at least one sequence generator having a plurality of outputs, whereby a plurality of training sequences is generated, a plurality of combiners, each having a plurality of inputs and at least one output, wherein a first of said inputs is operably connected to one of said data sources and a second of said inputs is operably connected to one of said outputs of said sequence generator, whereby at least one training sequence is combined with at least one data to produce at least one combined data, and a transmitter modulator having a plurality of inputs and at least one output, whereby the transmitter modulator modulates said combined data using a first carrier frequency and a first time slot and outputs a plurality of modulated signals.

In another embodiment, the present patent application comprises a base station comprising a controller processor, an antenna, a duplexer switch operably connected to the base station antenna, a receiver front end operably connected to the duplexer switch, a receiver demodulator operably connected to the receiver front end, a channel decoder and de-interleaver operably connected to the receiver demodulator and the controller processor, a base station controller interface operably connected to the controller processor, a coder and interleaver operably connected to the controller processor, a transmitter modulator operably connected to the coder and interleaver, a transmitter front end module operably connected between said transmitter modulator and the duplexer switch, a data bus operably connected between the controller processor and the channel decoder and de-interleaver, the receiver demodulator, the receiver front end, the transmitter modulator and the transmitter front end and software stored in the memory, wherein the memory comprises at least one table of data, wherein the data comprises values of a parameter for at least one set of remote stations, values of training sequence code (corresponding to a training sequence), values of time slot number, and values of channel frequency.

Further scope of the applicability of the present method and apparatus will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The features, objects and advantages of the invention will become more apparent from the detailed description set forth below when taken in conjunction with the accompanying drawings.

FIG. 17 contains a test result summary for 1% FER when pairing legacy training sequences with training sequences of the QCOM7 set of TSCs;

Figure 18:
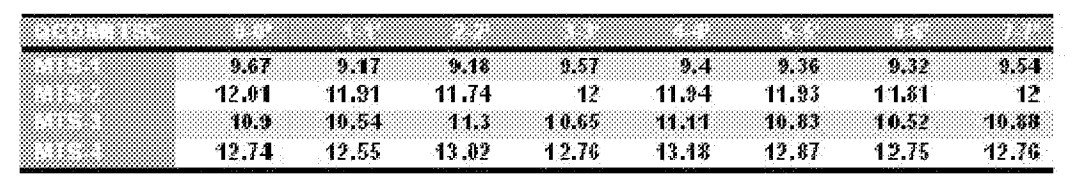

FIG. 18 contains a test result summary for 1% FER when pairing legacy TSCs with QCOM8 TSCs;

DETAILED DESCRIPTION

Figure 1:
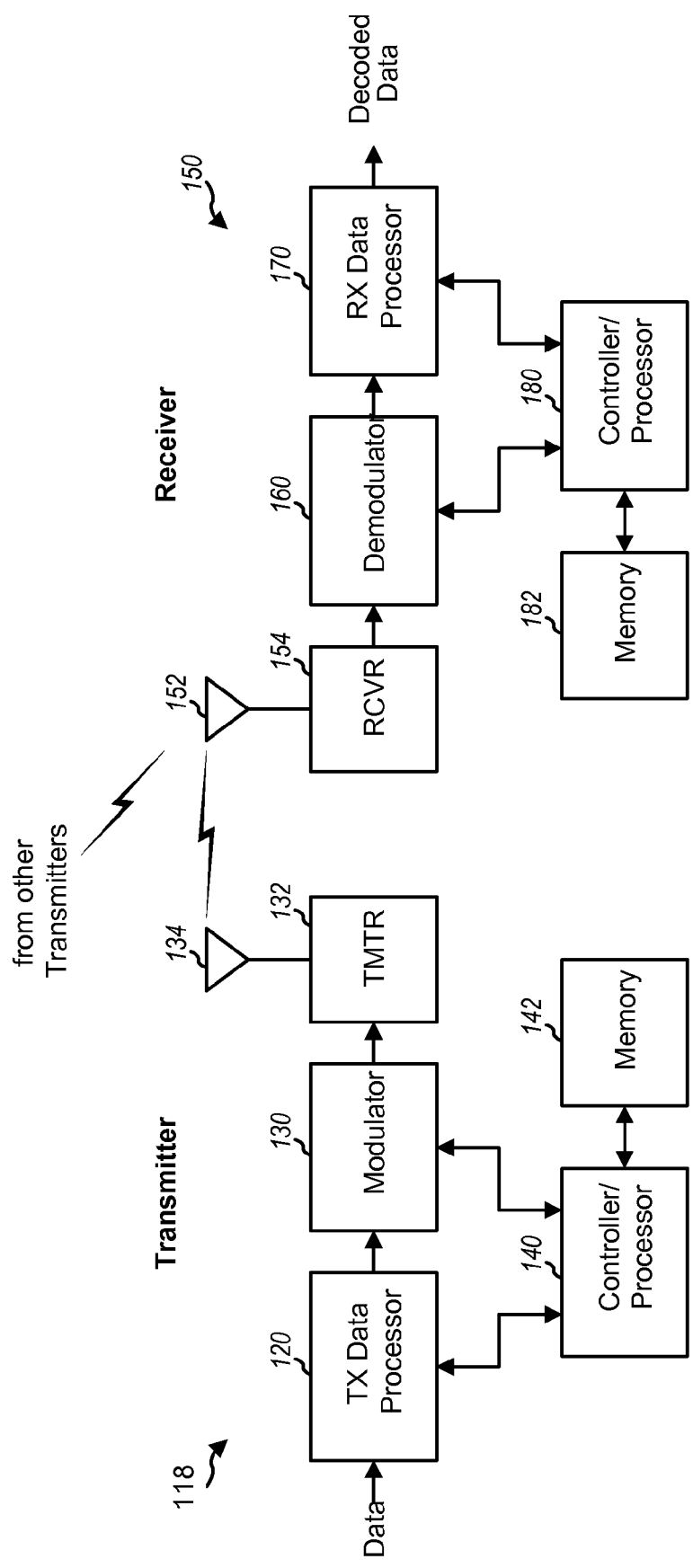
FIG. 1 shows a block diagram of a transmitter and a receiver.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well known structures and devices are shown in block diagram form in order to avoid obscuring the concepts of the present invention.

Interference due to other users limits the performance of wireless networks. This interference can take the form of either interference from neighboring cells on the same frequency, known as CCI, discussed above, or neighboring frequencies on the same cell, known as ACI, also discussed above.

Single-antenna interference cancellation (SAIC) is used to reduce Co-Channel Interference (CCI), The 3G Partnership Project (3GPP) has standardized SAIC performance. SAIC is a method used to combat interference. The 3GPP adopted downlink advanced receiver performance (DARP) to describe the receiver that applies SAIC.

DARP increases network capacity by employing lower reuse factors. Furthermore, it suppresses interference at the same time. DARP operates at the baseband part of a receiver of a remote station. It suppresses adjacent-channel and co-channel interference that differ from general noise. DARP is available in previously defined GSM standards (since Rel-6 in 2004) as a release-independent feature, and is an integral part of Rel-6 and later specs. The following is a description of two DARP methods. The first is the joint detection/demodulation (JD) method. JD uses knowledge of the GSM signal structure in adjacent cells in synchronous mobile networks to demodulate one of several interference signals in addition to the desired signal. JD's ability to retrieve interference signals allows the suppression of specific adjacent-channel interferers. In addition to demodulating GMSK signals, JD also can be used to demodulate EDGE signals. Blind interferer cancellation (BIC) is another method used in DARP to demodulate the GMSK signal. With BIC, the receiver has no knowledge of the structure of any interfering signals that may be received at the same time that the desired signal is received. Since the receiver is effectively "blind" to any adjacent-channel interferers, the method attempts to suppress the interfering component as a whole. The GMSK signal is demodulated from the wanted carrier by the BIC method. BIC is most effective when used for GMSK-modulated speech and data services and can be used in asynchronous networks.

Figure 2:
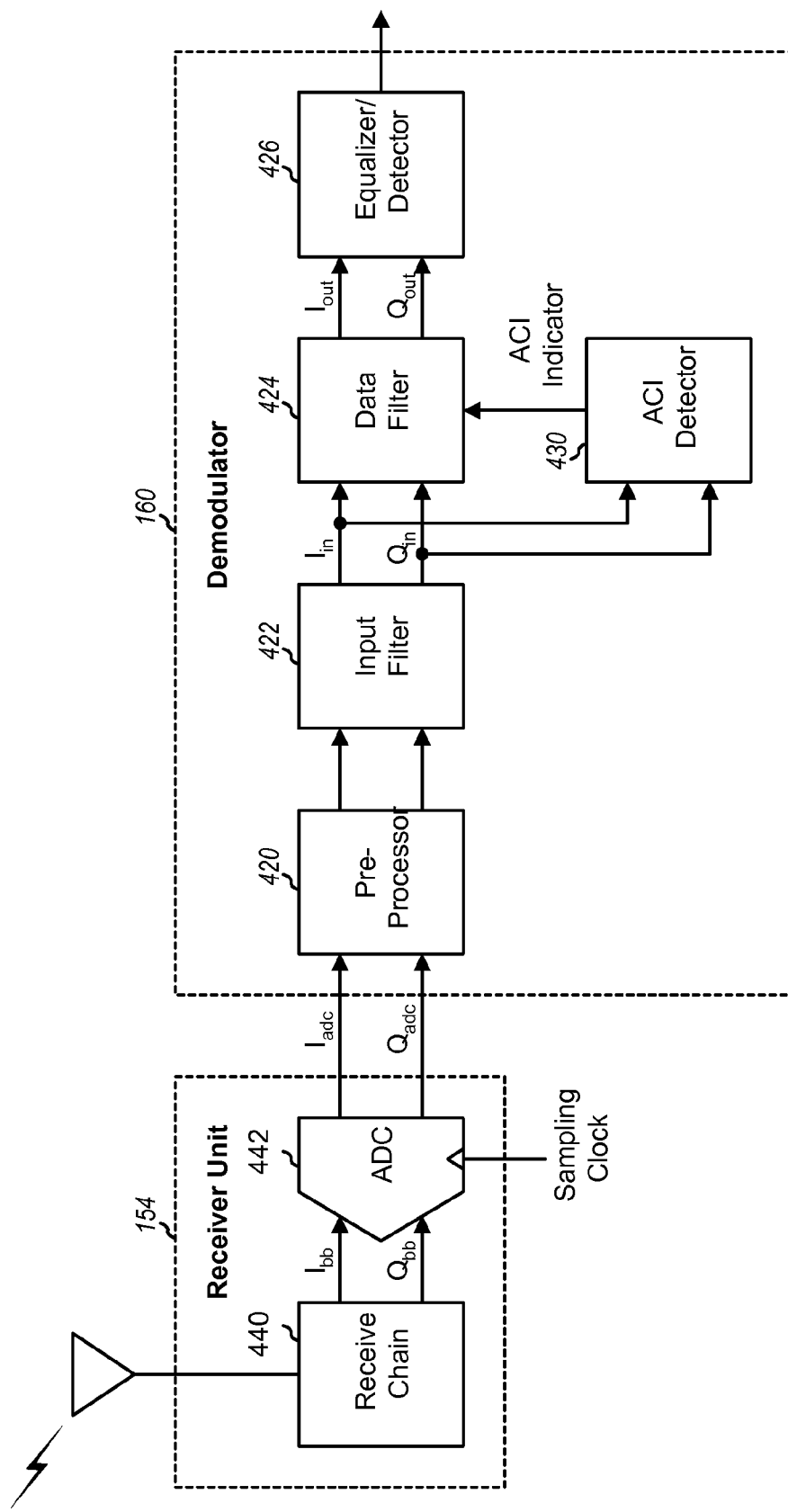
FIG. 2 shows a block diagram of a receiver unit and a demodulator.
Figure 3:
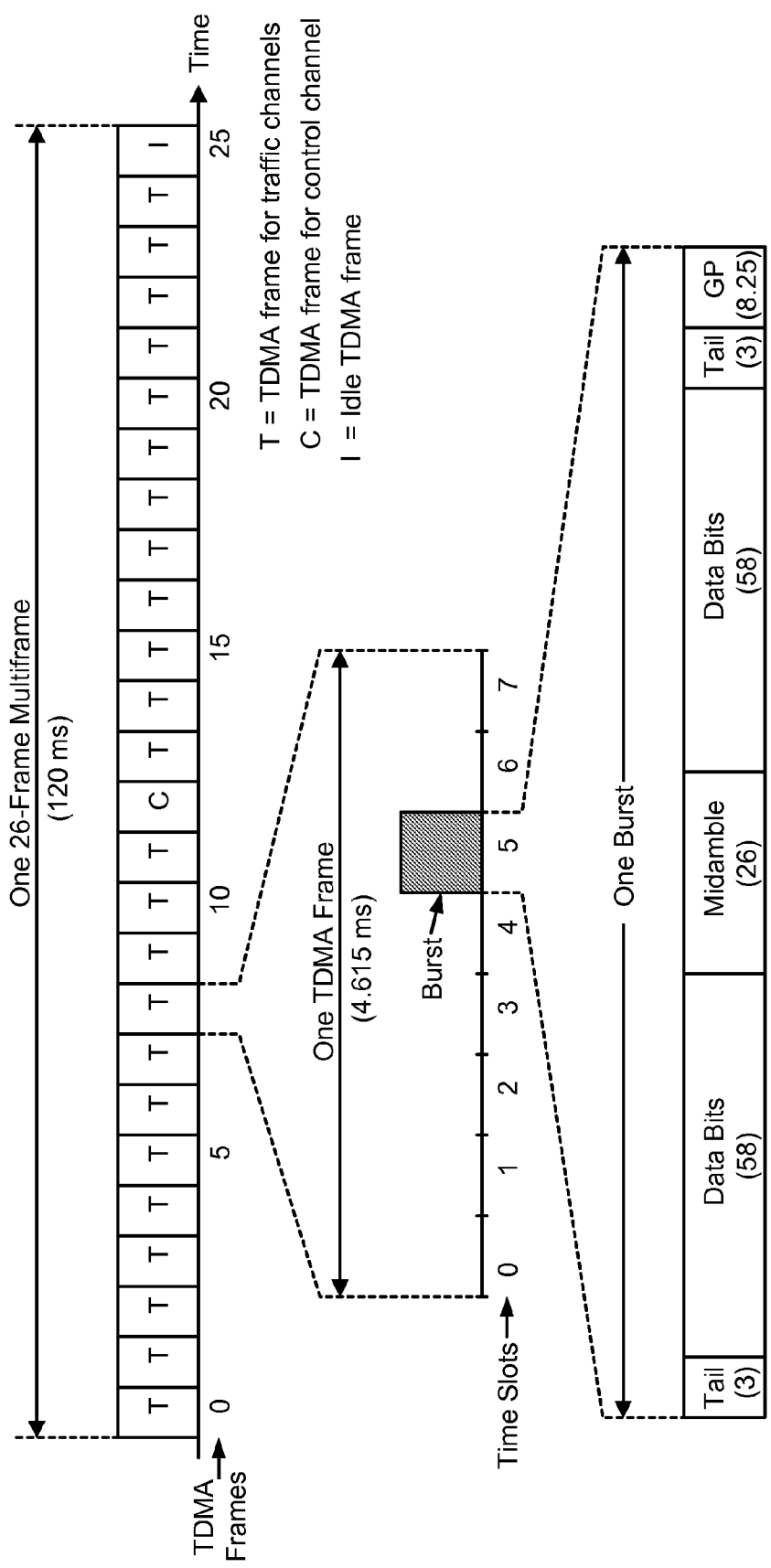
FIG. 3 shows example frame and burst formats in GSM.
Figure 4:
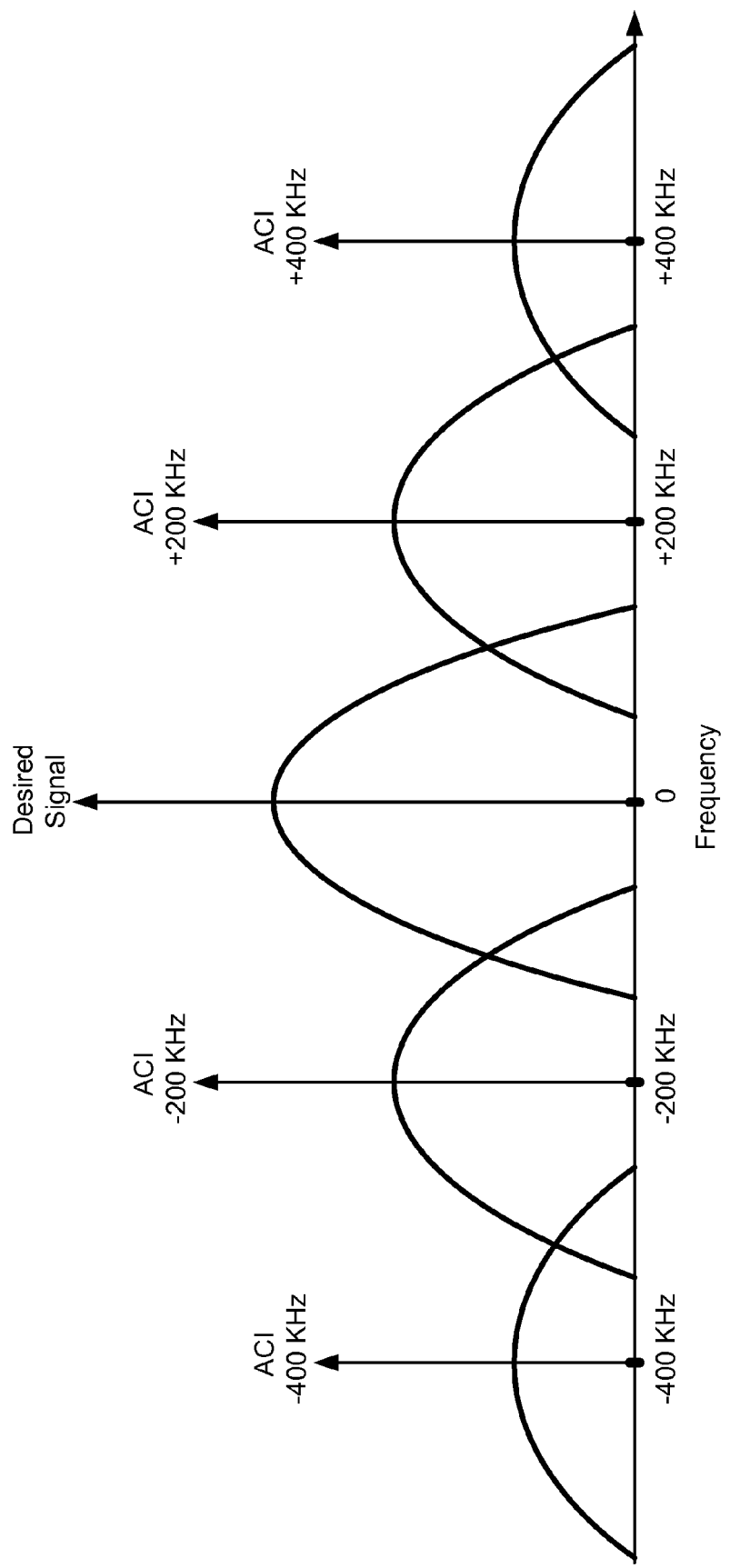
FIG. 4 shows an example spectrum in a GSM system.

A DARP capable remote station equalizer/detector 426 of the present method and apparatus also performs CCI cancellation prior to equalization, detection, etc. Equalizer/detector 426 in FIG. 2 provides demodulated data. CCI cancellation normally is available on a BS. Also, remote stations may or may not be DARP capable. The network may determine whether a remote station is DARP capable or not at the resource assignment stage, a starting point of a call, for a GSM remote station (e.g. mobile station).

Figure 5:
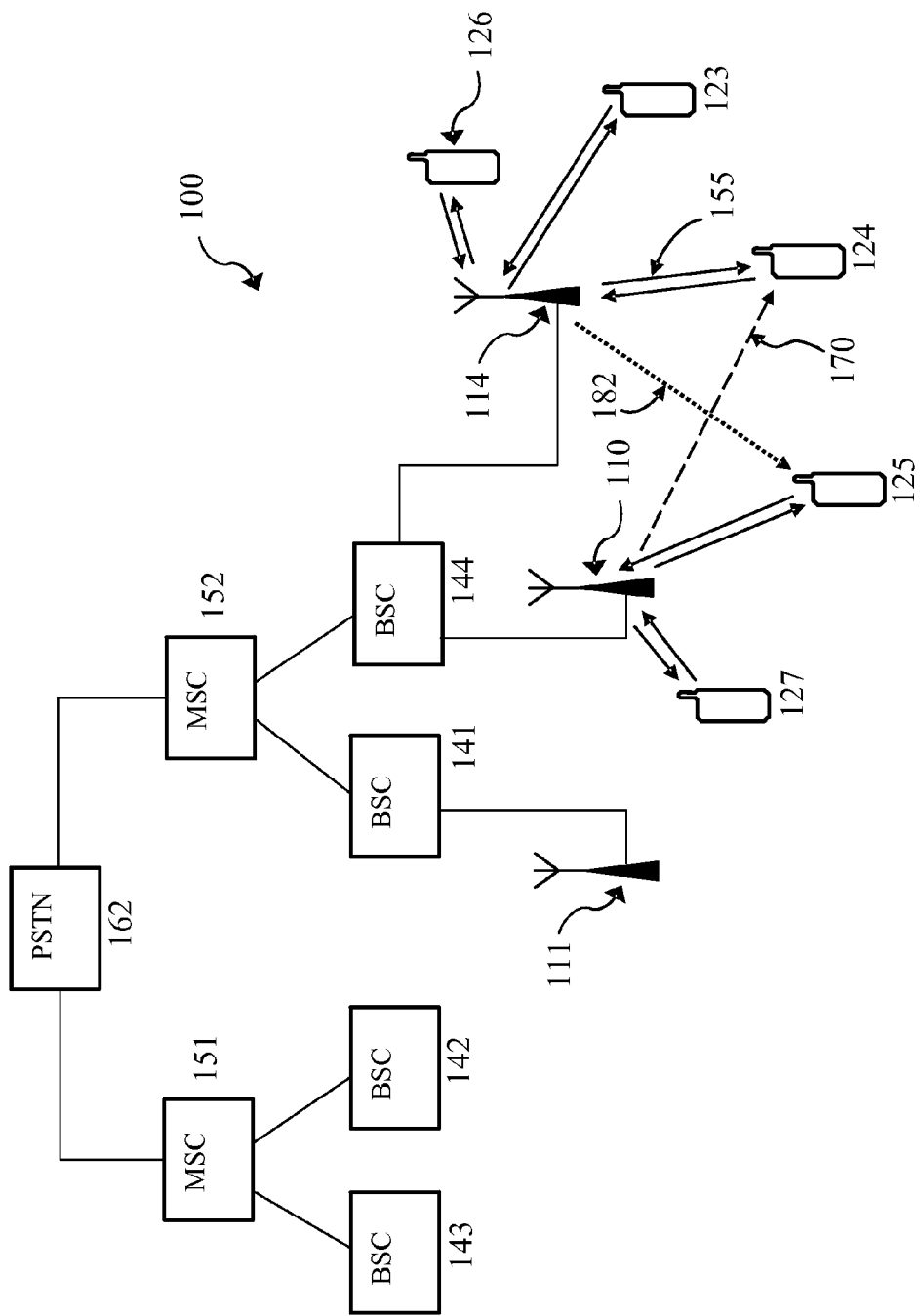
FIG. 5 is a simplified representation of a cellular communications system.

It is desirable to increase the number of active connections to remote stations that can be handled by a base station. FIG. 5 of the accompanying drawings shows a simplified representation of a cellular communications system 100. The system comprises base stations 110, 111 and 114 and remote stations 123, 124, 125, 126 and 127. Base station controllers 141 to 144 act to route signals to and from the different remote stations 123-127, under the control of mobile switching centres 151, 152. The mobile switching centres 151, 152 are connected to a public switched telephone network (PSTN) 162. Although remote stations 123-127 are commonly handheld mobile devices, many fixed wireless devices and wireless devices capable of handling data also fall under the general title of remote station 123-127.

Signals carrying, for example, voice data are transferred between each of the remote stations 123-127 and other remote stations 123-127 by means of the base station controllers 141-144 under the control of the mobile switching centres 151, 152. Alternatively, signals carrying, for example, voice data are transferred between each of the remote stations 123-127 and other communications equipment of other communications networks via the public switched telephone network 162. The public switched telephone network 162 allows calls to be routed between the mobile cellular system 100 and other communication systems. Such other systems include other mobile cellular communications systems 100 of different types and conforming to different standards.

Each of remote stations 123-127 can be serviced by any one of a number of base stations 110, 111, 114. A remote station 124 receives both a signal transmitted by the serving base station 114 and signals transmitted by nearby non-serving base stations 110, 111 and intended to serve other remote stations 125.

The strengths of the different signals from base stations 110, 111, 114 are periodically measured by the remote station 124 and reported to BSC 144, 114, etc. If the signal from a nearby base station 110, 111 becomes stronger than that of the serving base station 114, then the mobile switching centre 152 acts to make the nearby base station 110 become the serving base station and acts to make the serving base station 114 become a non-serving base station and handovers the signal to the nearby base station 110. Handover refers to the method of transferring a data session or an ongoing call from one channel connected to the core network to another.

In cellular mobile communications systems, radio resources are divided into a number of channels. Each active connection (for example a voice call) is allocated a particular channel having a particular channel frequency for the downlink signal (transmitted by the base station 110, 111, 114 to a remote station 123-127 and received by the remote station 123-127) and a channel having a particular channel frequency for the uplink signal (transmitted by the remote station 123-127 to the base station 110, 111, 114 and received by the base station 110, 111, 114). The frequencies for downlink and uplink signals are often different, to allow simultaneous transmission and reception and to reduce interference between transmitted signals and the received signals at the remote station or 123-127 at the base station 110, 111, 114.

Figure 6:
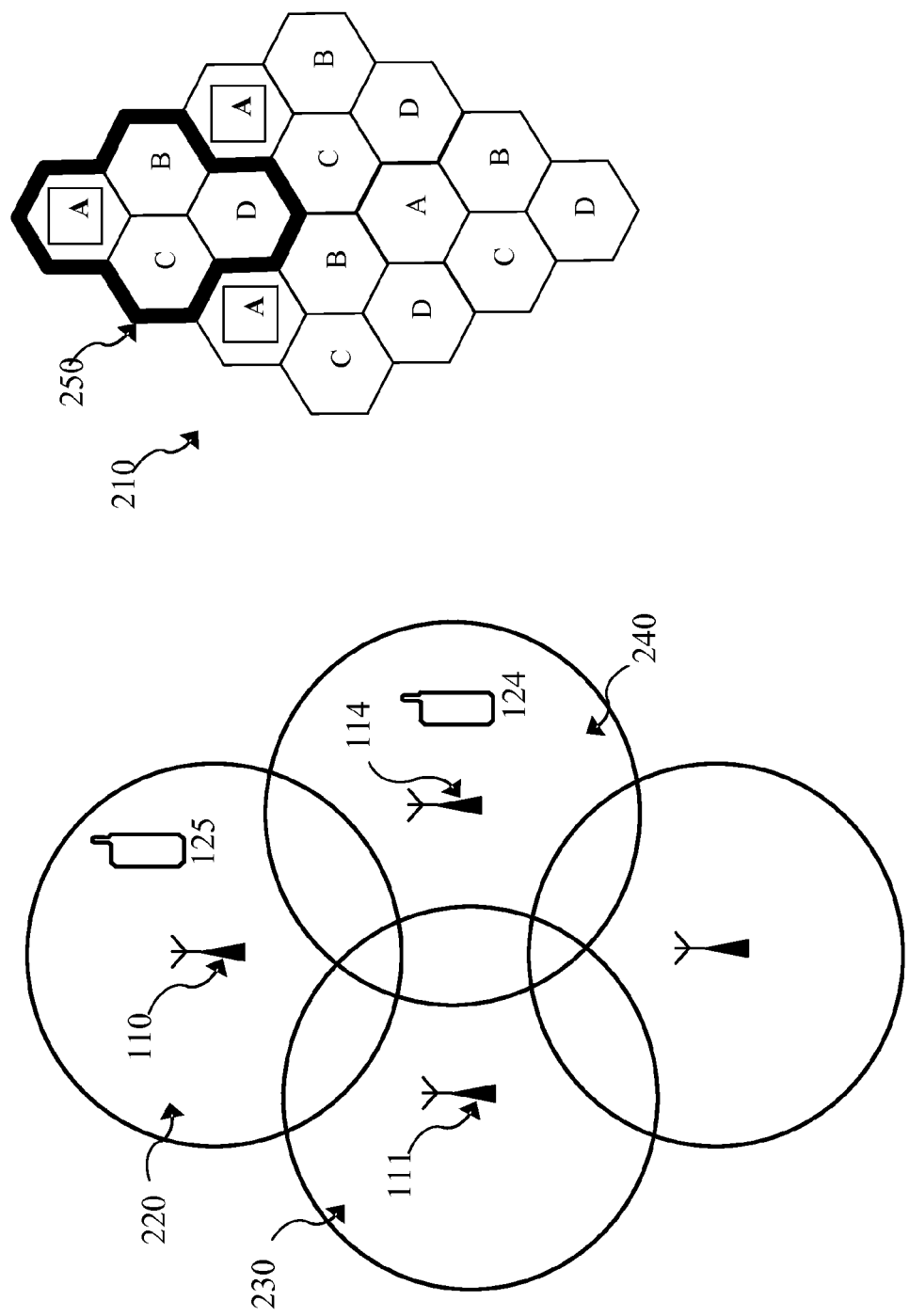
FIG. 6 shows an arrangement of cells which are part of a cellular system.

A method for cellular systems to provide access to many users is frequency reuse. FIG. 6 of the accompanying drawings shows an arrangement of cells in a cellular communications system that uses frequency reuse. This particular example has a reuse factor of 4:12, which represents 4 cells: 12 frequencies. That means that the 12 frequencies available for a base station are allocated to the base station's four sites labeled A-D illustrated in FIG. 6. Each site is divided into three sectors (or cells). Stated another way, one frequency is allocated to each of the three sectors of each of 4 sites so that all of the 12 sectors (3 sectors/site for 4 sites) have different frequencies. The frequency reuse pattern repeats itself after the fourth cell. FIG. 6 illustrates the system's cell repeat pattern 210 whereby base station 110 belongs to cell A, base station 114 belongs to cell B, base station 111 belongs to cell C and so on. Base station 110 has a service area 220 that overlaps with adjacent service areas 230 and 240 of adjacent base stations 111 and 114 respectively. Remote stations 124, 125 are free to roam between the service areas. As discussed above, to reduce interference of signals between cells, each cell is allocated a set of channel frequencies, where each frequency may support one or more channels, such that adjacent cells are allocated different sets of channel frequencies. However, two cells that are non-adjacent may use the same set of frequencies. Base station 110 could use for example frequency allocation set A comprising frequencies f1, f2 and f3 for communicating with remote stations 125 in its service area 220. Similarly, base station 114 could use for example frequency allocation set B comprising frequencies f4, f5 and f6, to communicate with remote stations 124 in its service area 240, and so on. The area defined by bold border 250 contains one four-site repeat pattern. The repeat pattern repeats in a regular arrangement for the geographical area serviced by the communications system 100. It may be appreciated that although the present example repeats itself after 4 sites, a repeat pattern may have a number of sites other than four and a total number of frequencies other than 12.

As stated above with GSM, each carrier frequency is divided using TDMA. TDMA is a multiple access technique directed to providing increased capacity. Using TDMA, each carrier frequency is segmented into intervals called frames. Each frame is further partitioned into assignable user time slots. In GSM, the frame is partitioned into eight time slots. Thus, eight consecutive time slots form one TDMA frame with a duration of 4.615 ms.

A physical channel occupies one time slot within each frame on a particular frequency. The TDMA frames of a particular carrier frequency are numbered, each user being assigned one or more time slots within each frame. Furthermore, the frame structure repeats, so that a fixed TDMA assignment constitutes one or more slots that periodically appear during each time frame. Thus, each base station can communicate with a plurality of remote stations 123-127 using different assigned time slots within a single channel frequency. As stated above, the time slots repeat periodically. For example, a first user may transmit on the 1$^{st}$ slot of every frame of frequency f1, while a second user may transmit on the 2$^{nd}$ slot of every frame of frequency f2. During each downlink time slot, the remote station 123-127 is given access to receive a signal transmitted by the base station 110, 111, 114 and during each uplink time slot the base station 110, 111, 114 is given access to receive a signal transmitted by the remote station 123-127. The channel for communication to a mobile station 123-127 thus comprises both a frequency and a time slot, for a GSM system. Equally, the channel for communication to a base station 110, 111, 114 comprises both a frequency and a time slot.

Figure 7:
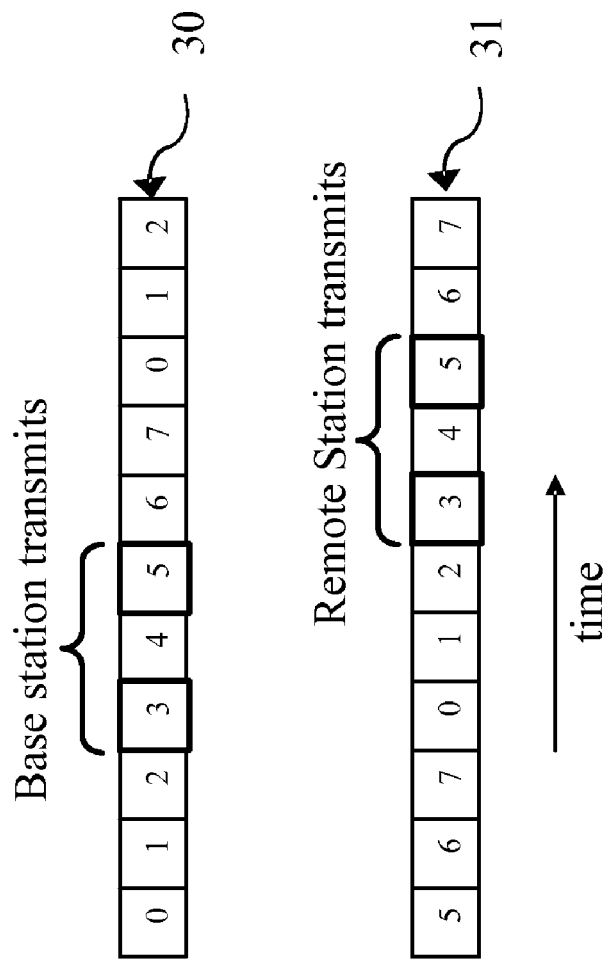
FIG. 7 shows an example arrangement of time slots for a time division multiple access (TDMA) communications system.

FIG. 7 shows an example arrangement of time slots for a time division multiple access (TDMA) communications system. A base station 114 transmits data signals in a sequence of numbered time slots 30, each signal being for only one of a set of remote stations 123-127 and each signal being received at the antenna of all remote stations 123-127 within range of the transmitted signals. The base station 114 transmits all the signals using slots on an allocated channel frequency. For example, a first remote station 124 might be allocated a first time slot 3 and a second remote station 126 might be allocated a second time slot 5. The base station 114 transmits, in this example, a signal for the first remote station 124 during time slot 3 of the sequence of time slots 30, and transmits a signal for the second remote station 126 during time slot 5 of the sequence of time slots 30. The first and second remote stations 124, 126 are active during their respective time slots 3 and 5 of time slot sequence 30, to receive the signals from the base station 114. The remote stations 124, 126 transmit signals to the base station 114 during corresponding time slots 3 and 5 of time slot sequence 31 on the uplink. It can be seen that the time slots for the base station 114 to transmit (and the remote stations 124, 126 to receive) 30 are offset in time with respect to the time slots for the remote stations 124, 126 to transmit (and the base station 114 to receive) 31.

This offsetting in time of transmit and receive time slots is known as time division duplexing (TDD), which among other things, allows transmit and receive operations to occur at different instances of time.

Voice data signals are not the only signals to be transmitted between the base station 110, 111, 114 and the remote station 123-127. A control channel is used to transmit data that controls various aspects of the communication between the base station 110, 111, 114 and the remote station 123-127. Among other things, the base station 110, 111, 114 uses the control channel to send to the remote station 123-127 a sequence code, or training sequence code (TSC) which indicates which of a set of sequences the base station 110, 111, 114 will use to transmit the signal to the remote station 123-127. In GSM, a 26-bit training sequence is used for equalization. This is a known sequence which is transmitted in a signal in the middle of every time slot burst.

The sequences are used by the remote station 123-127: to compensate for channel degradations which vary quickly with time; to reduce interference from other sectors or cells; and to synchronize the remote station's receiver to the received signal. These functions are performed by an equalizer which is part of the remote station's 123-127 receiver. An equalizer 426 determines how the known transmitted training sequence signal is modified by multipath fading. Equalization may use this information to extract the desired signal from the unwanted reflections by constructing an inverse filter to extract the rest of the desired signal. Different sequences (and associated sequence codes) are transmitted by different base stations 110, 111, 114 in order to reduce interference between sequences transmitted by base stations 110, 111, 114 that are close to each other.

As stated above, with DARP the remote station 123-127 of the present method and apparatus is able to use the sequence to distinguish the signal transmitted to it by the base station 110, 111, 114 serving the remote station 123-127 from other unwanted signals transmitted by non-serving base stations 110, 111, 114 of other cells. This holds true so long as the received amplitudes or power levels of the unwanted signals are below a threshold relative to the amplitude of the wanted signal. The unwanted signals can cause interference to the wanted signal if they have amplitudes above this threshold. In addition, the threshold can vary according to the capability of the remote station's 123-127 receiver. The interfering signal and the desired (or wanted) signal can arrive at the remote station's 123-127 receiver contemporaneously if, for example, the signals from the serving and non-serving base stations 110, 111, 114 share the same time slot for transmitting.

Referring again to FIG. 5, at remote station 124, transmissions from base station 110 for remote station 125 can interfere with transmissions from base station 114 for remote station 124 (the path of the interfering signal shown by dashed arrow 170). Similarly, at remote station 125 transmissions from base station 114 for remote station 124 can interfere with transmissions from base station 110 for remote station 125 (the path of the interfering signal shown by dotted arrow 182).

TABLE 1

| Row | Base station transmitting the signal | Remote station 1 receiving the signal | Channel frequency of the signal | Remote station 2 for which the signal is intended | Downlink time slot (TS) of the signal | Training sequence code (TSC) of the signal | Received power level at remote station 1 | Signal category |
|---|---|---|---|---|---|---|---|---|
| 2 | 114 | 123 | 41 | 123 | 5 | TSC 3 | −40 dBm | Wanted |
| 3 | 114 | 124 | 32 | 124 | 3 | TSC 3 | −82 dBm | Wanted |
| 4 | 110 | 124 | 32 | 125 | 3 | TSC 1 | −81 dBm | Interferer |
| 5 | | | | | | | | |
| 6 | 114 | 125 | 32 | 124 | 3 | TSC 3 | −79 dBm | Interferer |
| 7 | 110 | 125 | 32 | 125 | 3 | TSC 1 | −80 dBm | Wanted |

Table 1 shows example values of parameters for signals transmitted by the two base stations 110 and 114 illustrated in FIG. 6. The information in rows 3 and 4 of Table 1 show that for remote station 124 both a wanted signal from a first base station 114 and an unwanted interferer signal from a second base station 110 and intended for remote station 125 are received and the two received signals have the same channel and similar power levels (−82 dBm and −81 dBm respectively) Similarly, the information in rows 6 and 7 show that for remote station 125 both a wanted signal from the second base station 110 and an unwanted interferer signal from the first base station 114 and intended for remote station 124 are received and the two received signals have the same channel and similar power levels (−80 dBm and −79 dBm respectively).

Each remote station 124, 125 thus receives both a wanted signal and an unwanted interferer signal that have similar power levels from different base stations 114, 110, on the same channel (i.e. contemporaneously). Because the two signals arrive on the same channel and similar power levels, they interfere with each other. This may cause errors in demodulation and decoding of the wanted signal. This interference is co-channel interference discussed above.

The co-channel interference may be mitigated to a greater extent than previously possible, by the use of DARP enabled remote stations 123-127, base stations 110, 111, 114 and base station controllers 151, 152. While base stations 110, 111, 114 may be capable of simultaneously receiving and demodulating two co-channel signals having similar power levels, DARP allows remote stations 123-127 to have, by means of DARP, similar capability. This DARP capability may be implemented by means of a method known as single antenna interference cancellation (SAIC) or by means of a method known as dual antenna interference cancellation (DAIC).

The receiver of a DARP-capable remote station 123-127 may demodulate a wanted signal while rejecting an unwanted co-channel signal even when the amplitude of the received unwanted co-channel signal is similar or higher than the amplitude of the wanted signal. The DARP feature works better when the amplitudes of the received co-channel signals are similar. This situation would typically occur in existing systems such as GSM not yet employing the present method and apparatus, when each of two remote stations 123-127, each communicating with a different base station 110, 111, 114, is near a cell boundary, where the path losses from each base station 110, 111, 114 to each remote station 123-127 are similar.

A remote station 123-127 that is not DARP-capable, by contrast, may only demodulate the wanted signal if the unwanted co-channel interferer signal has an amplitude, or power level, lower than the amplitude of the wanted signal. In one example, it may be lower by at least 8 dB. The DARP-capable remote station 123-127 can therefore tolerate a much higher-amplitude co-channel signal relative to the wanted signal, than can the remote station 123-127 not having DARP capability.

The co-channel interference (CCI) ratio is the ratio between the power levels, or amplitudes, of the wanted and unwanted signals expressed in dB. In one example, the co-channel interference ratio could be, for example, −6 dB (whereby the power level of the wanted signal is 6 dB lower than the power level of the co-channel interferer (or unwanted) signal). In another example, the ratio may be +6dB (whereby the power level of the wanted signal is 6 dB higher than the power level of the co-channel interferer (or unwanted) signal). For those remote stations 123-127 of the present method and apparatus with good DARP performance, the amplitude of the interferer signal can be as much as 10 dB higher than the amplitude of the wanted signal, and the remote stations 123-127 may still process the wanted signal. If the amplitude of the interferer signal is 10 dB higher than the amplitude of the wanted signal, the co-channel interference ratio is −10 dB.

DARP capability, as described above, improves a remote station's 123-127 reception of signals in the presence of ACI or CCI. A new user, with DARP capability, will better reject the interference coming from an existing user. The existing user, also with DARP capability, would do the same and not be impacted by the new user. In one example, DARP works well with CCI in the range of 0 dB (same level of co-channel interference for the signals) to −6 dB (co-channel is 6 dB stronger than the desired or wanted signal). Thus, two users using the same ARFCN and same timeslot, but assigned different TSCs, will get good service.

The DARP feature allows two remote stations 124 and 125, if they both have the DARP feature enabled, to each receive wanted signals from two base stations 110 and 114, the wanted signals having similar power levels, and each remote station 124, 125 to demodulate its wanted signal. Thus, the DARP enabled remote stations 124, 125 are both able to use the same channel simultaneously for data or voice.

The feature described above of using a single channel to support two simultaneous calls from two base stations 110, 111, 114 to two remote stations 123-127 is somewhat limited in its application in the prior art. To use the feature, the two remote stations 124, 125 are within range of the two base stations 114, 110 and are each receiving the two signals at similar power levels. For this condition, typically the two remote stations 124, 125 would be near the cell boundary, as mentioned above.

The present method and apparatus allows the supporting of two or more simultaneous calls on the same channel (consisting of a time slot on a carrier frequency), each call comprising communication between a single base station 110, 111, 114 and one of a plurality of remote stations 123-127 by means of a signal transmitted by the base station 110, 111, 114 and a signal transmitted by the remote station 123-127. The present method and apparatus provides a new and inventive application for DARP. As stated above, with DARP, two signals on the same time slot on the same carrier frequency may be distinguished by using different training sequences at higher levels of interference than before DARP. Since the signal from the BS 110, 111, 114 not being used acts as interference, DARP filters/suppresses out the unwanted signal (signal from the BS 110, 111, 114 not being used) by use of the training sequences.

The present method and apparatus allows the use of two or more training sequences in the same cell. In the prior art, one of the training sequences, the one not assigned to the base station 110, 111, 114, will only act as interference as it also does in Multi-User on One Slot (MUROS) for at least one mobile station's 123-127 receiver. However, a key difference is that the unwanted signal for that mobile station is wanted by another mobile station 123-127 in the same cell. In legacy systems, the unwanted signal is for a mobile station 123-127 in another cell. According to the present method and apparatus, both training sequence signals may be used in the same time slot on the same carrier frequency in the same cell by the same base station 110, 111, 114. Since two training sequences can be used in a cell, twice as many communication channels may be used in the cell. By taking a training sequence which would normally be interference from another (non-neighboring) cell or sector and allowing a base station 110, 111, 114 to use it in addition to its already-used training sequence, the number of communication channels is doubled.

DARP, when used along with the present method and apparatus, therefore enables a GSM network to use a co-channel already in use (i.e., the ARFCN that is already in use) to serve additional users. In one example, each ARFCN can be used for two users for full-rate (FR) speech and 4 for half-rate (HR) speech. It is also possible to serve the third or even fourth user if the MSs have excellent DARP performance. In order to serve additional users using the same AFRCN on the same timeslot, the network transmits the additional users' RF signal on the same carrier, using a different phase shift, and assigns the same traffic channel (the same ARFCN and timeslot that is in use) to the additional user using a different TSC. The bursts are modulated with the training sequence corresponding to the TSC accordingly. A DARP capable MS may detect the wanted or desired signal. It is possible to add the third and fourth users in the same way as the first and second users were.

Figure 8A:
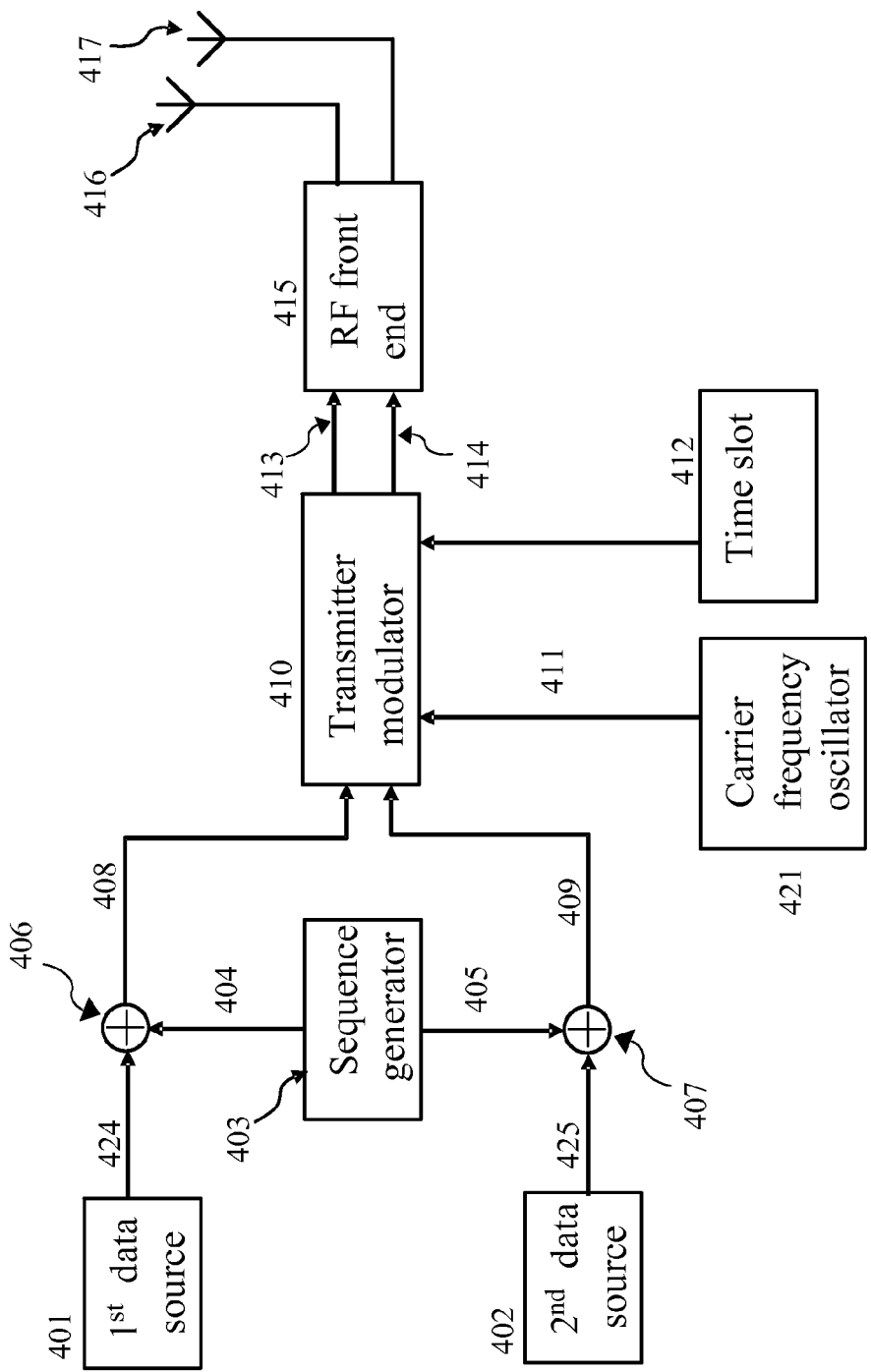
FIG. 8A shows an apparatus for operating in a multiple access communication system to produce first and second signals sharing a single channel.

FIG. 8A of the accompanying drawings shows an apparatus for operating in a multiple access communication system to produce first and second signals sharing a single channel. A first data source 401 and a second data source 402 (for a first and a second remote station 123-127) produce first data 424 and second data 425 for transmission. A sequence generator 403 generates a first sequence 404 and a second sequence 405. A first combiner 406 combines the first sequence 404 with the first 424 data to produce first combined data 408. A second combiner 407 combines the second sequence 405 with the second data 425 to produce second combined data 409.

The first and second combined data 408, 409 are input to a transmitter modulator 410 for modulating both the first and the second combined data 408, 409 using a first carrier frequency 411 and a first time slot 412. In this example, the carrier frequency may generated by an oscillator 421. The transmitter modulator outputs a first modulated signal 413 and a second modulated signal 414 to a RF front end 415. The RF front end processes the first and second modulated signals 413, 414 by upconverting them from baseband to an RF (radio frequency) frequency. The upconverted signals are sent to antennas 416 and 417 where they are respectively transmitted.

The first and second modulated signals may be combined in a combiner prior to being transmitted. The combiner 422 may be a part of either the transmitter modulator 410 or the RF front end 415 or a separate device. A single antenna 416 provides means for transmitting the combined first and second signals by radiation. This is illustrated in FIG. 8B.

Figure 8B:
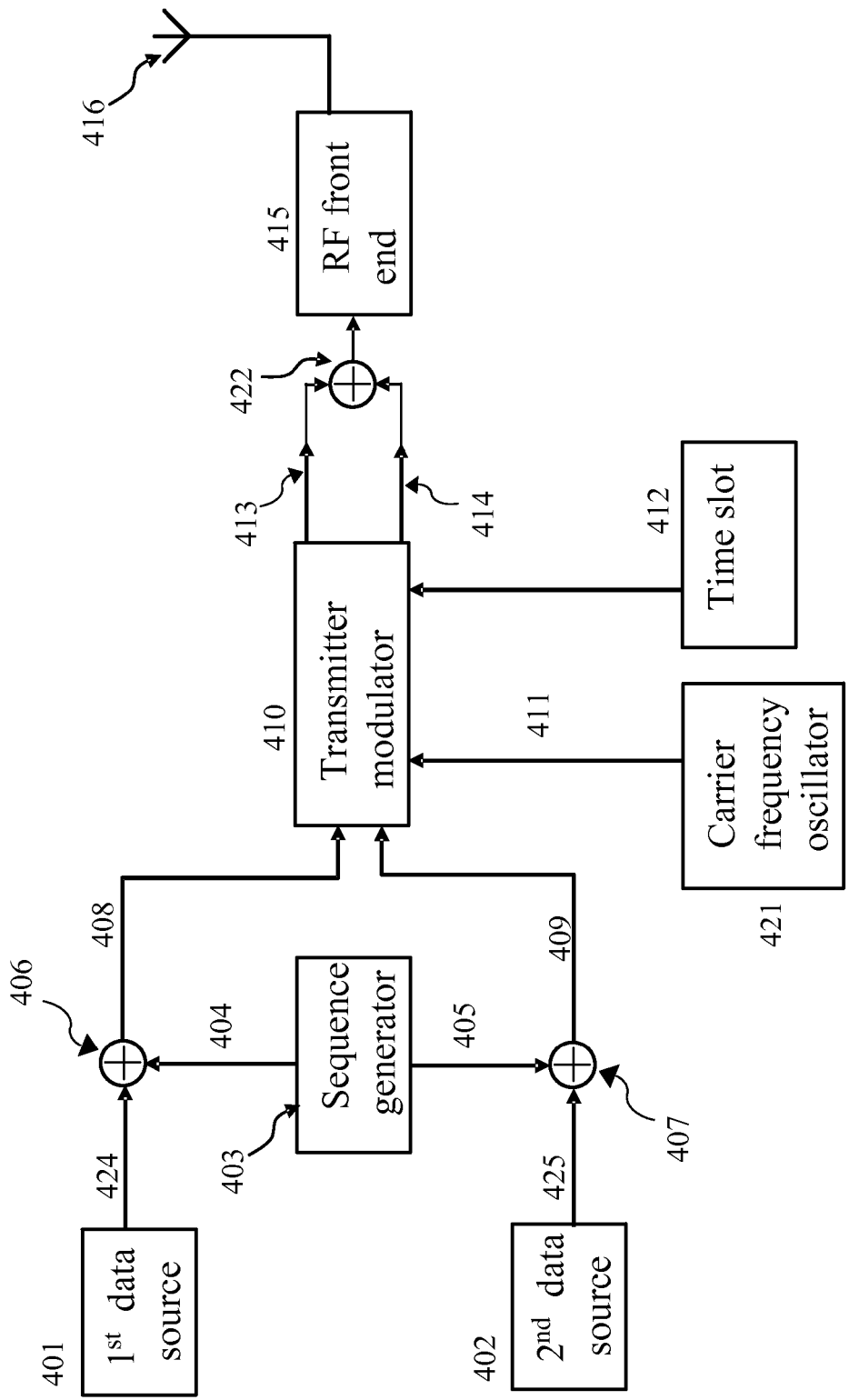
FIG. 8B shows an apparatus for operating in a multiple access communication system to produce first and second signals sharing a single channel and using a combiner to combine first and second modulated signals.
Figure 9:
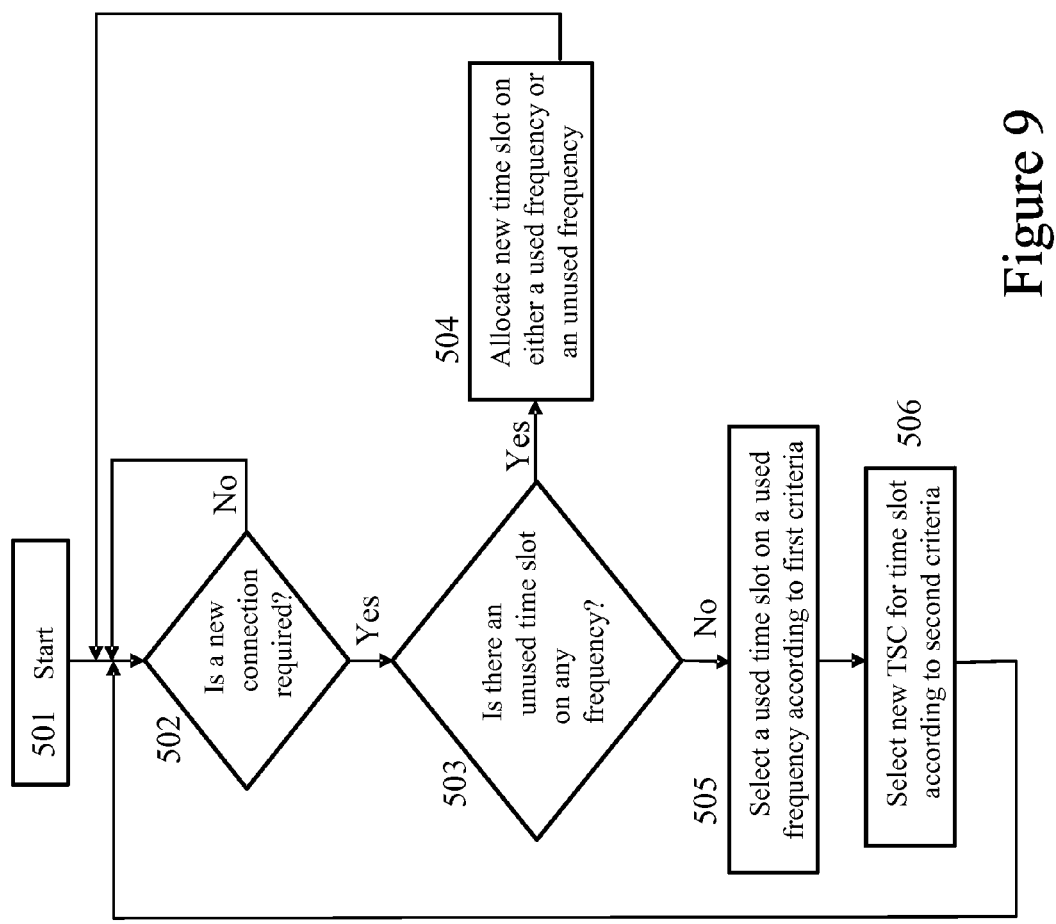
FIG. 9 of the accompanying drawings is a flowchart disclosing a method for using the apparatus shown in any of FIGS. 8, 10 or 11 of the accompanying drawings.

FIG. 9 of the accompanying drawings shows a method for using the apparatuses for operating in a multiple access communication system to produce first and second signals sharing a single channel shown in FIGS. 8A and 8B. The method includes allocating a particular channel frequency and a particular time slot for a base station 110, 111, 114 to use to transmit to a plurality of remote stations 123-127 whereby a different training sequence is assigned for each remote station 123-127. Thus in one example, this method may be executed in the base station controller 151, 152. In another example, this method may be executed in a base station 110, 111, 114.

Following the start of the method 501, a decision is made in step 502 as to whether to set up a new connection between the base station 110, 111, 114 and a remote station 123-127. If the answer is NO, then the method moves back to the start block 501 and the steps above are repeated. When the answer is YES, a new connection is set up. Then in block 503 a decision is made as to whether there is an unused channel (i.e. an unused time slot for any channel frequency). If there is an unused time slot on a used or unused channel frequency, then a new time slot is allocated in block 504. The method then moves back to the start block 501 and the steps above are repeated.

When eventually there is no longer an unused time slot (because all time slots are used for connections), the answer to the question of block 503 is NO, and the method moves to block 505. In block 505, a used time slot is selected for the new connection to share with an existing connection, according to a set of first criteria. There can be a variety of criteria. For example one criterion might be that a time slot may be selected if it has low traffic. Another criterion may be that the time slot is already used by no more than one remote station 123-127. It can be appreciated that there will be other possible criteria based on the network planning methods employed, and the criteria is not limited to those two examples.

A used time slot on a channel frequency having been selected for the new connection to share along with an existing connection, a TSC for the new connection is then selected in block 506 according to a set of second criteria. These second criteria may include some of the criteria used for the selection of the time slot in block 505, or other criteria. One criterion is that the TSC has not yet been used by the cell or sector for the channel comprising the used time slot. Another criterion might be that the TSC is not used on that channel by a nearby cell or sector. The method then moves back to the start block 501 and the steps above are repeated.

Figure 10A:
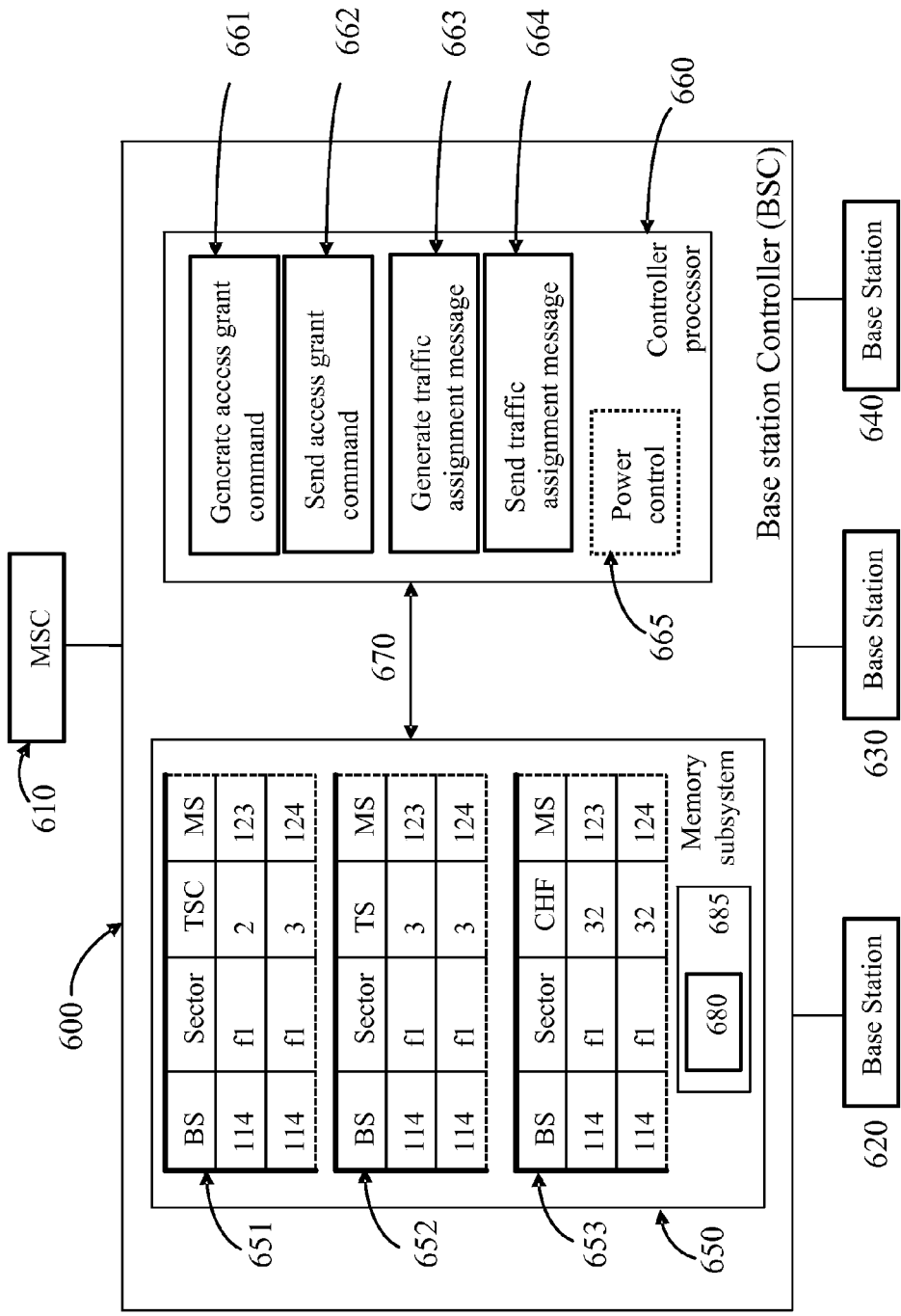
FIG. 10A shows an example embodiment wherein the method described by FIG. 9 would reside in the base station controller.

FIG. 10A of the accompanying drawings shows an example wherein the method described by FIG. 9 would reside in the base station controller 600. Within base station controller 600 reside controller processor 660 and memory subsystem 650. The steps of the method may be stored in software 680 in memory 685 in memory subsystem 650, or within software 680 in memory 685 residing in controller processor 660, or within software 680 memory 685 in the base station controller 600, or within some other digital signal processor (DSP) or in other forms of hardware. The base station controller 600 is connected to the mobile switching centre 610 and also to base stations 620, 630 and 640, as shown by FIG. 10A.

Shown within memory subsystem 650 are parts of three tables of data 651, 652, 653. Each table of data stores values of a parameter for a set of remote stations 123, 124 indicated by the column labeled MS. Table 651 stores values of training sequence code. Table 652 stores values for time slot number TS. Table 653 stores values of channel frequency CHF. It can be appreciated that the tables of data could alternatively be arranged as a multi-dimensional single table or several tables of different dimensions to those shown in FIG. 10A.

Controller processor 660 communicates via data bus 670 with memory subsystem 650 in order to send and receive values for parameters to/from memory subsystem 650. Within controller processor 660 are contained functions that include a function 661 to generate an access grant command, a function 662 to send an access grant command to a base station 620, 630, 640, a function 663 to generate a traffic assignment message, and a function 664 to send a traffic assignment message to a base station 620, 630 or 640. These functions may be executed using software 680 stored in memory 685.

Within controller processor 660, or elsewhere in the base station controller 600, there may also be a power control function 665 to control the power level of a signal transmitted by a base station 620, 630 or 640.

It can be appreciated that the functions shown as being within base station controller 600, namely memory subsystem 650 and controller processor 660 could also reside in the mobile switching centre 610. Equally some or all of the functions described as being part of base station controller 600 could equally well reside in one or more of base stations 620, 630 or 640.

Figure 10B:
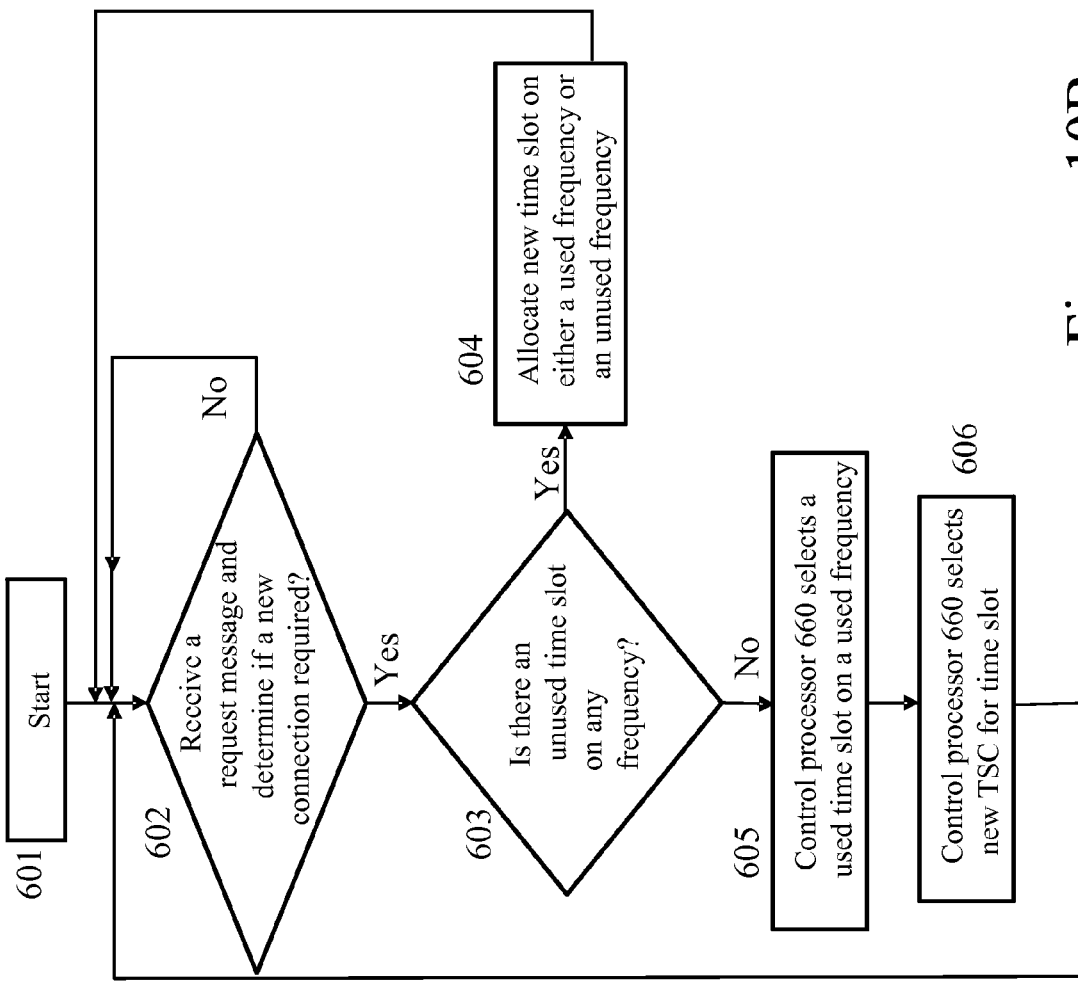
FIG. 10B is a flowchart disclosing the steps executed by the base station controller of FIG. 10A.

FIG. 10B is a flowchart disclosing the steps executed by the base station controller 600. When allocating a channel to a remote station 123, 124 (e.g. remote station MS 23), for example when the remote station 123 requests service, the base station 620, 630, 640 wishing to service the remote station 123, 124 sends a request message to the base station controller 600 for a channel assignment. Controller processor 660, upon receiving the request message at step 602 via data bus 670, determines if a new connection is required. If the answer is NO, then the method moves back to the start block 601 and the steps above are repeated. When the answer is YES a new connection set up is initiated. Then in block 603 a decision is made as to whether there is an unused channel (i.e. an unused time slot for any channel frequency). If there is an unused time slot on a used or unused channel frequency, then a new time slot is allocated in block 604. The method then moves back to the start block 601 and the steps above are repeated.

On the other hand, if the controller processor 660 determines there is not an unused time slot on any channel frequency, it selects a used time slot. See step 605 of FIG. 10B. The selection could be based on accessing memory subsystem 650 or other memory 685 to obtain information on criteria such as the current usage of time slots, and whether both or only one of remote stations 123, 124 are DARP enabled. Controller processor 660 selects a used time slot, and selects a training sequence code for the time slot. See step 606 of FIG. 10B Since the time slot is already used, this will be the second training sequence selected for that time slot.

In order to apply criteria for selecting a time slot, the controller processor 660 accesses memory 650 via data bus 670, or accesses other memory 685, to obtain information, for example information about the current allocation of time slots or training sequences or both, and whether remote stations 123, 124 have DARP capability. Controller processor 660 then generates a command (661 or 663) and sends the command (662 or 664) to the base station 620 to assign a channel frequency, time slot and training sequence to the remote station 123. The method then moves back to the start block 601 and the steps above are repeated.

Figure 11:
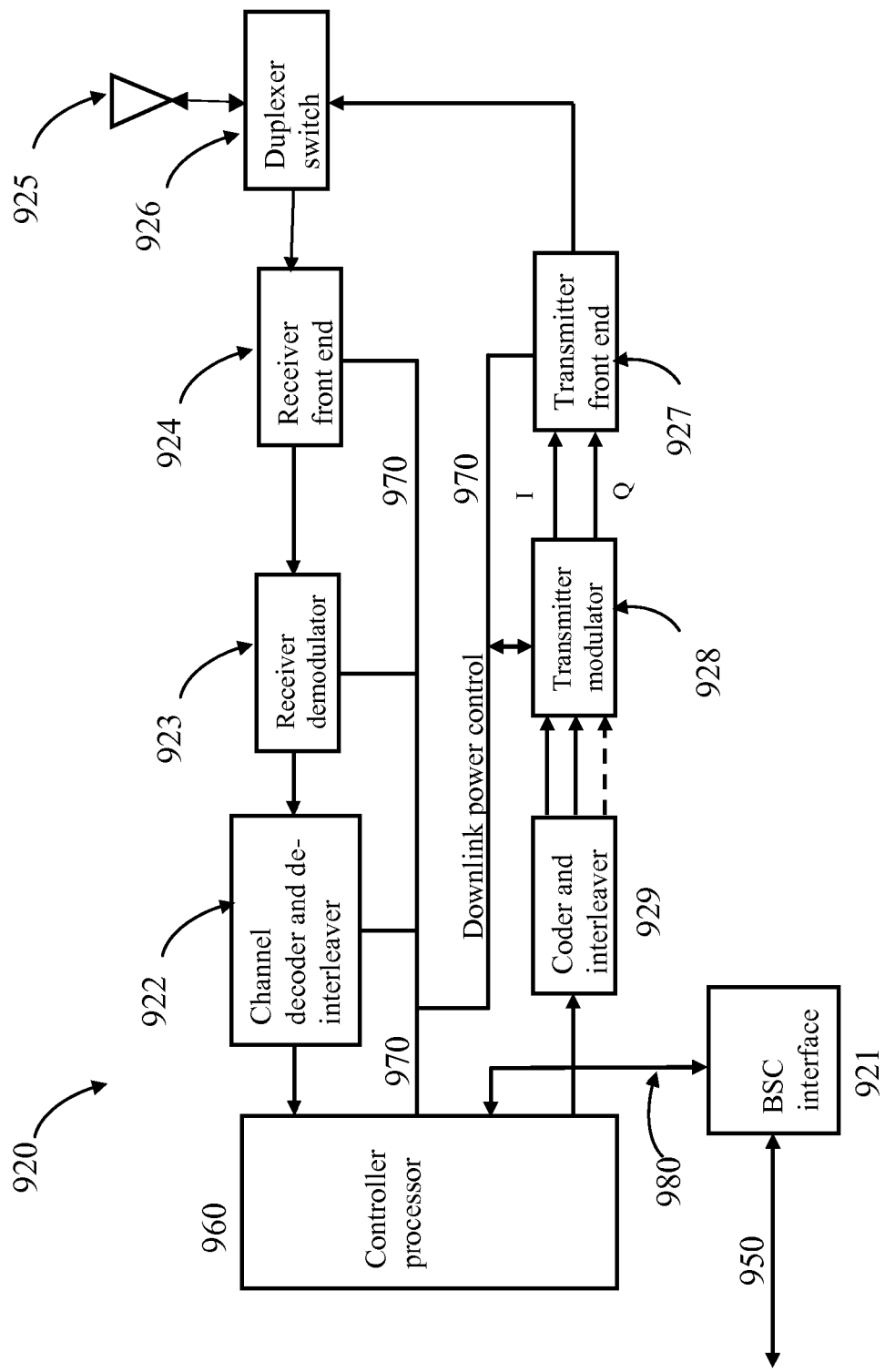
FIG. 11 shows a base station in aspects illustrating the flow of signals in a base station.

FIG. 11 of the accompanying drawings shows the flow of signals in a base station 620, 920. Base station controller interface 921 communicates, via communications link 950, with a base station controller 600. Communications link 950 might be a data cable or a RF link for example. Controller processor 960 communicates with and controls, via data bus 970, receiver components 922, 923 and 924, and transmitter components 927, 928, and 929. Controller processor 960 communicates via data bus 980 with BSC interface 921. The data bus 970 could comprise just one bus or several buses and could be partly or wholly bi-directional. Data buses 970 and 980 could be the same bus.

In one example, a message requesting grant of a channel is received from a remote station 123, 124 in a coded, modulated, radiated signal at base station antenna 925 and is input to duplexer switch 926. The signal passes from the receive port of duplexer switch 926 to the receiver front end 924 which conditions the signal (for example by means of down-converting, filtering, and amplifying). The receiver demodulator 923 demodulates the conditioned signal and outputs the demodulated signal to channel decoder and de-interleaver 922 which decodes and de-interleaves the demodulated signal and outputs the resulting data to controller processor 960. Controller processor 960 derives from the resulting data the message requesting grant of a channel. Controller processor 960 sends the message via base station controller interface 921 to a base station controller 600. The base station controller 600 then acts to grant, or not grant, a channel to the remote station 23, 24, either autonomously or together with mobile switching centre 610.

Base station controller 600 generates and sends access grant commands, and other digital communication signals or traffic for remote stations 123, 124, for example assignment messages, to BSC interface 921 via communications link 950. The signals are then sent via data bus 980 to controller processor 960. Controller processor 960 outputs signals for remote stations 123, 124 to coder and interleaver 929 and the coded and interleaved signals then pass to transmitter modulator 928. It can be seen from FIG. 11 that there are several signals input to transmitter modulator 928, each signal for a remote station 123, 124. These several signals can be combined within transmitter modulator 928 to provide a combined modulated signal having I and Q components as shown in FIG. 11. However the combining of the several signals could alternatively be performed post-modulation within transmitter front end module 927 and or in other stages within the transmit chain. The modulated combined signal is output from transmitter front end 927 and input to the transmit port of duplexer switch 926. The signal is then output via the common or antenna port of duplexer switch 926 to the antenna 925 for transmission.

In another example, a second message from a second remote station 123, 124 requesting grant of a channel is received in a second received signal at the base station antenna 925. The second received signal is processed as described above and the request for grant of a channel is sent in the processed second received signal to the base station controller 600.

The base station controller 600 generates and sends to the base station 620, 920 a second access grant message as described above, and the base station 620, 920 transmits a signal comprising the second access grant message, as described above, for the remote station 123, 124.

Figure 12:
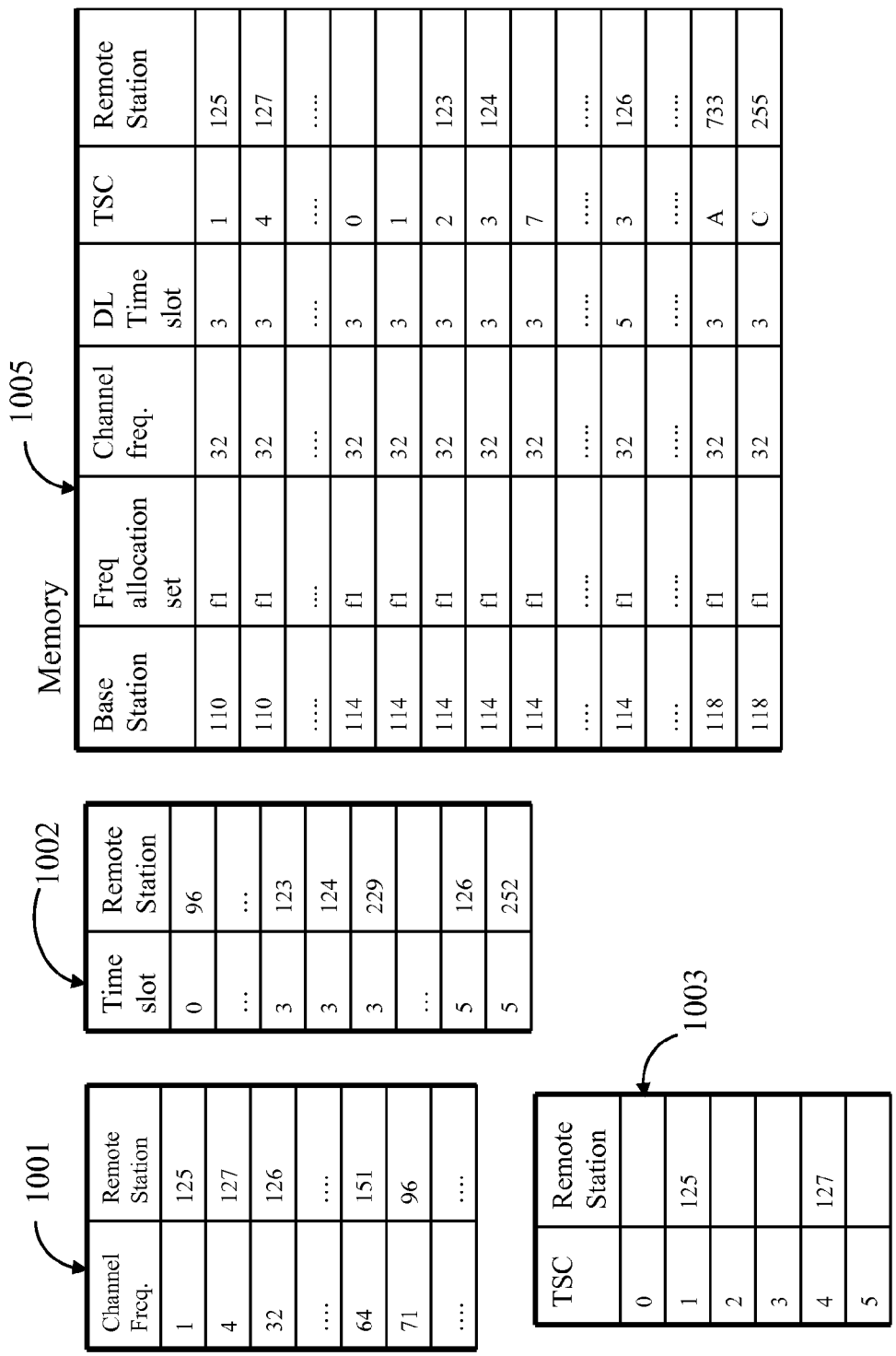
FIG. 12 shows example arrangements for data storage within a memory subsystem which might reside within a base station controller (BSC) of a cellular communication system.

FIG. 12 of the accompanying drawings shows example arrangements for data storage within a memory subsystem 650 which might reside within a base station controller (BSC) 600 of the present method and apparatus of cellular communication system 100. Table 1001 of FIG. 12 is a table of values of channel frequencies assigned to remote stations 123-127, the remote stations 123-127 being numbered. Table 1002 is a table of values of time slots wherein remote station numbers 123-127 are shown against time slot number. It can be seen that time slot number 3 is assigned to remote stations 123, 124 and 229. Similarly table 1003 shows a table of data allocating training sequences (TSCs) to remote stations 123-127.

Table 1005 of FIG. 12 shows an enlarged table of data which is multi-dimensional to include all of the parameters shown in tables 1001, 1002, and 1003 just described. It will be appreciated that the portion of table 1005 shown in FIG. 12 is only a small part of the complete table that would be used. Table 1005 shows in addition the allocation of frequency allocation sets, each frequency allocation set corresponding to a set of frequencies used in a particular sector of a cell or in a cell. In Table 1005, frequency allocation set f1 is assigned to all remote stations 123-127 shown in the table 1005 of FIG. 12. It will be appreciated that other portions of Table 1005, which are not shown, will show frequency allocation sets f2, f3 etc. assigned to other remote stations 123-127. The fourth row of data shows no values but repeated dots indicating that there are many possible values not shown between rows 3 and 5 of the data in table 1001.

Phase Shift

The absolute phase of the modulation for the two signals transmitted by the base station 110, 111, 114 may not be identical. In order to serve additional users using the same channel (co-TCH), in addition to providing more than one TSC, the network may phase shift the symbols of the RF signal of the new co-channel (co-TCH) remote station with respect to the existing co-TCH remote station(s). If possible the network may control them with evenly distributed spaced phase shift, thus improving receiver performance. For example, the phase shift of the carrier frequency (having a particular ARFCN) for two users would be 90 degrees apart, three users 60 degrees apart. The phase shift of the carrier (ARFCN) for four users would be 45 degree apart. As stated above, the users will use different TSCs. Each additional MS 123-127 of the present method and apparatus is assigned a different TSC and uses its own TSC and the DARP feature to get its own traffic data.

Thus, for improved DARP performance, the two signals intended for the two different mobile stations (remote stations) 123, 124 may ideally be phase shifted by π/2 for their channel impulse response, but less than this will also provide adequate performance.

When the first and second remote stations 123, 124 are assigned the same channel (i.e. same time slot on the same channel frequency), signals may preferably be transmitted to the two remote stations 123, 124 (using different training sequences as described previously) such that the modulator 928 modulates the two signals at 90 degrees phase shift to each other, thus further reducing interference between the signals due to phase diversity. So, for example, the I and Q samples emerging from the modulator 928 could each represent one of the two signals, the signals being separated by 90 degrees phase. The modulator 928 thus introduces a phase difference between the signals for the two remote stations 123, 124.

In the case of several remote stations 123, 124 sharing the same channel, multiple sets of I and Q samples can be generated with different offsets. For example, if there is a third signal for a third remote station 123, 124 on the same channel, the modulator 928 introduces phase shifts of preferably 60 degrees and 120 degrees for the second and third signals relative to the phase of the first signal, and the resulting I and Q samples represent all three signals. For example, the I and Q samples could represent the vector sum of the three signals.

In this way, the transmitter modulator 928 provides means at the base station 620, 920 for introducing a phase difference between contemporaneous signals using the same time slot on the same frequency and intended for different remote stations 123, 124. Such means can be provided in other ways. For example, separate signals can be generated in the modulator 928 and resulting analogue signals can be combined in the transmitter front end 927 by passing one of them through a phase shift element and then simply summing the phase shifted and non-phase shifted signals.

Power Control Aspects

Table 2 below shows example values of channel frequency, time slot, training sequence and received signal power level for signals transmitted by the two base stations 110 and 114 as shown in FIG. 5 and received by remote stations 123 to 127.

TABLE 2

| Row 1 | BASE STATION transmitting the signal | Remote station 1 receiving the signal | Base Station 1 serving Remote station 1 | Remote station for which the signal is intended | Channel frequency. | Downlink TS | TSC | MS Received power level of signal | Signal category |
|---|---|---|---|---|---|---|---|---|---|
| 2 | 114 | 126 | 114 | 126 | 32 | 5 | TSC 3 | −33 dBm | Wanted |
| 3 | 114 | 123 | 114 | 123 | 32 | 3 | TSC 2 | −67 dBm | Wanted |
| 4 | 114 | 124 | 114 | 124 | 32 | 3 | TSC 3 | −102 dBm | Wanted |
| 5 | 114 | 123 | 114 | 124 | 32 | 3 | TSC 3 | −67 dBm | interferer |
| 6 | 114 | 124 | 114 | 123 | 32 | 3 | TSC 2 | −102 dBm | interferer |
| 7 | 114 | 125 | 110 | 124 | 32 | 3 | TSC 3 | −105 dBm | interferer |
| 8 | 110 | 124 | 114 | 125 | 32 | 3 | TSC 1 | −99 dBm | interferer |
| 9 | 110 | 125 | 110 | 125 | 32 | 3 | TSC 1 | −101 dBm | Wanted |
| 10 | 110 | 127 | 110 | 127 | 32 | 3 | TSC 4 | −57 dBm | Wanted |

The rows 3 and 4 of Table 2, outlined by a bold rectangle, show both remote station 123 and remote station 124 using channel frequency having index 32 and using time slot 3 for receiving a signal from base station 114 but allocated different training sequences TSC2 and TSC3 respectively. Similarly, rows 9 and 10 also show the same channel frequency and time slot being used for two remote stations 125, 127 to receive signals from the same base station 110. It can be seen that in each case the remote station 125, 127 received power levels of the wanted signals are substantially different for the two remote stations 125, 127. The highlighted rows 3 and 4 of Table 3 show that base station 114 transmits a signal for remote station 123 and also transmits a signal for remote station 124. The received power level at remote station 123 is −67 dBm whereas the received power level at remote station 124 is −102 dBm. Rows 9 and 10 of Table 3 show that base station 110 transmits a signal for remote station 125 and also transmits a signal for remote station 127. The received power level at remote station 125 is −101 dBm whereas the received power level at remote station 127 is −57 dBm. The large difference in power level, in each case, could be due to different distances of the remote stations 125, 127 from the base station 110. Alternatively the difference in power levels could be due to different path losses or different amounts of multipath cancellation of the signals, between the base station transmitting the signals and the remote station receiving the signals, for one remote station as compared to the other remote station.

Although this difference in received power level for one remote station compared to the other remote station is not intentional and not ideal for cell planning, it does not compromise the operation of the present method and apparatus.

A remote station 123-127 having DARP capability may successfully demodulate either one of two co-channel, contemporaneously received signals, so long as the amplitudes or power levels of the two signals are similar at the remote station's 123-127 antenna. This is achievable if the signals are both transmitted by the same base station 110, 111, 114 and (could have more than one antenna, e.g., one per signal) the power levels of the two transmitted signals are substantially the same because then each remote station 123-127 receives the two signals at substantially the same power level (say within 6 dB of each other). The transmitted powers are similar if either the base station 110, 111, 114 is arranged to transmit the two signals at similar power levels, or the base station 110, 111, 114 transmits both signals at a fixed power level. This situation can be illustrated by further reference to Table 2 and by reference Table 3.

While Table 2 shows remote stations 123, 124 receiving from base station 114 signals having substantially different power levels, on closer inspection it can be seen that, as shown by rows 3 and 5 of Table 2, remote station 123 receives two signals from base station 114 at the same power level (−67 dBm), one signal being a wanted signal intended for remote station 123 and the other signal being an unwanted signal which is intended for remote station 124. The criteria for a remote station 123-127 to receive signals having similar power levels is thus shown as being met in this example. If mobile station 123 has a DARP receiver, it can, in this example, therefore demodulate the wanted signal and reject the unwanted signal.

Similarly, it can be seen by inspecting rows 4 and 6 of Table 2 (above) that remote station 124 receives two signals sharing the same channel and having the same power level (−102 dBm). Both signals are from base station 114. One of the two signals is the wanted signal, for remote station 124 and the other signal is the unwanted signal which is intended for use by remote station 123.

To further illustrate the above concepts, Table 3 is an altered version of Table 2 wherein the rows of Table 2 are simply re-ordered. It can be seen that remote stations 123 and 124 each receive from one base station 114 two signals, a wanted and an unwanted signal, having the same channel and similar power levels. Also, remote station 125 receives from two different base stations 110, 114 two signals, a wanted and an unwanted signal, having the same channel and similar power levels.

maintain a call with two remote stations 123-127 using the same channel, such that a first remote station 123-127 has a DARP-enabled receiver and a second remote station 123-127 does not have a DARP-enabled receiver. The amplitudes of signals received by the two remote stations 124-127 are arranged to be different by an amount which is within a range of values, in one example it may be between 8 dB and 10 dB, and also arranged such that the amplitude of the signal intended for the DARP-enabled remote station is lower than the amplitude of the signal intended for the non-DARP-enabled remote station 124-127.

A MUROS or non-MUROS mobile may treat its unwanted signal as interference. However, for MUROS, both signals may be treated as wanted signals in a cell. An advantage with MUROS enabled networks (e.g., BS and BSC) is that the BS 110, 111, 114 may use two or more training sequences per timeslot instead of only one so that both signals may be treated as desired signals. The BS 110,111, 114 transmits the signals at suitable amplitudes so that each mobile of the present method and apparatus receives its own signal at a high enough amplitude and the two signals maintain an amplitude ratio such that the two signals corresponding to the two training sequences may be detected. This feature may be implemented using software stored in memory in the BS 110, 111, 114 or BSC 600. For example, MSs 123-127 are selected for pairing based on their path losses and based on existing traffic channel availability. However, MUROS can still work if the path losses are very different for one mobile than for the other mobile 123-127. This may occur when one mobile 123-127 is much further away from the BS 110, 111, 114.

Regarding power control there are different possible combinations of pairings. Both MSs 123-127 can be DARP capable or only one DARP capable. In both cases, the received amplitudes or power levels at the mobiles 123-127 may be within 10 dB of each other and the same goes for MS 2. However if only one MS is DARP capable, a further constraint is that the non-DARP mobile 123-127 has its wanted (or desired) first signal higher than the second signal (in one example, at least 8 dB higher than the second signal). The DARP capable mobile 123-127 receives its second signal no more than a lower threshold below the first signal (in one example, it is no lower than 10 dB). Hence in one example, the

TABLE 3

| Row 1 | BASE STATION transmitting the signal | Remote station 1 receiving the signal | Base Station 1 serving Remote station 1 | Remote station for which the signal is intended | Channel frequency. | Downlink TS | TSC | MS Received power level of signal | Signal category |
|---|---|---|---|---|---|---|---|---|---|
| 2 | 114 | 126 | 114 | 126 | 32 | 5 | TSC 3 | −33 dBm | wanted |
| 3 | 114 | 123 | 114 | 123 | 32 | 3 | TSC 2 | −67 dBm | wanted |
| 4 | 114 | 123 | 114 | 124 | 32 | 3 | TSC 3 | −67 dBm | interferer |
| 5 | | | | | | | | | |
| 6 | 114 | 124 | 114 | 123 | 32 | 3 | TSC 2 | −102 dBm | interferer |
| 7 | 114 | 124 | 114 | 124 | 32 | 3 | TSC 3 | −102 dBm | wanted |
| 8 | 110 | 124 | 114 | 125 | 32 | 3 | TSC 1 | −99 dBm | interferer |
| 9 | | | | | | | | | |
| 10 | 114 | 125 | 110 | 124 | 32 | 3 | TSC 3 | −105 dBm | interferer |
| 11 | 110 | 125 | 110 | 125 | 32 | 3 | TSC 1 | −101 dBm | wanted |
| | 110 | 127 | 110 | 127 | 32 | 3 | TSC 4 | −57 dBm | wanted |

The apparatus and method described above have been simulated and the method has been found to work well in a GSM system. The apparatus described above and shown in FIGS. 8A, 8B, 10A, 11 and 12 could be part of a base station 110, 111, 114 of a GSM system for example.

According to another aspect of the present method and apparatus it is possible for a base station 110, 111, 114 to amplitude ratio can be 0 dB to ±10 dB for DARP/DARP capable remote stations 123-127 or an 8 dB to 10 dB higher signal for non-DARP/DARP in favour of the non-DARP mobile. Also, it is preferable for the BS 110, 111, 114 to transmit the two signals so that each MS 123-127 receives its wanted signal above its sensitivity limit (In one example, it is at least 6 dB above its sensitivity limit) So if one MS 123-127 has more path loss, the BS 110, 111, 114 transmits that MS's signal at an amplitude appropriate to achieve this. This sets the absolute amplitude. The difference from the other signal then determines the absolute amplitude of that other signal.

Figure 13:
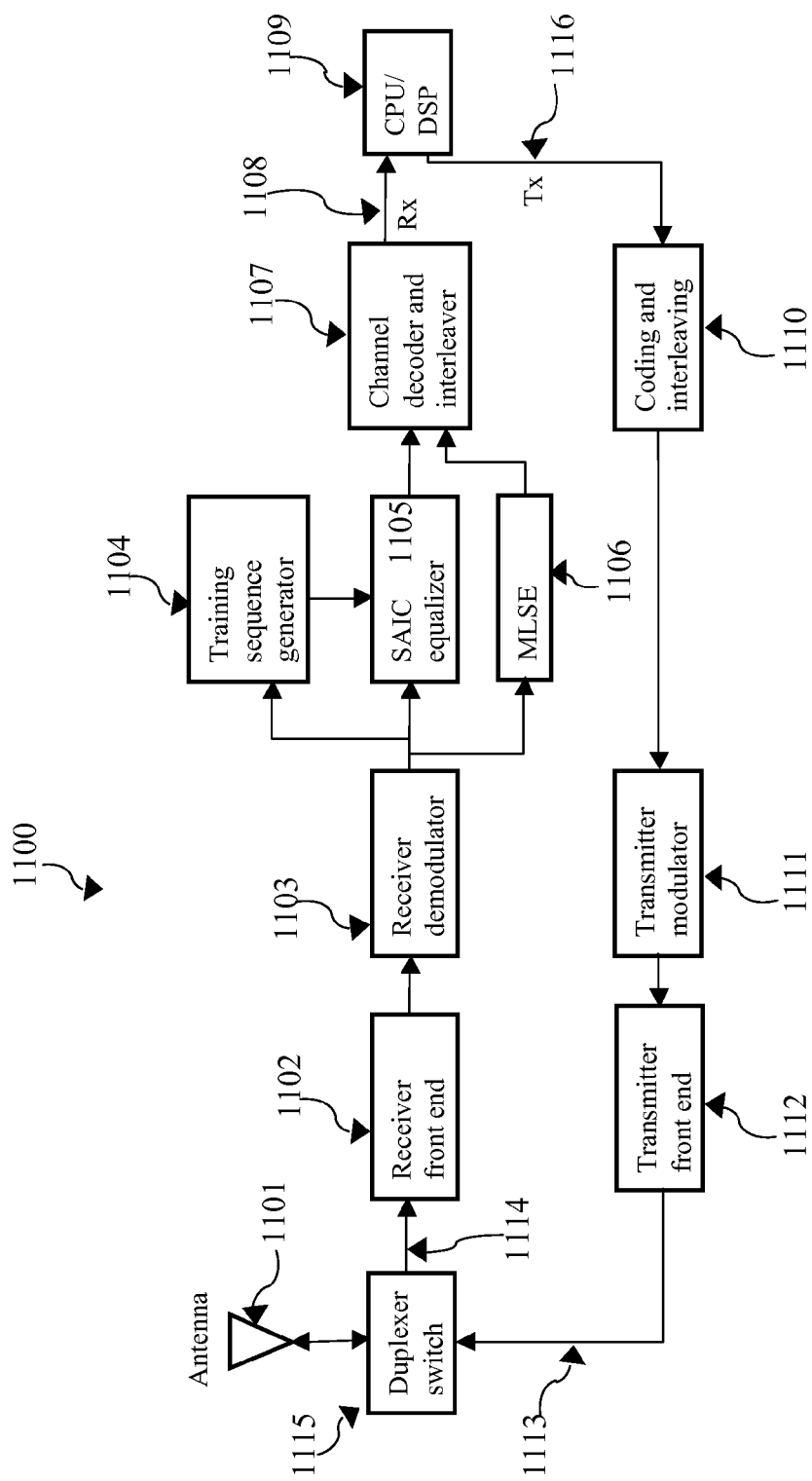
FIG. 13 shows an example receiver architecture for a remote station having the DARP feature of the present method and apparatus.

FIG. 13 of the accompanying drawings shows an example receiver architecture for a remote station 123-127 of the present method and apparatus having the DARP feature. In one example, the receiver is adapted to use either the single antenna interference cancellation (SAIC) equalizer 1105, or the maximum likelihood sequence estimator (MLSE) equalizer 1106. Other equalizers implementing other protocols may also be used. The SAIC equalizer is preferred for use when two signals having similar amplitudes are received. The MLSE equalizer is typically used when the amplitudes of the received signals are not similar, for example when the wanted signal has an amplitude much greater than that of an unwanted co-channel signal.

Figure 14:
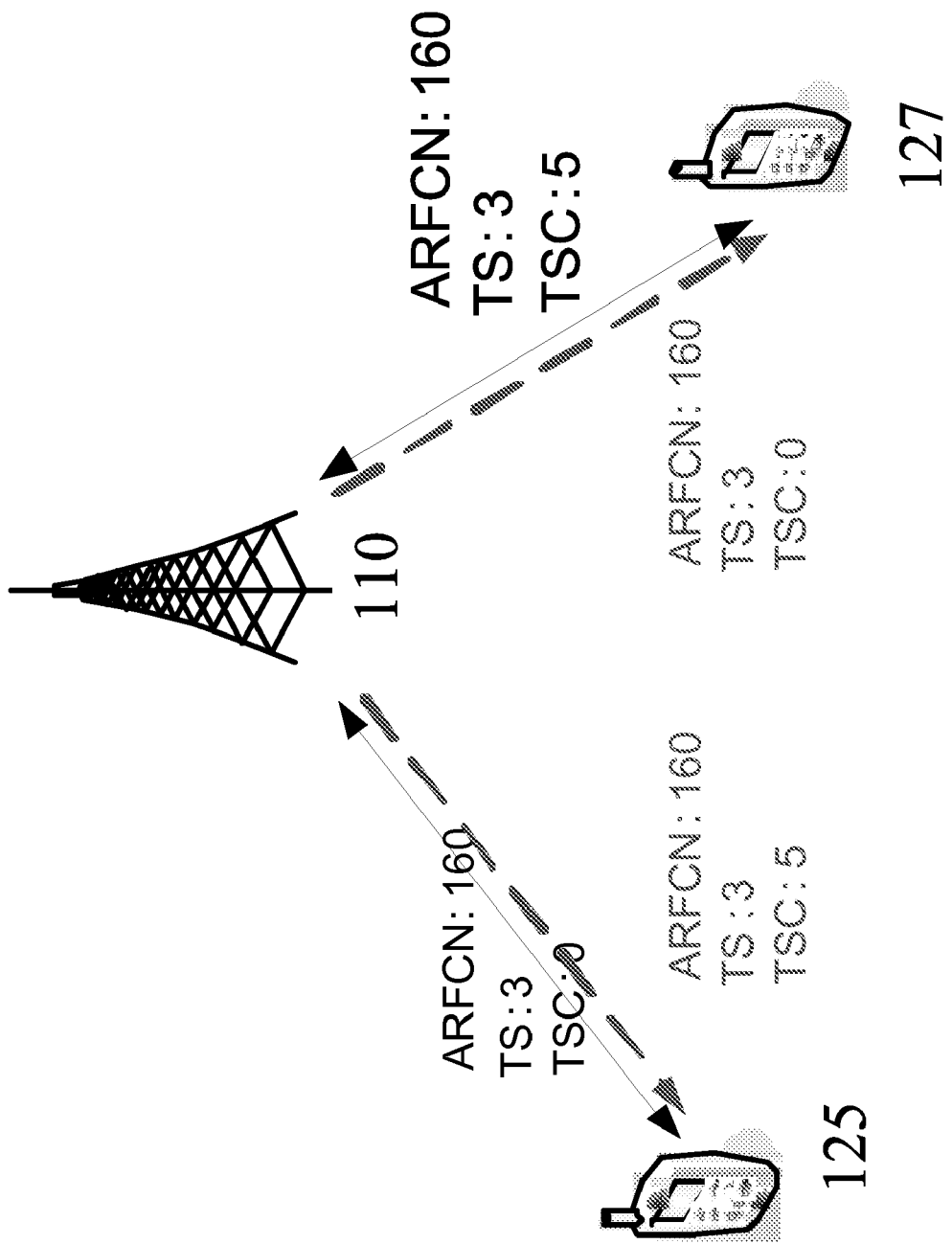
FIG. 14 shows part of a GSM system adapted to assign the same channel to two remote stations.

FIG. 14 of the accompanying drawings shows a simplified representation of part of a GSM system adapted to assign the same channel to two remote stations 123-127. The system comprises a base station transceiver subsystem (BTS), or base station 110, and two remote stations, mobile stations 125 and 127. The network can assign, via the base station transceiver subsystem 110, the same channel frequency and the same time slot to the two remote stations 125 and 127. The network allocates different training sequences to the two remote stations 125 and 127. Remote stations 125 and 127 are both mobile stations and are both assigned a channel frequency having ARFCN equal to 160 and a time slot with time slot index number, TS, equal to 3. Remote station 125 is assigned training sequence a TSC of 5 whereas 127 is assigned training sequence a TSC of 0. Each remote station 125, 127 will receive its own signal (shown by solid lines in the figure) together with the signal intended for the other remote station 125, 127 (shown by dotted lines in the figure). Each remote station 125, 127 is able to demodulate its own signal whilst rejecting the unwanted signal.

As described above, according to the present method and apparatus a single base station 110, 111, 114 can transmit a first and second signal, the signals for first and second remote stations 123-127 respectively, each signal transmitted on the same channel, and each signal having a different training sequence. The first remote station 123-127 having DARP capability is able to use the training sequences to distinguish the first signal from the second signal and to demodulate and use the first signal, when the amplitudes of the first and second signals are substantially within, say, 10 dB of each other.

In summary, FIG. 14 shows that the network assigns the same physical resources to two mobile stations, but allocates different training sequences to them. Each mobile will receive its own signal (shown as a solid line in FIG. 14) and that intended for the other co-TCH user (shown as a dotted line in FIG. 14). On the downlink, each mobile station will consider the signal intended for the other mobile station as a CCI and reject the interference. Thus, two different training sequences may be used to suppress the interference from another MUROS user.

Pairing of MSs

According to how the present method and apparatus is implemented, it may be useful to identify which of the MSs connected to a particular BS are MUROS-capable without replying on radio access capability of MUROS classmark (as it is desirable to pair with legacy UE with MUROS UE). It is possible that the BS could identify an MS's DARP capability by requesting the MS's classmark. A classmark is a declaration from a MS to a BS of its capabilities. This is described in 24.008 of TS10.5.1.5-7 in the GERAN standards. Currently, the standards define a classmark indicative of an MS's DARP capability but so far, no MUROS classmark or supporting of new training sequence classmark has been defined. Therefore, it is not possible to identify whether or not an MS is MUROS capable using the classmark for a leagacy MS. Additionally, despite the definition of a DARP classmark in the standards, the standards do not require the MS to send the classmark to the BS to inform the BS of its capabilities. In fact, many manufacturers do not design their DARP-capable MSs to send the DARP classmark to the BS on call setup procedures for fear that their MSs will automatically be assigned to noisier channels by the BS, thereby potentially degrading the communication from that MS. It is therefore currently not possible to identify with any certainty, whether an MS is MUROS-capable or even DARP-capable. It is desirable to let legacy MS to play a part in MUROS operation, as they do have the capability to doing that. The current issue is that there is no signaling to support that.

In theory, it would be possible for a BS to identify MUROS-capability in an MS based on the International Mobile Equipment Identity (IMEI) of the MS. The BS can establish the MS's IMEI by requesting it directly from the MS. The IMEI is unique to the MS and can be used to reference a database located anywhere in the network, thereby identifying the model of mobile phone to which the MS belongs, and additionally its capabilities such as DARP and MUROS. If the phone is DARP or MUROS capable, it will be considered by the BS as a candidate for sharing a slot with another suitable MS. However, while using the IMEI is theoretically possible, DARP or MUROS capability alone is not a sufficient criterion for determining whether a particular MS can share a TDMA slot with another MS. In operation, the BS will build up a list of MSs currently connected to that BS which are DARP or MUROS capable. The identification of MSs able to share a particular slot considers other criteria.

Figure 35:
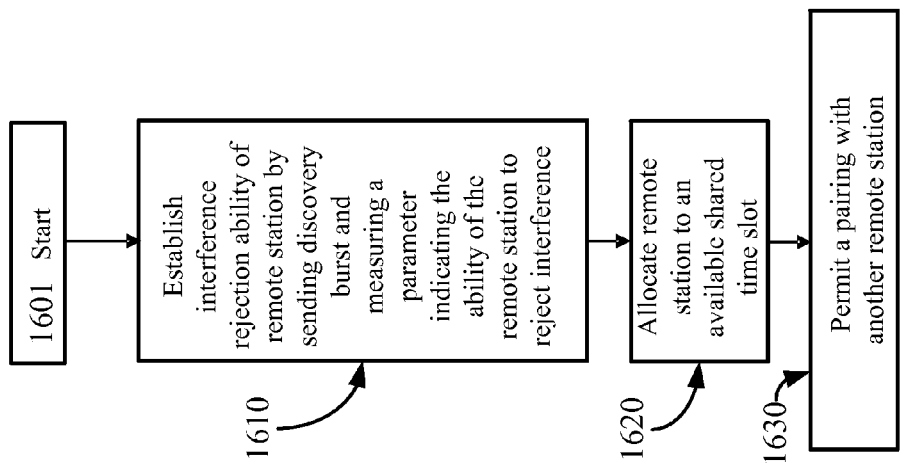
FIG. 35 is a flowchart comprising steps taken by a base station to identify MUROS-capability in a remote station.

Firstly, the interference rejection ability of the MS in a given noisy environment could be established. (See step 1610 of flowchart in FIG. 35). This knowledge is used to allocate the MS to the most suitable available shared slot. (See step 1620 of flowchart in FIG. 35). It is also used to permit the best pairing with other candidate MSs. (See step 1630 of flowchart in FIG. 35). One way of determining the interference rejection capability of an MS is to send a 'discovery burst'. This is a short radio burst in which a signal desired to be received by the MS has a known interference pattern superimposed on it. The discovery burst contains a basic speech signal with a superimposed CCI signal at controlled power levels. When sending the discovery burst, a different training sequence to the one being used for the call currently in operation is sent. This distinguishes the discovery burst from the actual voice signal.

In a particular implementation of the present method and apparatus, the Bit Error Probability (BEP) is measured. (Other parameters indicating ability of the remote station to reject interference may also be used as discussed below). This is sent in the MS's periodic report back to the BS. In the GERAN standards, the BEP is represented by the values 0-31 with 0 corresponding to a probability of bit error of 25% and 31 corresponding to a probability of 0.025%. In other words, the higher the BEP, the greater the ability of the MS to reject interference. The BEP is reported as part of an "enhanced measurement report." Once the burst has been sent, if the BEP of the MS falls below a given threshold, in the following report, the MS is considered to be unsuitable for MUROS operations. In simulations, a BEP of at least 25 has been shown to be an advantageous choice of threshold. It is of note that the BEP is derived by sending a burst over the channel and measuring the number of errors occurring in the burst at the MS. However, the BEP on its own may not be an accurate enough measure of the qualities of the MS and the channel, particularly if there is a dramatic variation of error frequency across the burst. It may therefore be preferable to base the MUROS operation decision on the mean BEP taking account of the co-variance of the BEP (CVBEP). These two quantities are mandated by the standards as being present in the report the MS sends to the BS.

Alternatively, the decision could be based on the RxQual parameter returned to the BS by the MS for one SACCH period (0.48 ms). RxQual is a value between 0-7 where each value corresponds to an estimated number of bit errors in a number of bursts (see 3GPP TS 05.08). This is a standards defined measurement of reception quality consisting of eight levels and corresponds to the Bit Error Rate (BER) of the received signal. The higher the error rate, the higher RxQual. Simulations have shown an RxQual of 2 or lower to be an advantageous choice of threshold for MUROS operation.

Alternatively, the parameter RxLev may equally be used as a selection criteria. RXLEV indicates the average signal strength received in dBm. This would also be reported to the MS after the discovery burst. An RxLev of at least 100 dBm has been shown to be advantageous. While particular criteria for MUROS pairing have been described, it would be plain to the skilled person that many other criteria could be used instead or in combination with those identified above.

Joint Detection on the Uplink

The present method and apparatus uses GMSK and the DARP capability of the handset to avoid the need for the network to support a new modulation method. A network may use existing methods on the uplink to separate each user, e.g., joint detection. It uses co-channel assignment where the same physical resources are assigned to two different mobiles, but each mobile is assigned a different training sequence. On the uplink each mobile station 123-127 of the present method and apparatus may use a different training sequence. The network may use a joint detection method to separate two users on the uplink.

Speech Codec and Distance to New User

To reduce the interference to other cells, the BS 110, 111, 114 controls its downlink power relative to the remote or mobile station's distance from it. When the MS 123-127 is close to the BS 110, 111, 114, the RF power level transmitted by the BS 110, 111, 114 to the MS 123-127 on the downlink may be lower than to remote stations 123-127 that are further away from the BS 110, 111, 114. The power levels for the co-channel users are large enough for the caller who is further away when they share the same ARFCN and timeslot. They can both have the same level of the power, but this can be improved if the network considers the distance of co-channel users from the base station 110, 111, 114. In one example, power may be controlled by identifying the distance and estimate the downlink power needed for the new user 123-127. This can be done through the timing advance (TA) parameter of each user 123-127. Each user's 123-127 RACH provides this info to the BS 110, 111, 114.

Similar Distances for Users

Another novel feature is to pick a new user with a similar distance as a current/existing user. The network may identify the traffic channel (TCH=ARFCN and TS) of an existing user who is in the same cell and at similar distance and needs roughly the same power level identified above. Also, another novel feature is that the network may then assign this TCH to the new user with a different TSC from the existing user of the TCH.

Selection of Speech Codec

Another consideration is that the CCI rejection of a DARP capable mobile will vary depending on which speech codec is used. Thus, the network (NW) may use this criteria and assign different downlink power levels according to the distance to the remote station 123-127 and the codecs used. Thus, it may be better if the network finds co-channel users who are of similar distance to the BS 110, 111, 114. This is due to the performance limitation of CCI rejection. If one signal is too strong compared to the other, the weaker signal may not be detected due to the interference. Therefore, the network may consider the distance from the BS 110, 111, 114 to new users when assigning co-channels and co-timeslots. The following are procedures which the network may execute to minimize the interference to other cells:

Frequency Hopping to Achieve User Diversity and Take Full Advantage of DTx

Voice calls can be transmitted with a DTx (discontinuous transmission) mode. This is the mode that the allocated TCH burst can be quiet for the duration of no speech (while one is listening). The benefit of that when every TCH in the cell uses DTx is to reduce the overall power level of the serving cell on both UL and DL, hence the interference to others can be reduced. This has significant effect, as normally people do have 40% of time listening. The DTx feature can be used in MUROS mode as well to achieve the know benefit as stated.

There is an extra benefit for MUROS to be achieved when frequency hopping is used to establish user diversity. When two MUROS users pair together, there could be some period of time both MUROS paired users are in DTx. Although this is a benefit to other cells as stated above, neither of the MUROS paired users get the benefit from each other. For this reason, when both are in DTx, the allocated resources are wasted. To take the advantage of this potentially helpful DTx period, one can let frequency hopping to take place so that a group of users are pairing with each other dynamically on every frame basis. This method introduces user diversity into the MUROS operation, and reduces the probability that both paired MUROS users are in DTx. It also increases the probability of having one GMSK on the TCH. Benefits include increasing the performance of speech calls and maximizing the overall capacity of the NW.

An example of such case can be illustrated: Suppose the NW identified 8 MUROS callers using full rate speech codecs, A, B, C, D, T, U, V, W, who use similar RF power. Callers A, B, C, D can be non-frequency hopping. In addition, callers A, B, C, D are on the same timeslot, say TS3, but use four different frequencies, ARFCN f1, f2, f3 and f4. Callers T, U, V, W are frequency hopping. In addition, callers T, U, V, W are on the same timeslot TS3 and use frequencies f1, f2, f3 and f4 (MA list). Suppose they are given HSN=0, and MAIO 0, 1, 2 and 3 respectively. This will let A, B, C, D pair with T, U, V, W in a cyclic form as shown in the table below.

| Frame No. | 0 | 1 | 2 | 3 | 4 | 5 | 6 | 7 | 8 | 9 | 10 | 11 |
|---|---|---|---|---|---|---|---|---|---|---|---|---|
| f1 | A/T | A/W | A/V | A/U | A/T | A/W | A/V | A/U | A/T | A/W | A/V | A/U |
| f2 | B/U | B/T | B/W | B/V | B/U | B/T | B/W | B/V | B/U | B/T | B/W | B/V |
| f3 | C/V | C/U | C/T | C/W | C/V | C/U | C/T | C/W | C/V | C/U | C/T | C/W |
| f4 | D/W | D/V | D/U | D/T | D/W | D/V | D/U | D/T | D/W | D/V | D/U | D/T |

The above is only an example. This form is selected to show how it works. However it should not be limited to this particular arrangement. It works even better if more randomness of pairing is introduced. This can be achieved by put all of 8 users on frequency hopping on the four MA list, and give them different HSNs (in the above example 0 to 3) and MAIOs, provided two users are each ARFCN.

Data Transfer

The first method pairs the traffic channel (TCH) being used. In one example, this feature is implemented on the network side, with minor or no changes made on the remote station side 123-127. The network allocates a TCH to a second remote station 123-127 that is already in use by a first remote station 123-127 with a different TSC. For example, when all the TCHs have been used, any additional service(s) required will be paired with the existing TCH(s) that is (are) using similar power. For example, if the additional service is a 4D1U data call, then the network finds four existing voice call users that use four consecutive timeslots with similar power requirement to the additional new remote station 123-127. If there is no such match, the network can reconfigure the timeslot and ARFCN to make a match. Then the network assigns the four timeslots to the new data call which needs 4D TCH. The new data call also uses a different TSC. In addition, the uplink power for the additional one may brought to be close or to equal the uplink power of the remote station 123-127 already using the timeslot.

Assign a Remote Station 123-127 More than One TSC

If considering data services which use more than one timeslot, all (when it is even) or all but one (when it is odd) of the timeslots may be paired. Thus, improved capacity may be achieved by giving the MS 123-127 more than one TSCs. By using multiple TSCs, the remote station 123-127 may, in one example, combine its paired timeslots into one timeslot so that the actual RF resource allocation may be cut by half. For example, for 4 DL data transfer, suppose that the MS currently has bursts B1, B2, B3 and B4 in TS1, TS2, TS3 and TS4 in each frame. Using the present method, B1 and B2 are assigned one TSC, say TSC0, while B3 and B4 have a different TSC, say TSC1. The, B1 and B2 may be transmitted on TS1, and B3 and B4 may be transmitted on TS2 in the same frame. In this way, the previous 4 DL-assignment just uses two timeslots to transmit four bursts over the air. The SAIC receiver can decode B1 and B2 with TSC0, and B3 and B4 with TSC1. Pipeline processing of decoding the four bursts may make this feature work seamlessly with conventional approaches.

Combining Timeslots

Combining one user's even number of timeslots may halve the over the air (OTA) allocation, saving battery energy. This also frees additional time for scanning and/or monitoring of neighbor cells and system information update for both serving cell and neighbor cells. There are some further features on the network side. The network may make the additional assignment of co-channel, co-time slot (co-TS) based on the distance of the new users. Initially the network may use the TCH whose users are at a similar distance. This can be done through timing TA of each user. Each user's RACH provides this info to the BS 110, 111, 114.

Changes in Network Traffic Assignment

The above also means that if two co-channel, co-TS users are moving in different directions one moving towards the BS and the other moving away from the BS, there will be a point that one of them will switch to another TCH that has a better match of the power level. This should not be a problem, as the network may be continuously re-allocating the users on different ARFCN and TS. Some further optimization may be helpful, such as optimizing selection of the new TSC to be used, as this is related with the frequency reuse pattern in the local area. One advantage of this feature is that it uses mainly software changes on network side. e.g., BS and BSC. Changes on network traffic channel assignment may increase the capacity.

Co-Channel Operation for Both Voice and Data

Further improvements may be made. First, Co-TCH (co-channel and co-timeslot) may be used for voice calls as well as for data calls on the same TCH to improve capacity-data rate. This feature may be applied to GMSK modulated data services, such as CS1 to 4 and MCS1 to 4. 8 PSK.

Fewer Timeslots Used

This feature may be applied to reuse of co-channel (co-TCH) on data calls to achieve increased capacity. Two timeslots of data transfer may be paired and transmitted using one timeslot with two training sequences used in each of the corresponding bursts. They are assigned to the target receiver. This means that 4-timeslot downlink may be reduced to a 2-timeslot downlink, which saves power and time for the receiver. Changing from 4-timeslots to 2-timeslots gives the remote station more time to do other tasks, such monitoring NC, which will improve the hand off or HO.

The constraints of assignments with respect to Multi-slot Class configuration requirements such as Tra, Trb, Tta, Ttb-Dynamic and Extended Dynamic MAC mode rules may be relaxed. This means that there are more choices for the network to serve the demands from various callers in the cell. This reduces or minimizes the number of denied service requests. This increases the capacity and throughput from the network point of view. Each user can use less resources without compromise of QoS. More users can be served. In one example, this may be implemented as a software change on the network side, and remote station 123-127 is adapted to accept additional TSCs on top of its DARP capability. The changes on the network traffic channel assignment may increase the capacity-throughput. Use of uplink network resources can be conserved, even while the network is busy. Power can be saved on the remote station 123-127. Better handover performance and less restriction on network assigning data calls, and improved performance can be achieved.

Dual Carrier

The present method and apparatus may be used with dual carrier in addition, to improve performance. For improving data rate, there is a 3GPP specification which allocates dual carriers from which MS (or UE or remote station) can get two ARFCNs simultaneously in order to increase the data rate. Thus, the remote station uses more RF resources to get extra data throughput, which intensifies the stated issues above.

New TSCs

The present method and apparatus is an improvement to existing DARP capable components so that the network is able to use the co-TCH, i.e. co-channel (the ARFCN that is already in use) and co-timeslot (the timeslot that is already in use), to serve additional users and provide extra services by assigning different TSCs to the different remote stations 123-127. With a more advanced SAIC receiver (e.g., Qualcomm's eSAIC and eeSAIC), it is possible to accomodate a third or even fourth user/service on the same ARFCN and timeslot. One feature used to improve capacity is to use multiple TSCs on the co-TCH, i.e. if two users/services share the same TCH, then two TSCs are used; if three users/services share the same TCH, then three TSCs are used. The methods disclosed above may be used to take advantage of this feature for GERAN voice/data calls.

Using SAIC of a DARP capable receiver for multi-users on one slot of the present method and apparatus, two different training sequences are used for two remote stations sharing the same channel. Characteristics of the training sequences that are evaluated are auto-correlation and cross-correlation. Of these, cross-correlation is particularly useful to the present method and apparatus. The DARP function performs well with good cross-correlation. The cross-correlation of two training sequences can be viewed as a measure of mutual orthogonality. In simple terms, the more mutually orthogonal two training sequences are, the more easily the remote station's 123-127 receiver can distinguish one training sequence from the other training sequence.

Cross-correlation is quantified by means of a parameter known as cross-correlation ratio. If two training sequences are totally uncorrelated (which is an ideal condition never achieved in practice), then the cross-correlation between the training sequences is nil and the cross-correlation ratio for the two training sequences is zero.

By contrast, if two training sequences are perfectly correlated (which is the worst condition for co-channel operation and for DARP operation), then the cross-correlation between the sequences is maximized and the correlation ratio for the two training sequences is unity, i.e. equal to one.

It is possible to use two different existing training sequences shown in Table 4 to distinguish users in a MUROS call. Table 4 discloses the existing eight training sequences for existing GSM systems identified in section 5.2.3 of technical specification document 3GPP TS 45.002 V4.8.0 (2003-06) entitled "Technical Specification 3rd Generation Partnership Project; Technical Specification Group GSM/EDGE Radio Access Network; Multiplexing and multiple access on the radio path (Release 4)", published by the 3rd Generation Partnership Project (3GPP) standards-setting organization.

However that would reduce eight stand alone training sequence sets for frequency planning to four paired training sequence sets, which may be a bit restrictive to frequency planning Therefore, the present patent application identifies the following two new sets of training sequences which can work with existing training sequences defined in the GERAN specification. The new sets are sets of orthogonal training sequences. Existing training sequences can be used for legacy remote stations, while the new set of training sequences may be used for new remote stations capable of executing this new feature.

The new training sequences used have particularly advantageous correlation properties making them suited for use in a GSM implementation of the present method and apparatus. The new sequences have been specifically chosen to pair with existing sequences shown in Table 4. The new sequences are listed in Tables 5 and 6 below, and are described in more detail in the following text. While the present method and apparatus would operate satisfactorily where the two sequences used for channel sharing are chosen from the existing set (shown in Table 4 below), it has been determined that better performance can be obtained by means of the definition of, and use of the new, complementary sequences as training sequences in combination with the existing training sequences.

Therefore, in one example, applying the present method and apparatus to a GSM system, a base station 110, 111, 114 transmits both a first signal having a first training sequence and a second signal comprising a second training sequence which is a new training sequence complementary to the first training sequence. For example, the base station 110, 111, 114 transmits a first signal having a first training sequence identified by a code TSC0 (from Table 4) and a second signal comprising a second training sequence identified by a code TSC0' (from Tables 5 or 6), which is a new training sequence complementary to the first training sequence TSC0. The cross-correlation ratio between the first training sequence and the second, complementary new training sequence is very low. As a result of this low cross-correlation, the performance of the DARP receiver has been found to be particularly favorable when the first and second training sequences are used for two signals received simultaneously by the DARP receiver. The DARP receiver can better distinguish between the first and second signals and can better demodulate the first signal while rejecting the second signal, or demodulate the second signal while rejecting the first signal, depending upon which of the two training sequences has been allocated for the remote station 123-127 to use for communication.

The new sequences have cross correlation ratios of between 2/16 and 4/16 when correlated against a corresponding existing training sequence. The use of the additional new sequences delivers a further advantage, whereby more sequences are available for use in each cell or sector, giving more flexibility and fewer constraints on cell planning It is noted that the new training sequences can also give performance benefits when used for signals transmitted by the remote station 123-127 to the base station 110, 111, 114. The base station 110, 111, 114, having a receiver which has DARP capability or similar advanced performance, can better distinguish between two signals which it receives on the same channel, each signal transmitted by a different remote station 123-127. During a call, both the downlink signal for the call, transmitted by the base station 110, 111, 114, and the uplink signal transmitted by the remote station 123-127, will typically have the same sequence (as is the case for GSM).

As stated above, table 4 shows the set of eight existing training sequences used for the GSM system. The training sequences are labeled TSC0 to TSC7. Each training sequence has 26 bits (bit 0 to bit 25). In all of these training sequences, the first five and the last five bits of a training sequence are repeated versions of five bits elsewhere in the training sequence. For example, the five most significant bits of the TSC0 training sequence (bits 21 to 25) are 00100, and these bits are repeated at bits 5 to 9. The least significant bits of the TSC0 training sequence (bits 0 to 4) are 10111, and these bits are repeated at bits 16 to 20. Because of this repetition, it is usual to assign a short-hand number to each training sequence, the short-hand number being defined as the decimal value of the word formed by bits 5 to 20 inclusive, although the number could alternatively be represented in hexadecimal (hex) form. Thus, the serial number for TSC0 is 47172 decimal, or B844 hexadecimal (hex) as shown in the table.

The training sequences shown in Table 4 are listed in section 5.2.3 of technical specification document 3GPP TS 45.002 V4.8.0 (2003-06) entitled "Technical Specification 3rd Generation Partnership Project; Technical Specification Group GSM/EDGE Radio Access Network; Multiplexing and multiple access on the radio path (Release 4)", published by the 3rd Generation Partnership Project (3GPP) standards-setting organization and further discussed in technical specification document 3GPP TS 45.005 V4.18.0 (2005-11), entitled "Technical Specification 3rd Generation Partnership Project; Technical Specification Group GSM/EDGE Radio Access Network; Radio transmission and reception (Release 4)", also published by the 3rd Generation Partnership Project (3GPP) standards-setting organization.

TABLE 4

| Training Sequence Code | Training Sequence Bit: 26 ... 0 | DEC | HEX |
|---|---|---|---|
| TSC 0 | 00100 1011100001000100 10111 | 47172 | B844 |
| TSC 1 | 00101 1011101111000101 10111 | 48069 | BBC5 |
| TSC 2 | 01000 0111011101001000 01110 | 30536 | 7748 |
| TSC 3 | 01000 1111011010001000 01110 | 63112 | F688 |
| TSC 4 | 00011 0101110010000011 01011 | 23683 | 5C83 |
| TSC 5 | 01001 1101011000001001 11010 | 54793 | D609 |
| TSC 6 | 10100 1111101100010100 11111 | 64276 | FB14 |
| TSC 7 | 11101 1110001001011101 11100 | 57949 | E25D |

Table 5 shows a preferred set of new training sequences complementary to those shown in Table 4, for use according to the present method and apparatus. Each new training sequence is for use in combination with the one of the existing training sequences. The new complementary training sequences are labeled TSC0' to TSC7'. TSC0' is for use in combination with the TSC0, TSC1' is for use in combination with the TSC1, and so on. In applying the present method and apparatus, a base station 110, 111, 114 transmits on the same channel both a first signal having a first training sequence (for example TSC0) and a second signal comprising a second training sequence (e.g. TSC0') which is complementary to the first training sequence.

TABLE 5

| Training Sequence Code | Training Sequence Bit: 26 ... 0 | DEC | HEX |
|---|---|---|---|
| TSC 0' | 01111 1100110101001111 11001 | 52559 | CD4F |
| TSC 1' | 01100 1111110010101100 11111 | 64684 | FCAC |
| TSC 2' | 01110 1101111010001110 11011 | 56974 | DE8E |
| TSC 3' | 01101 1110100011101101 11101 | 59629 | E8ED |
| TSC 4' | 11110 1101110001011110 11011 | 56414 | DC5E |

TABLE 5-continued

| Training Sequence Code | Training Sequence Bit: 26 ... 0 | DEC | HEX |
|---|---|---|---|
| TSC 5' | 01010 1100111111001010 11001 | 53194 | CFCA |
| TSC 6' | 01101 1100101000001101 11001 | 51725 | CA0D |
| TSC 7' | 11100 1101010011111100 11010 | 54524 | D4FC |

A further set of new training sequences having suitable properties is shown in Table 6. These training sequences are for use with their corresponding training sequences from Table 4 as explained above.

TABLE 6

| Training Sequence Code | Training Sequence Bit: 26 ... 0 | DEC | HEX |
|---|---|---|---|
| TSC 0' | 01111 1100110101001111 11001 | 52559 | CD4F |
| TSC 1' | 01101 1100010111101101 11000 | 50669 | C5ED |
| TSC 2' | 00101 1110110111000101 11101 | 60869 | EDC5 |
| TSC 3' | 11110 1101110001011110 11011 | 56414 | DC5E |
| TSC 4' | 01100 1111110010101100 11111 | 64684 | FCAC |
| TSC 5' | 01010 0000110111001010 00001 | 3530 | DCA |
| TSC 6' | 01000 0101110001001000 01011 | 23624 | 5C48 |
| TSC 7' | 11100 1011111011111100 10111 | 48892 | BEFC |

Improved co-channel rejection performance is obtained if the pairings are used for the two co-channel signals, shown in Table 7. Each new training sequence shown in Table 7 can be from either Table 5 or Table 6.

TABLE 7

| Pairing | Existing training sequence | New training sequence |
|---|---|---|
| A | TSC 0 | TSC 0' |
| B | TSC 1 | TSC 1' |
| C | TSC 2 | TSC 2' |
| D | TSC 3 | TSC 3' |
| E | TSC 4 | TSC 4' |
| F | TSC 5 | TSC 5' |
| G | TSC 6 | TSC 6' |
| H | TSC 7 | TSC 7' |

Alternatively, adequate performance may be obtained by using any of the following pairings: Any two training sequences from Table 4; Any two training sequences from Table 5; Any two training sequences from Table 6; Any two different training sequences from any of Tables 4 to 6.

Thus, steps for using the new training sequences are as follows:

When MUROS mode is enabled for the two users, at least one of them are MUROS and DARP capable remote station 123-127, which has the knowledge of new training sequences.

The working pattern may be selected to be 0-0', 1-1' ..., 7-7', However, other combinations beside using a training sequence and its compliment work well also. For example 1-2, 1-2' may work. However, it may be better to use a training sequence from Table 4 and its complement such as 1-1' and 2-2'. This is due to DARP iterative process, which can adapt to the change of code.

It is desirable for the training sequences to be different, so that the cross-correlation is low.

Using the additional training sequences results in minimal, if any, changes implemented on the remote station 123-127 side unless additional training sequence codes are to be defined. Using additional training sequence codes are an improvement of the present co-TCH method and apparatus.

The impact on the remote station 123-127 side is:

Define new set of orthogonal training sequence codes. Existing training sequences can be used for legacy remote stations, while the new set of training sequences may be used for new remote stations 123-127 capable of executing this new feature.

Thus, in addition to being DARP capable, the remote station 123-127 supports the new training sequence codes also.

The impact on the network side is:

The network assigns two different training sequences to the co-TCH users. If new training sequences are defined, then network may assign these to remote stations 123-127 supporting a new training sequence set and assign legacy training sequences to legacy remote stations 123-127.

Figure 15:
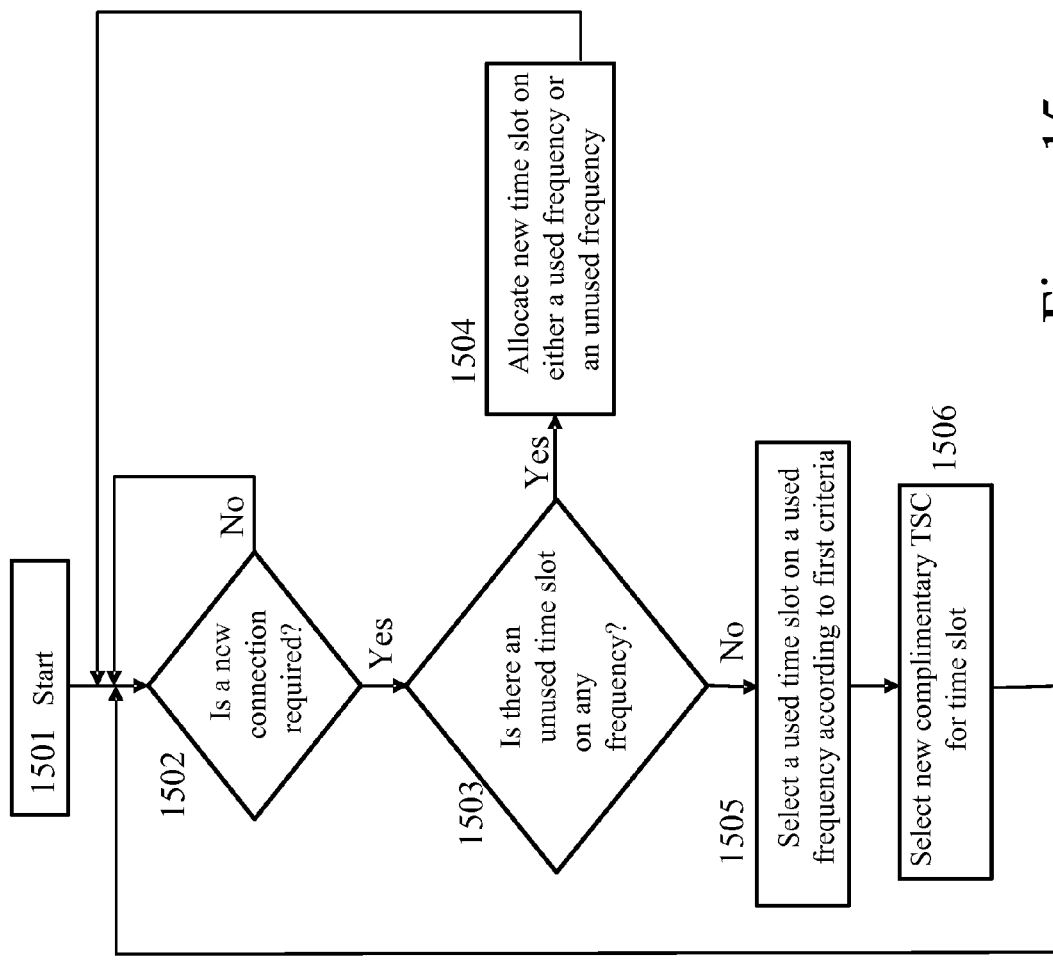
FIG. 15 shows a flowchart disclosing the steps executed when using the complimentary training sequences of the present method and apparatus.

FIG. 15 is a flowchart illustrating the steps taken with the present method. Following the start of the method 1501, a decision is made in step 1502 as to whether to set up a new connection between the base station 110, 111, 114 and a remote station 123-127. If the answer is NO, then the method moves back to the start block 1501 and the steps above are repeated. When the answer is YES and a new connection is set up. Then in block 1503 a decision is made as to whether there is an unused channel (i.e. an unused time slot for any channel frequency). If there is an unused time slot on a used or unused channel frequency, then a new time slot is allocated in block 1504. The method then moves back to the start block 1501 and the steps above are repeated.

When eventually there is no longer an unused time slot (because all time slots are used for connections), the answer to the question of block 1503 is NO, and the method moves to block 1505. In block 1505 a used time slot is selected for the new connection to share with an existing connection.

A used time slot on a channel frequency having been selected for the new connection to share along with an existing connection, a complimentary training sequence (complimentary to the training sequence used by the current user of the slot) for the new connection is then selected in block 1506. The method then moves back to the start block 1501 and the steps above are repeated.

Figure 16:
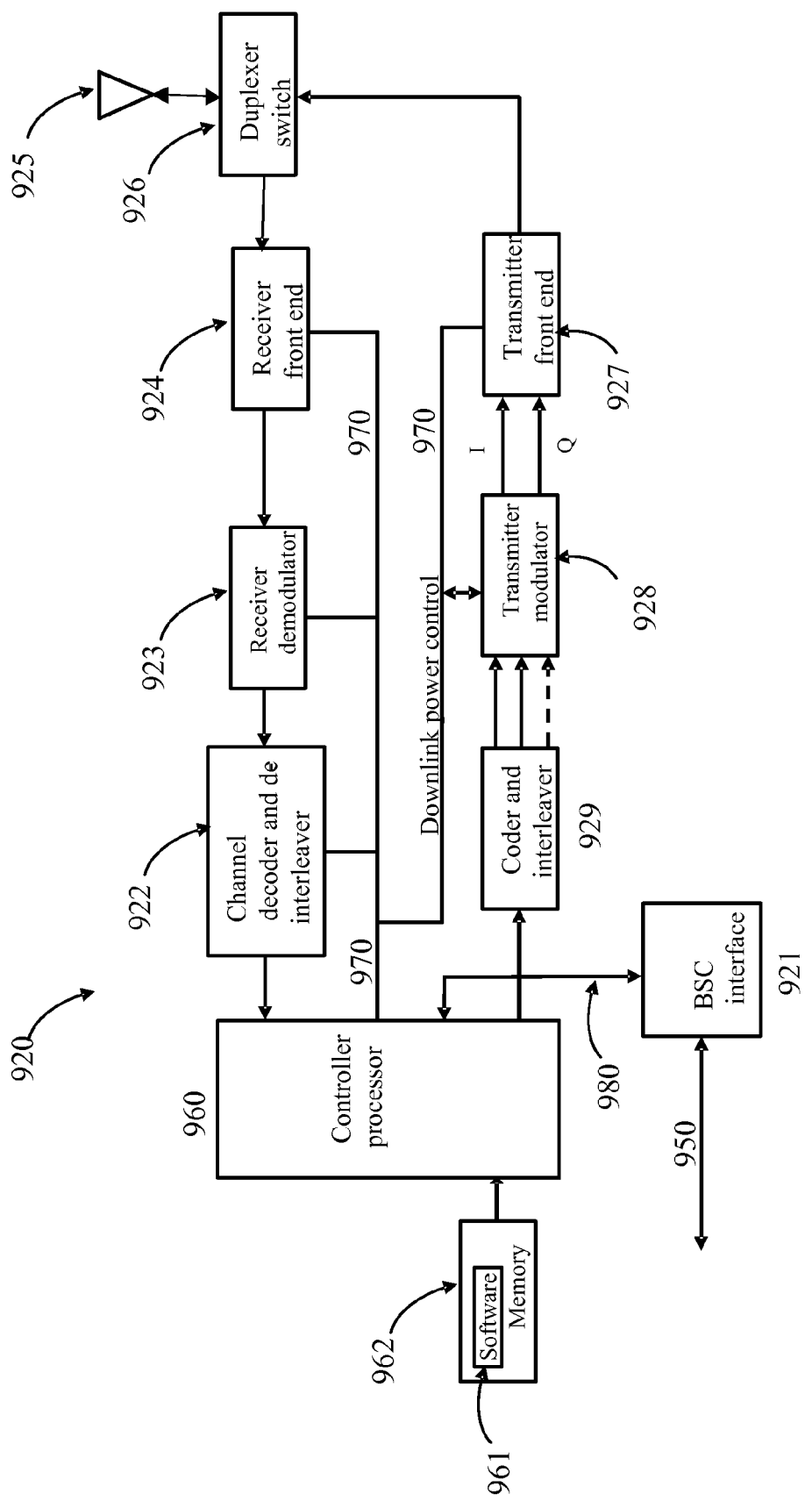
FIG. 16 shows a base station with software stored in memory which may execute the methods disclosed in this patent application.
Figure 19:
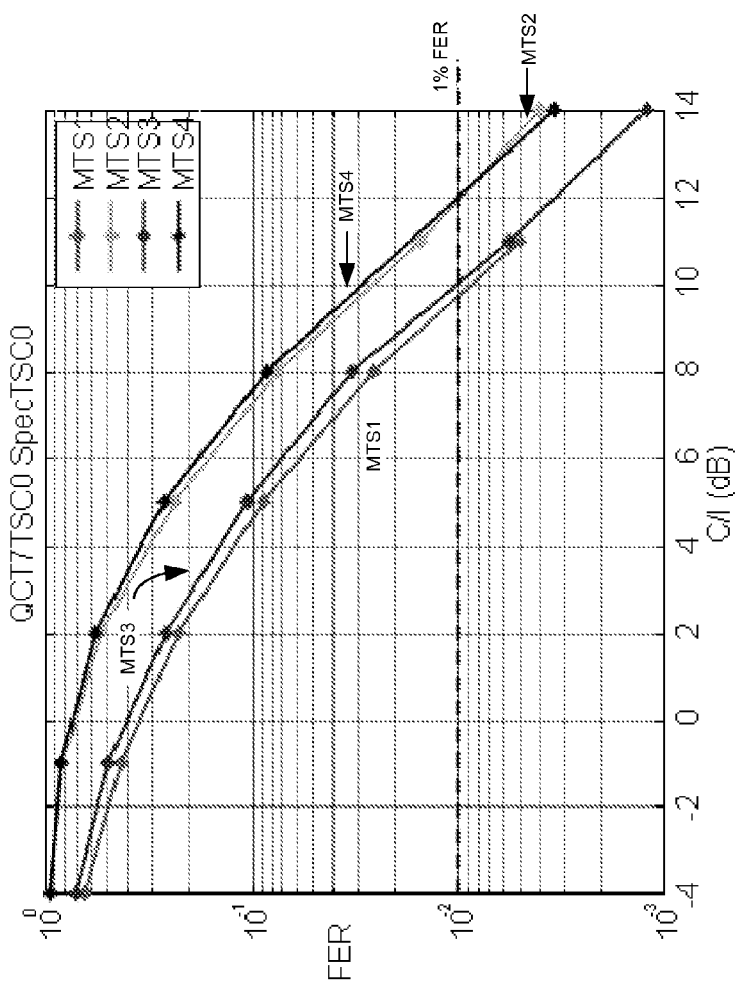
FIG. 19 is a performance plot when pairing QCOM7 TSC0 with legacy TSC0.
Figure 20:
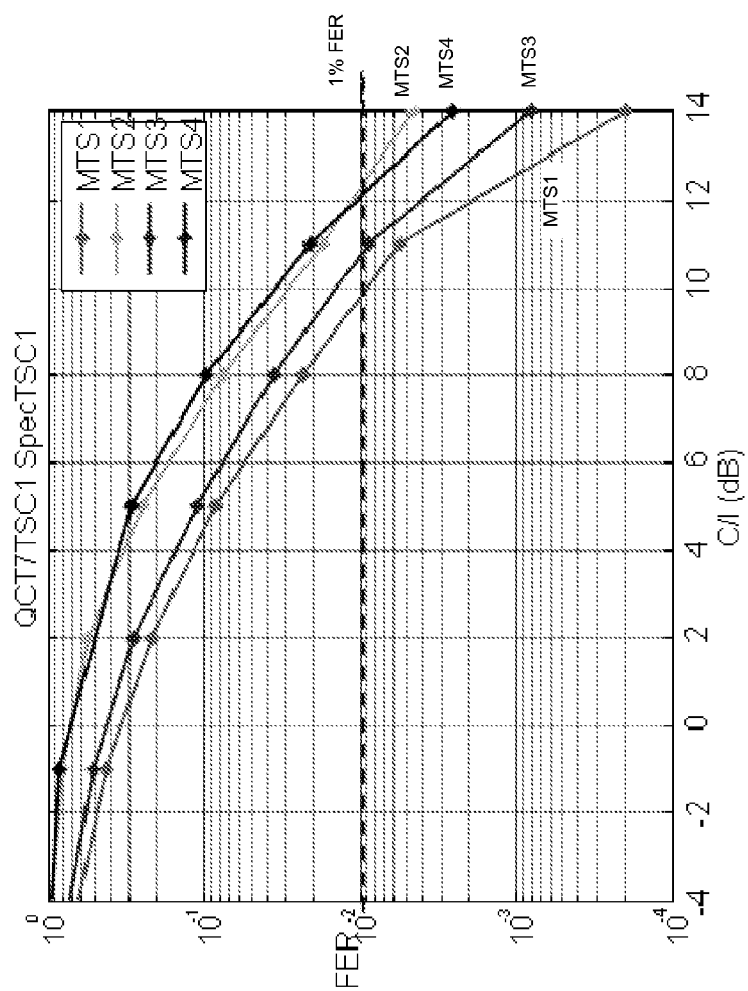
FIG. 20 is a performance plot when pairing QCOM7 TSC1 with legacy TSC1.
Figure 21:
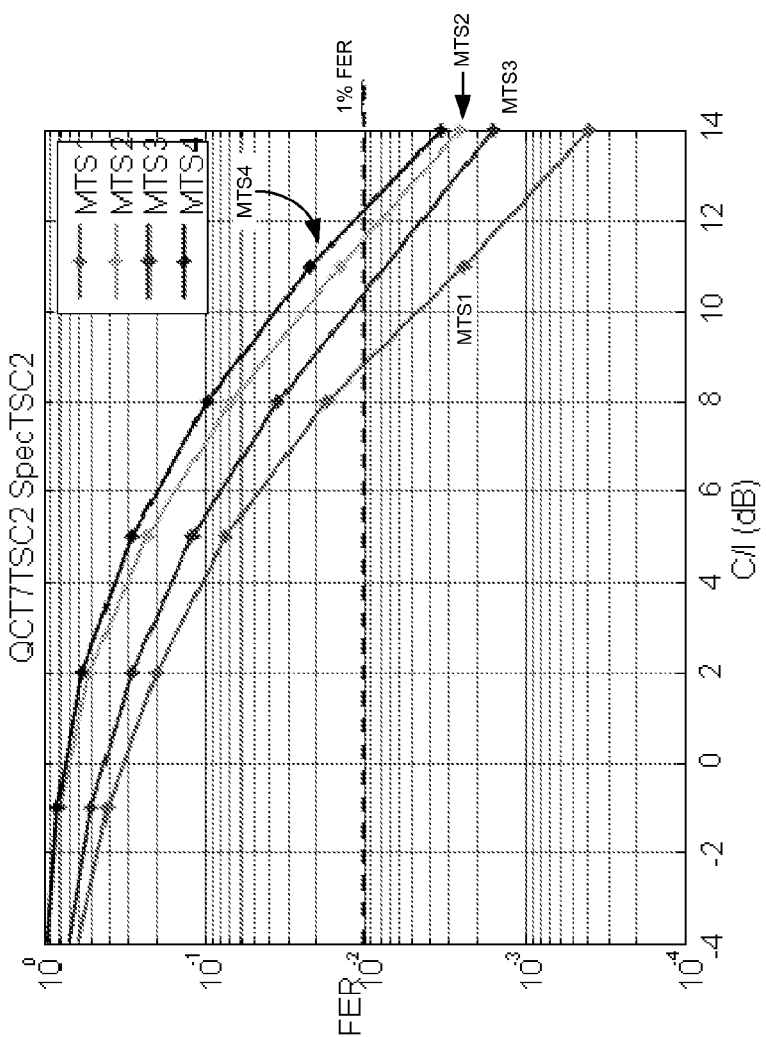
FIG. 21 is a performance plot when pairing QCOM7 TSC2 with legacy TSC2.
Figure 22:
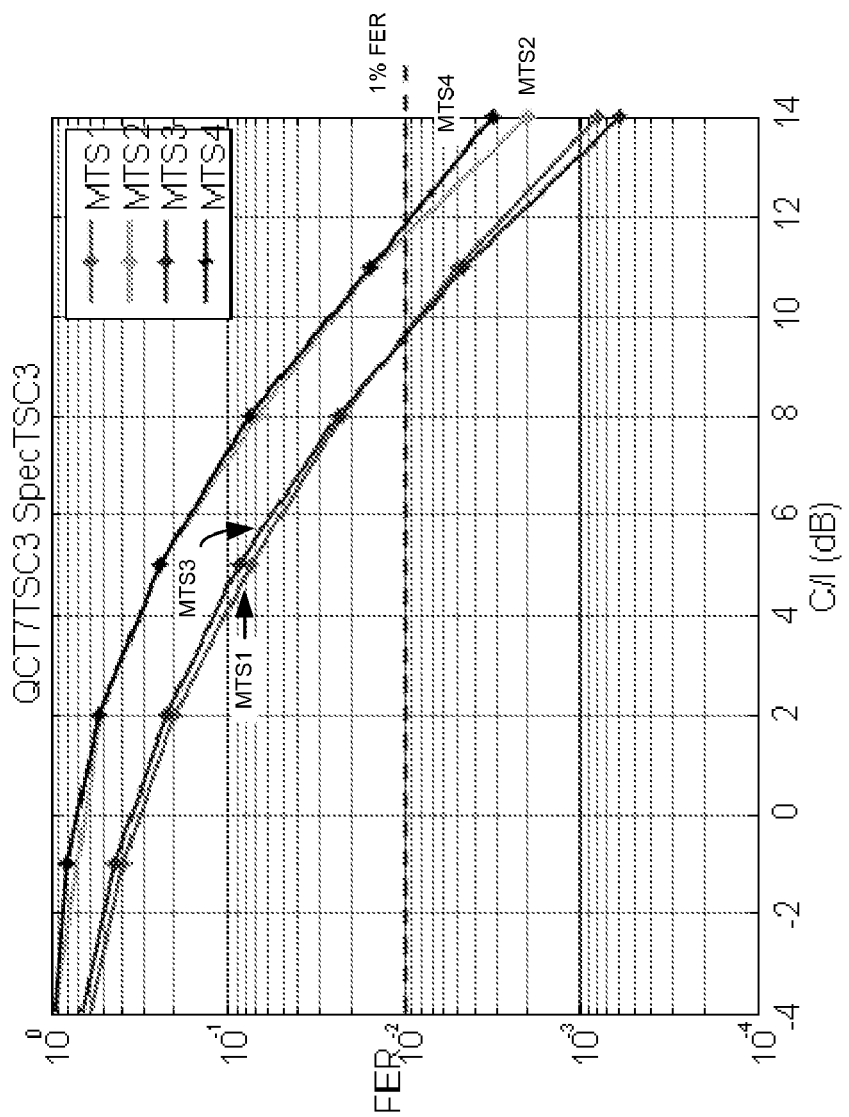
FIG. 22 is a performance plot when pairing QCOM7 TSC3 with legacy TSC3.
Figure 23:
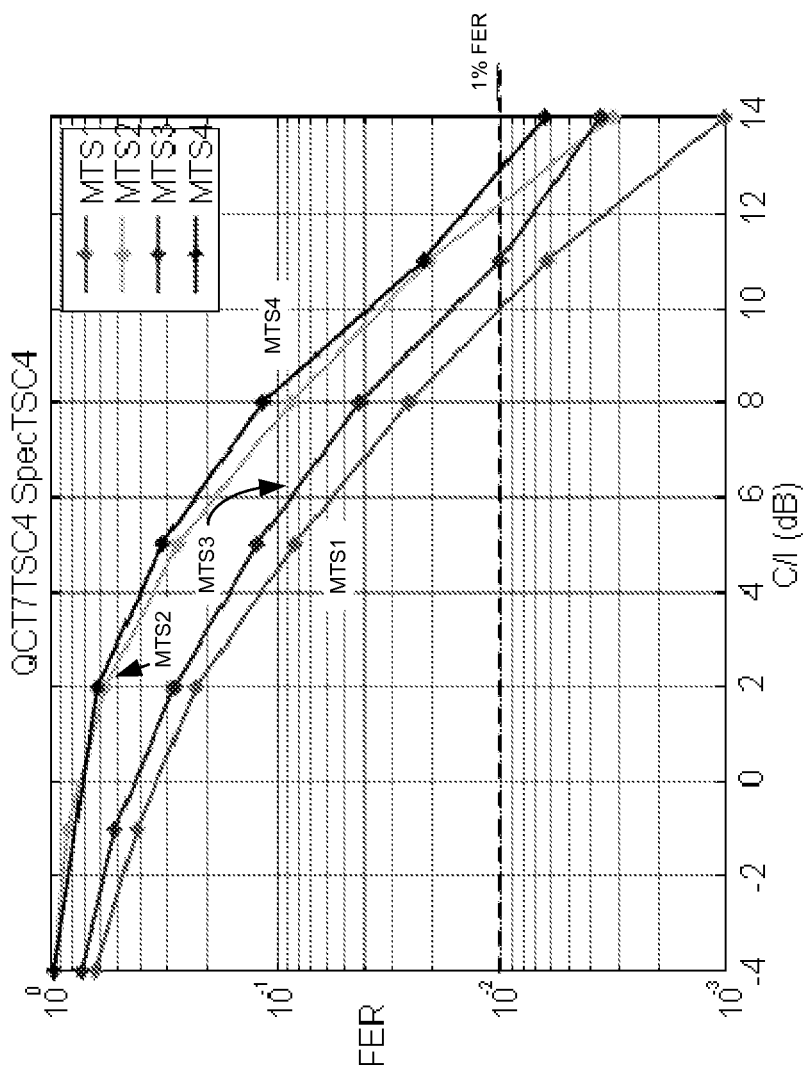
FIG. 23 is a performance plot when pairing QCOM7 TSC4 with legacy TSC4.
Figure 24:
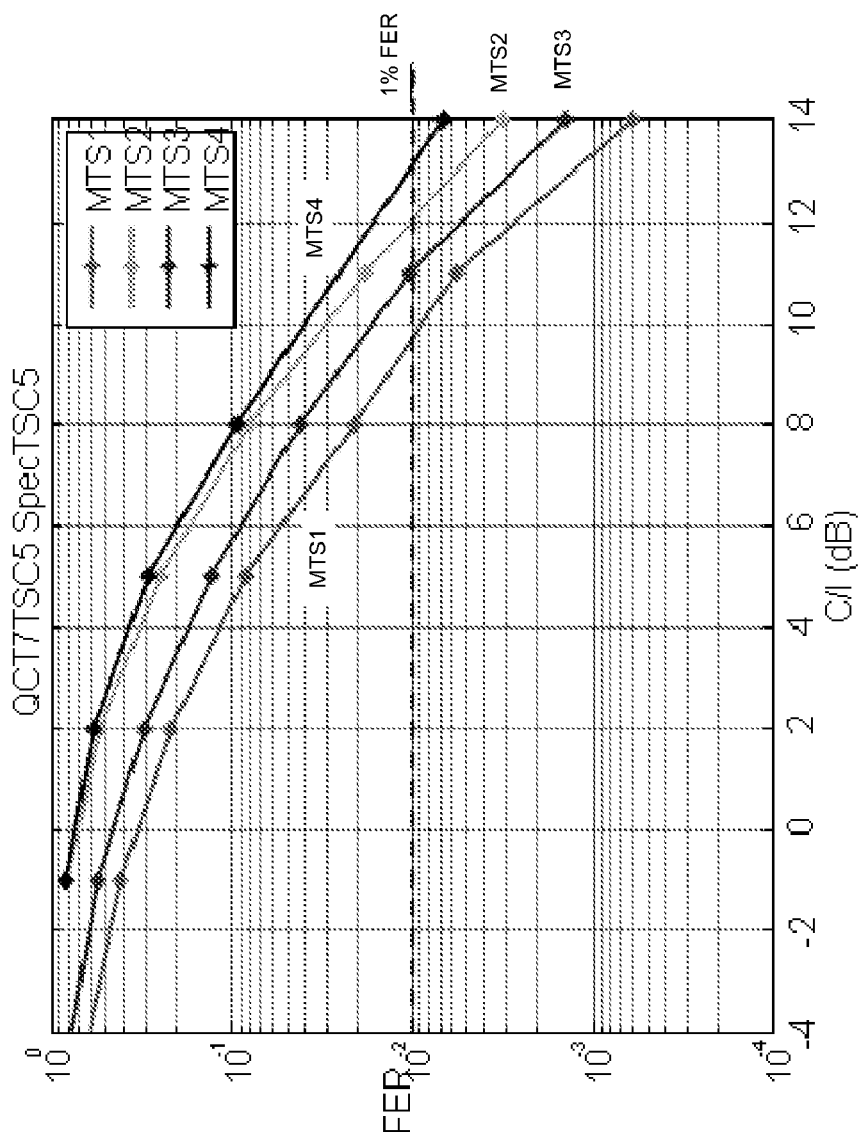
FIG. 24 is a performance plot when pairing QCOM7 TSC5 with legacy TSC5.
Figure 25:
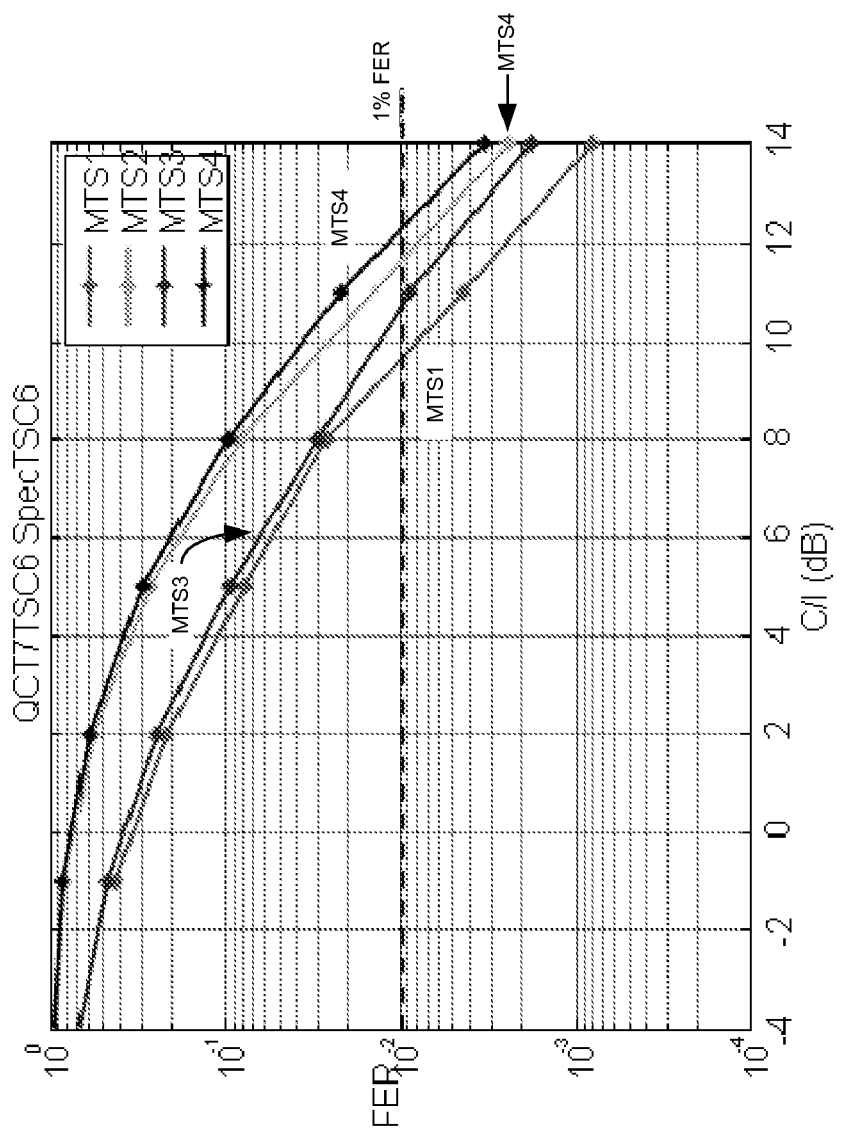
FIG. 25 is a performance plot when pairing QCOM7 TSC6 with legacy TSC6.
Figure 26:
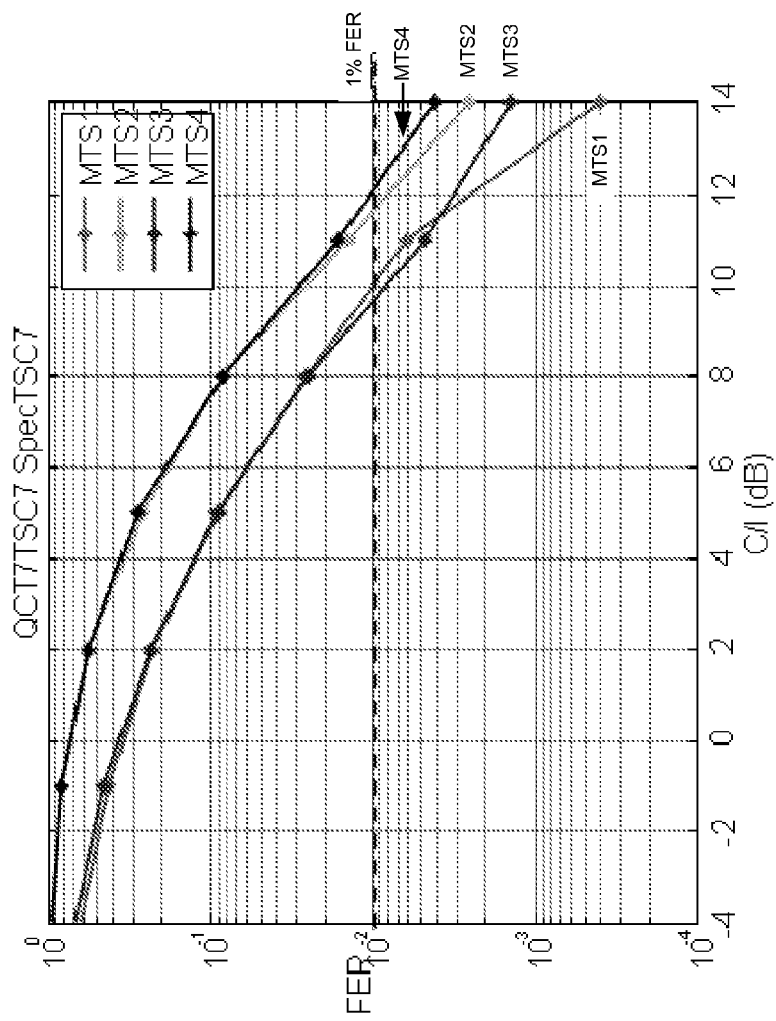
FIG. 26 is a performance plot when pairing QCOM7 TSC7 with legacy TSC7.
Figure 27:
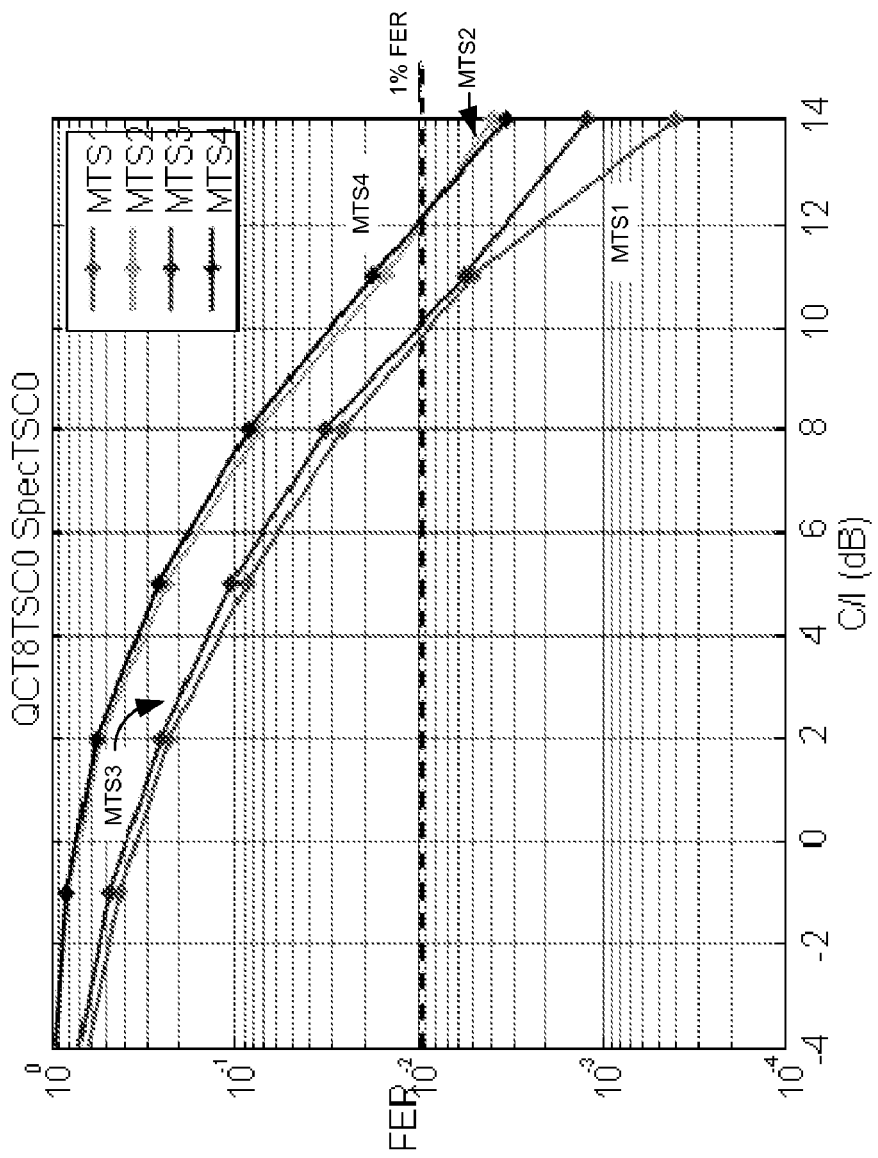
FIG. 27 is a performance plot when pairing QCOM8 TSC0 with legacy TSC0.
Figure 28:
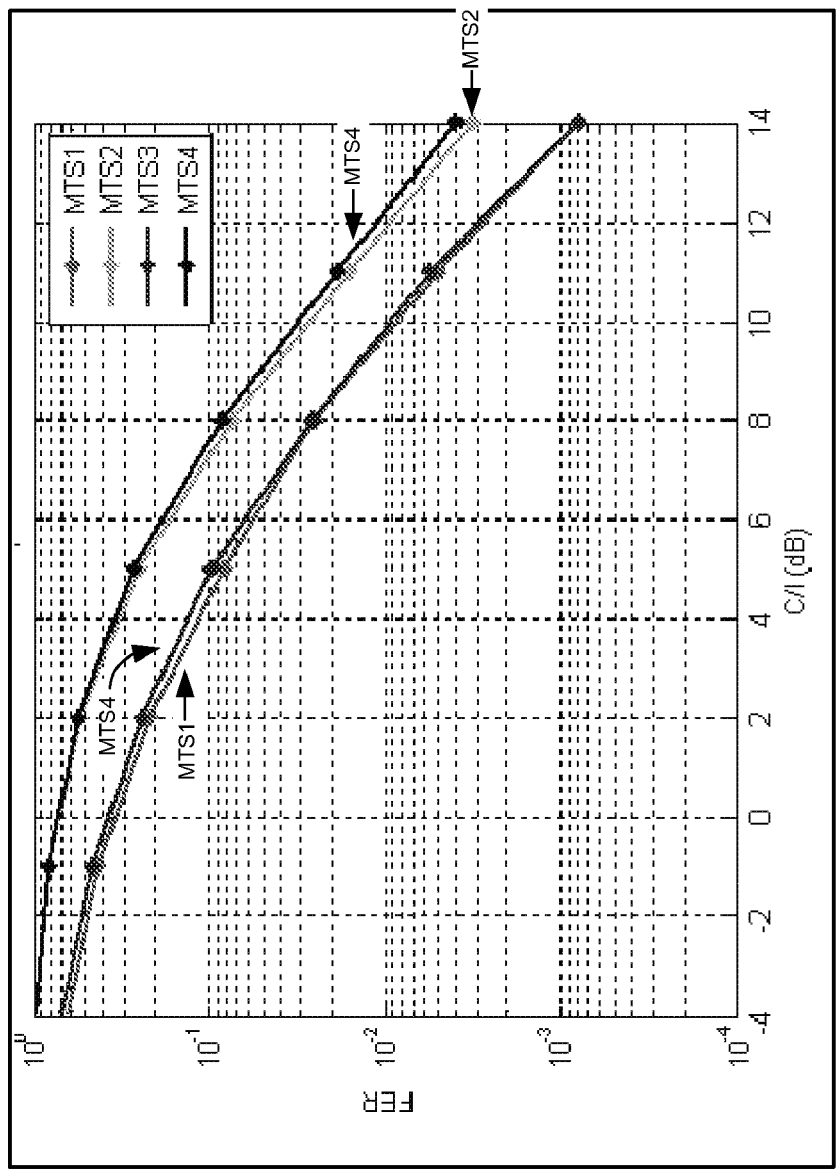
FIG. 28 is a performance plot when pairing QCOM8 TSC1 with legacy TSC1.
Figure 29:
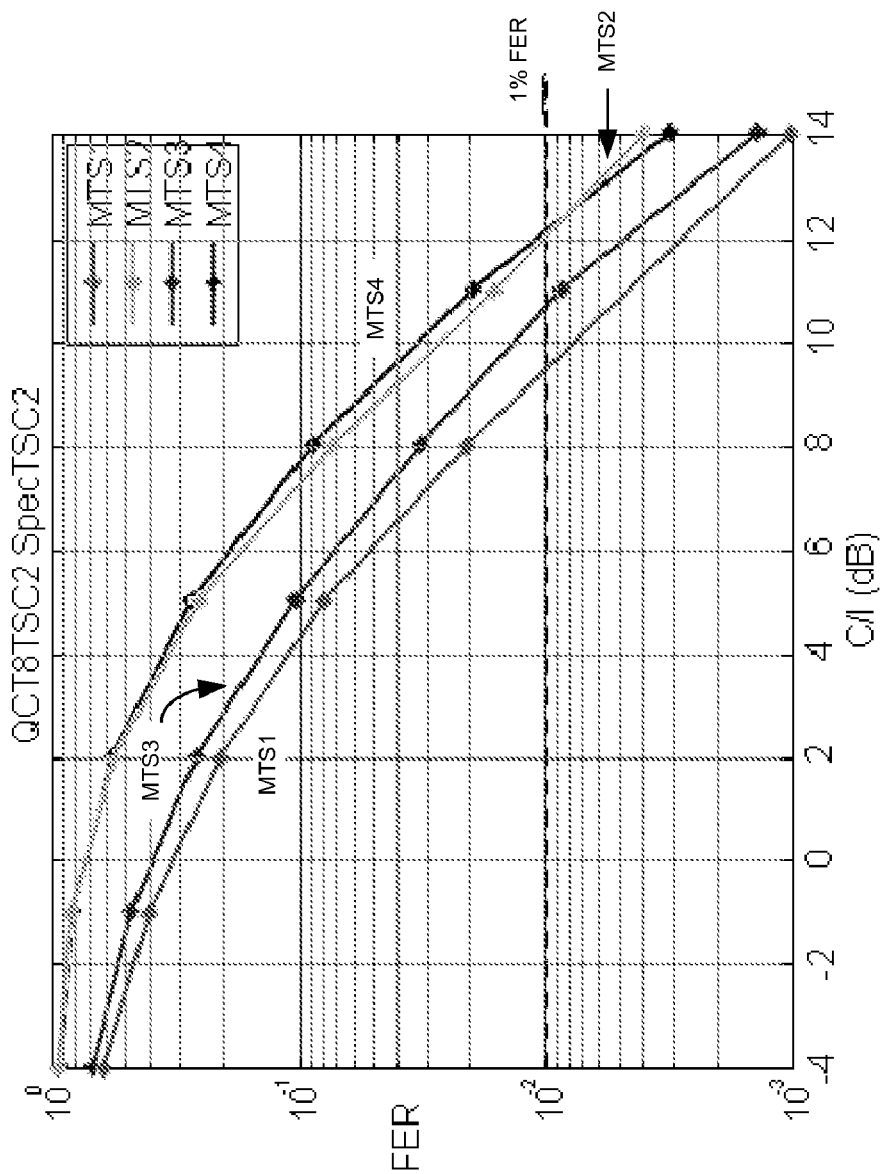
FIG. 29 is a performance plot when pairing QCOM8 TSC2 with legacy TSC2.
Figure 30:
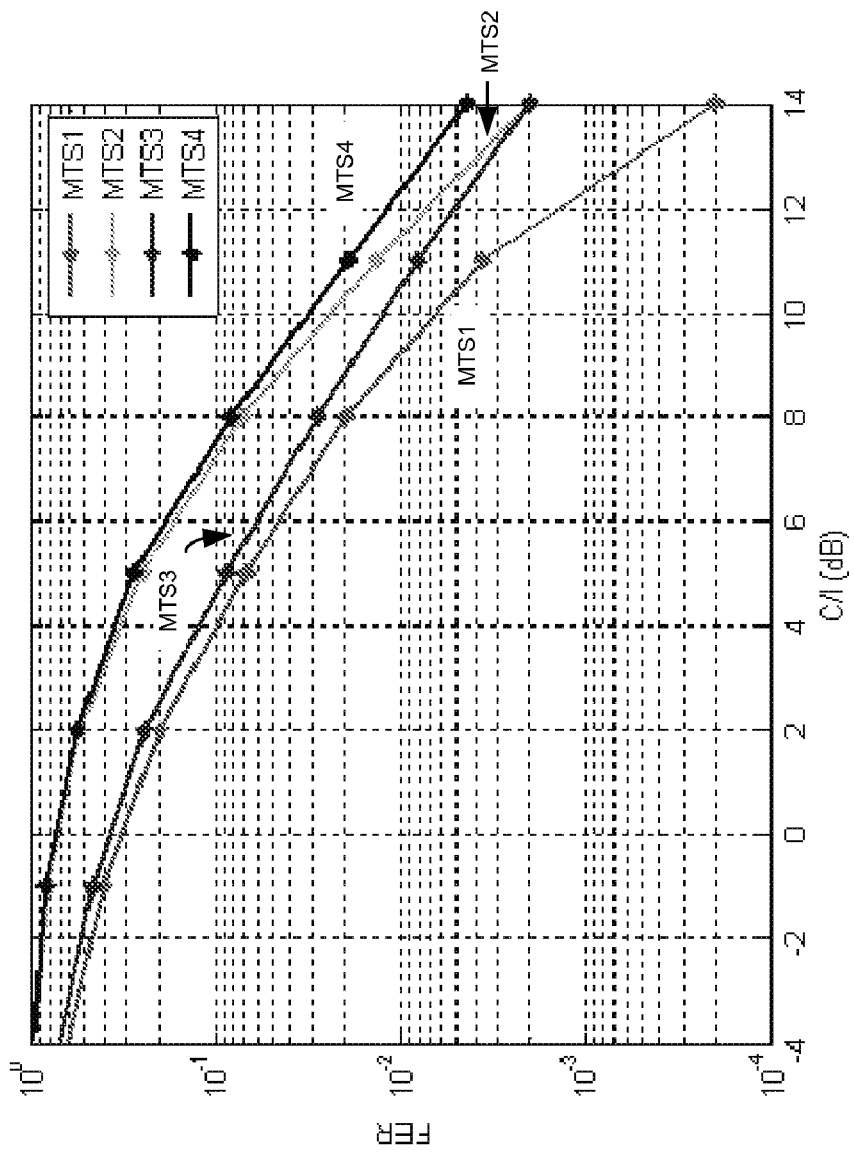
FIG. 30 is a performance plot when pairing QCOM8 TSC3 with legacy TSC3.
Figure 31:
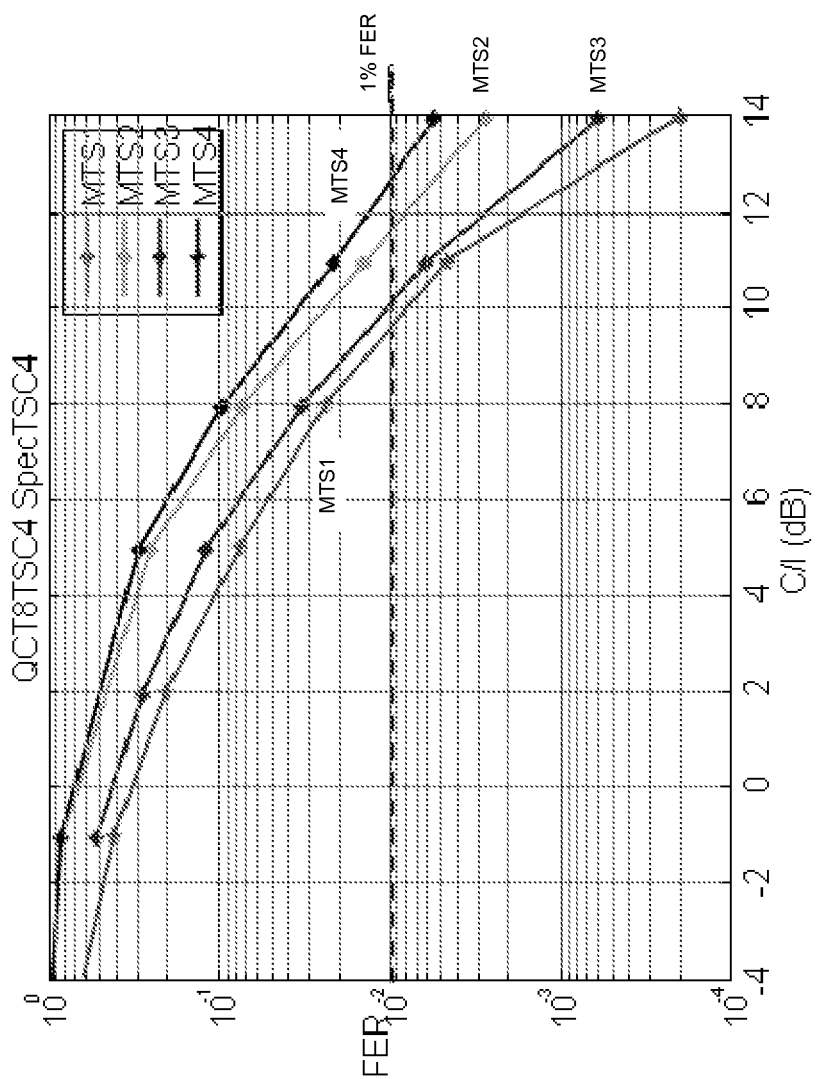
FIG. 31 is a performance plot when pairing QCOM8 TSC4 with legacy TSC4.
Figure 32:
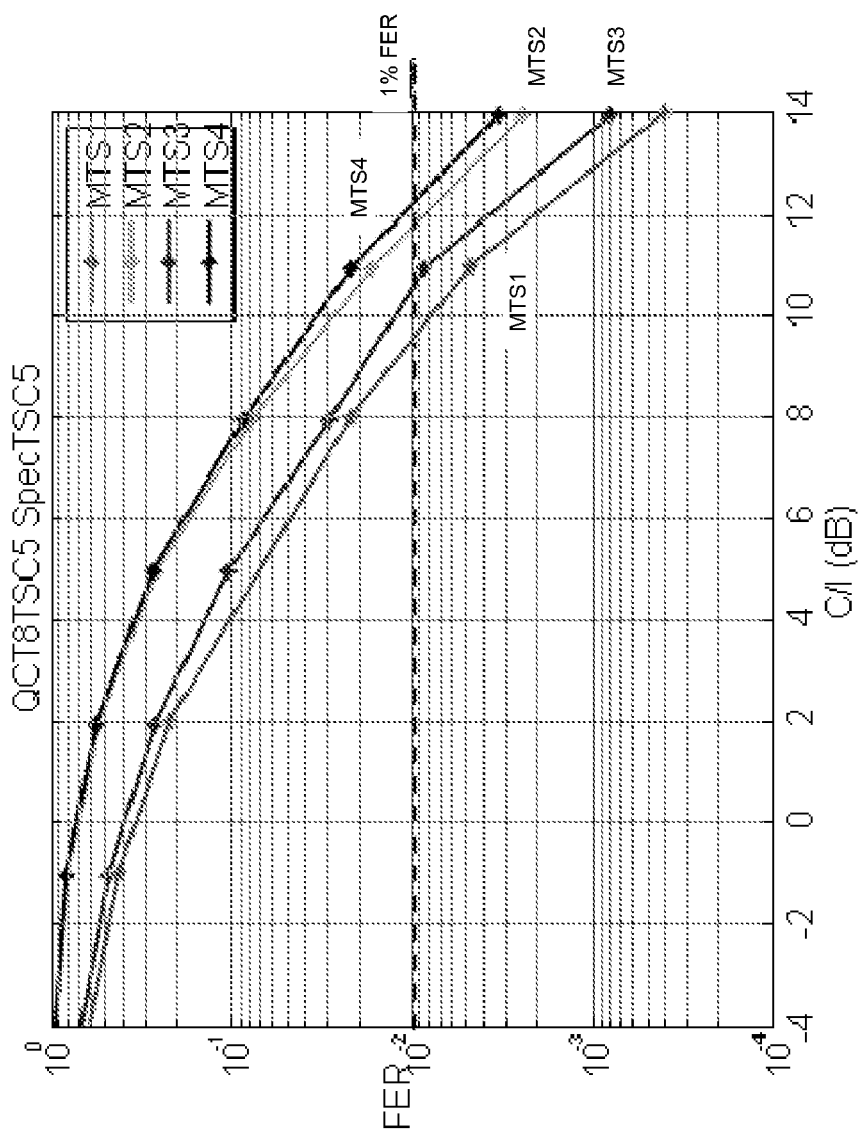
FIG. 32 is a performance plot when pairing QCOM8 TSC5 with legacy TSC5.
Figure 33:
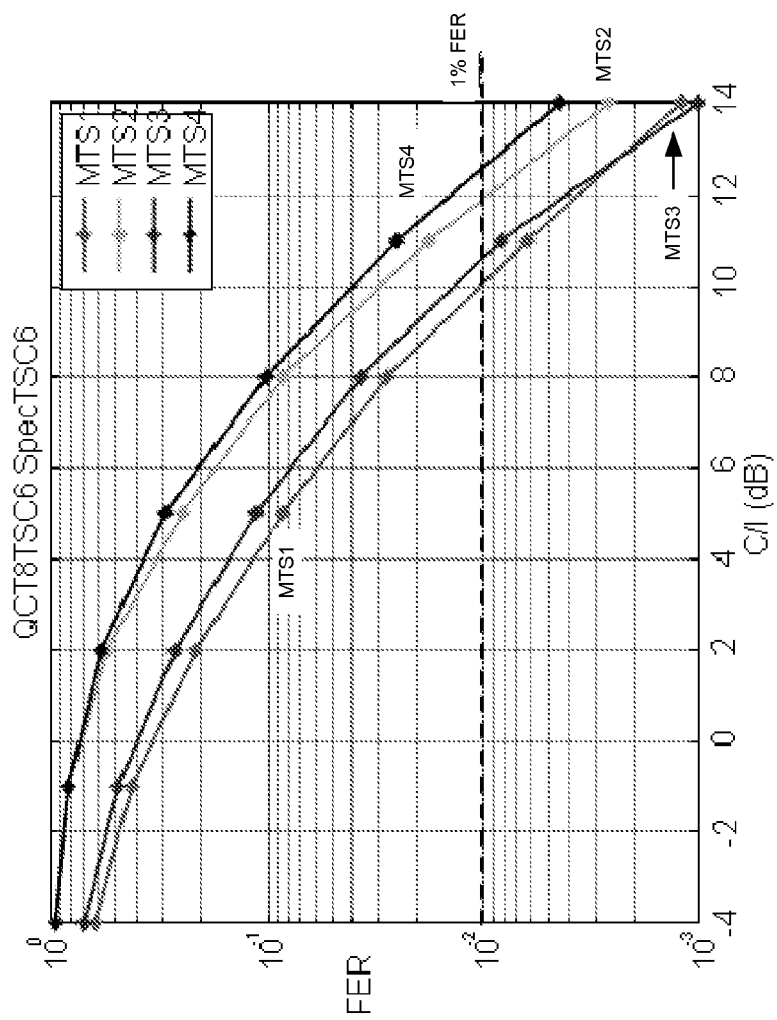
FIG. 33 is a performance plot when pairing QCOM8 TSC6 with legacy TSC6.
Figure 34:
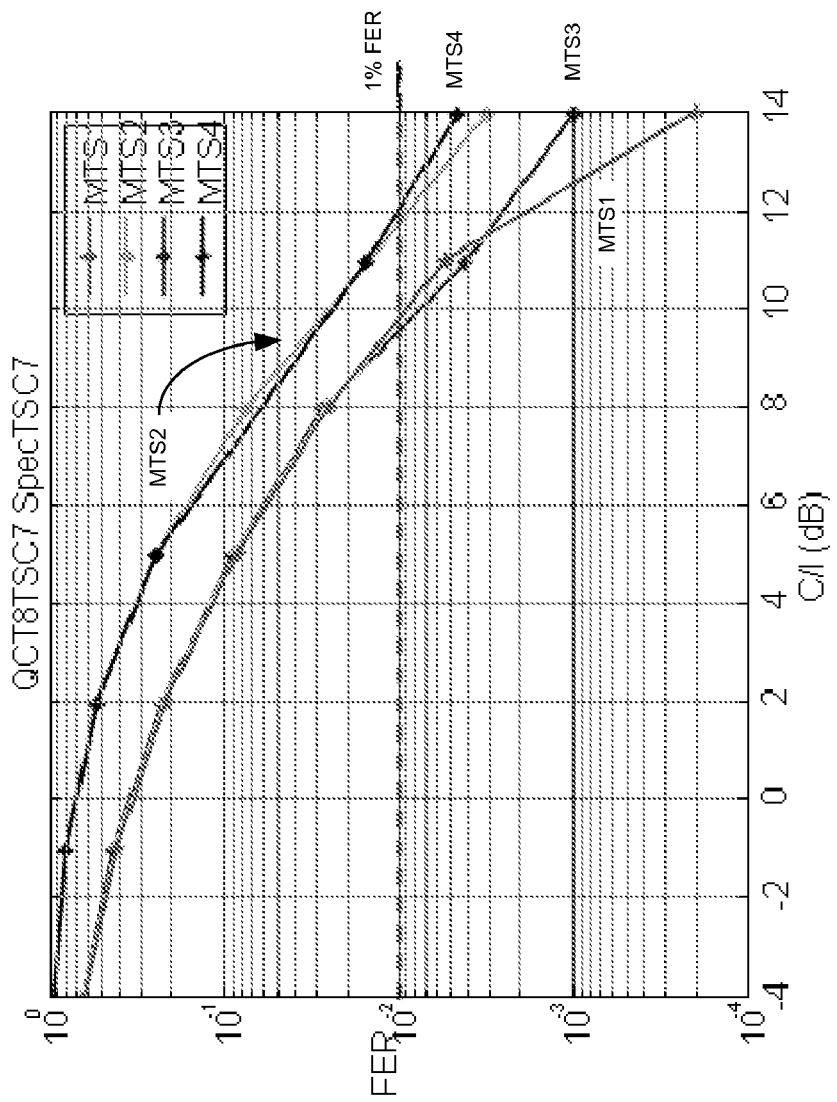
FIG. 34 is a performance plot when pairing QCOM8 TSC7 with legacy TSC7.

The present methods disclosed in this patent application may be stored as executable instructions in software 961 stored in memory 962 which are executed by processor 960 in the BTS as shown in FIG. 16. They may also be stored as executable instructions in software stored in memory which are executed by a processor in the BSC. The remote station 123-127 uses the training sequence it is instructed to use.

New Proposed Sets of TSCs: QCOM7+QCOM8

As stated above, two new sets of training sequences, QCOM7+QCOM8, have been identified which may work with the above existing training sequences identified in the GSM specification. QCOM corresponds to Table 5 and QCOM8 corresponds to Table 6. The two new sets of sequences are proposed to for future MUROS operation. The pairings are:

Training sequences identified in the GSM/EDGE specification with QCOM7 training sequences, and training sequences identified in the GSM/EDGE specification with QCOM8 training sequences.

There are some duplications of training sequence bits in the two groups. Both groups perform well when paired with training sequences identified in the GSM/EDGE specification. As discussed above, when MUROS mode is enabled for the two users, the working pattern may be selected to be: 0-0',1-1' . . . , 7-7'.

Table 8 is a Test Configuration Summary of parameters used when running tests using the new sets of training sequences and the legacy training sequences . FIGS. 17-18 contain test results, and FIGS. 19-34 are performance plots.

TABLE 8

| Test Configuration Summary | |
| --- | --- |
| $E_b N_o$ | 26 |
| TDMA Frames | 20,000 |
| RSSI threshold | −103 dBm |
| Fixed or Floating | Floating point |
| Logical Channel | AHS5.9 |
| Mode | Traffic |
| Path | Terristial Urban |
| Speed | 3 km/h |
| Carrier Freq | 900 MHz |
| Freq Hopping | Enabled |
| Ratio of Desired to Interference($2^{nd}$ user) | 0 dB |
| Phase difference between desire & interference ($2^{nd}$ user) | 90° |
| Desired user | Signal based on QCOM 7 or QCOM 8 TSC |
| Interference($2^{nd}$ user) | Signal based on Legacy TSC |

Signaling for the Assigning of Additional Training Sequence Codes

Currently, according to the prior art, there are eight training sequences defined and, as described above, these training sequences are used to provide separation between different users across different cells rather then different users within the same cell.

By contrast, according to MUROS operation, each cell has the ability for two training sequences to provide separation of two users within the same cell. In MUROS at least one new set of eight training sequences is defined. The remote station indicates to the network (via the BS) if it supports the new training sequence set. The existing signaling messages contain three bits to tell the remote station which of the eight training sequences to use for the communication link. The signaling messages are enhanced so that the remote station can also be signaled which of the two sets of training sequences to use.

Figure 36:
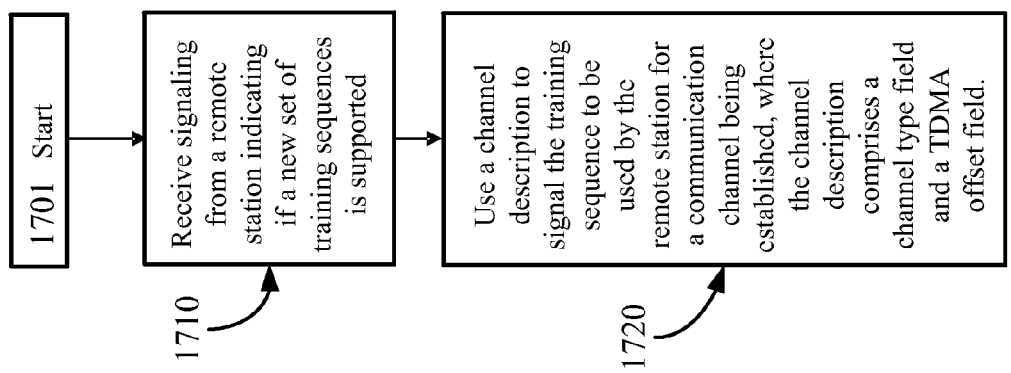
FIG. 36 is a flowchart comprising steps taken to signal training sequence information to a remote station.

According to the present method and apparatus, a mechanism is defined for signaling the training sequence set information to the remote station with no increase in size of the signaling message itself. According to the present method and apparatus, the remote station signals to the network if it supports a new set of training sequences via a mechanism such as Classmark 3 signaling. (See step 1710 of flowchart in FIG. 36). Once the network knows that MS supports more than one set of training sequences for a communication channel, then the network can decide which set of training sequences the remote station shall use for the communication channel being established. According to the present method and apparatus the existing information element called Channel Description (defined in 3GPP TS 44.018 section 10.5.2.5) is modified to signal the training sequence set to be used by the remote station for the communication channel being established. (See step 1720 of flowchart in FIG. 36). The Channel Description has a 5 bit field called Channel type and TDMA offset. The present coding of Channel Type and TDMA offset field is as follows:

TABLE 9

| 8 | 7 | 6 | 5 | 4 | |
|---|---|---|---|---|---|
| 0 | 0 | 0 | 0 | 1 | TCH/F + ACCHs |
| 0 | 0 | 0 | 1 | T | TCH/H + ACCHs |
| 0 | 0 | 1 | T | T | SDCCH/4 + SACCH/C4 or CBCH (SDCCH/4) |
| 0 | 1 | T | T | T | SDCCH/8 + SACCH/C8 or CBCH (SDCCH/8) |

As can be seen from the coding of Channel Type and TDMA offset field that fifth bit (in bit position 8) always has a value of 0.

The present method and apparatus makes use of the fifth bit to indicate which training sequence set the mobile device is to use for the traffic channel. The advantage of this method and apparatus is that reliability of this information is consistent with existing control messages and the change is made in one place in the specification to cater for all the circuit switched assignment messages.

The proposed new coding of Channel Type and TDMA offset field is as shown in Table 10 below.

TABLE 10

| 8 | 7 | 6 | 5 | 4 | |
|---|---|---|---|---|---|
| S | 0 | 0 | 0 | 1 | TCH/F + ACCHs |
| S | 0 | 0 | 1 | T | TCH/H + ACCHs |
| S | 0 | 1 | T | T | SDCCH/4 + SACCH/C4 or CBCH (SDCCH/4) |
| S | 1 | T | T | T | SDCCH/8 + SACCH/C8 or CBCH (SDCCH/8) |

The S bit indicates the training sequence set to use as follows:

| S | |
|---|---|
| 0 | The legacy training sequence set to be used |
| 1 | The alternative/new training sequence set to be used. |

If a remote station does not support the alternative/new training sequence set and bit S is set to 1 then the remote station shall return an ASSIGNMENT FAILURE with cause "channel mode unacceptable".

In one or more exemplary embodiments, the functions described may be implemented in hardware, software, firmware, or any combination thereof. If implemented in software, the functions may be stored on or transmitted as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The methods described herein may be implemented by various means. For example, these methods may be implemented in hardware, firmware, software, or a combination thereof. For a hardware implementation, the processing units used to detect for ACI, filter the I and Q samples, cancel the CCI, etc., may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Therefore, the present invention is not to be limited except in accordance with the following claims.

The invention claimed is:

1. A method to share signals on a single channel; comprising:
   setting up a new connection with a communication device;
   selecting, with a processor, a used time slot on a channel frequency for said new connection to share with an existing connection;
   selecting, with a processor, a different training sequence for said new connection from said existing connection's training sequence; and
   using both said training sequences in the same time slot on the same channel frequency by one base station.

2. The method according to claim 1, further comprising:
   allocating a new time slot if there is an unused time slot on said channel frequency; and wherein said used time slot for said new connection to share with an existing connection is selected if there is not an unused time slot on said channel frequency.

3. The method according to claim 1, further comprising phase shifting symbols of said new connection with respect to said existing connection.

4. The method according to claim 3, wherein said phase shift is evenly distributed.

5. The method according to claim 1, further comprising generating and sending a command to a base station to assign said channel frequency, said time slot and said training sequence code to one remote station.

6. The method according to claim 1, wherein said used time slot for said new connection is selected according to criteria comprising: said time slot is used by a remote station having a distance from a base station similar to said distance from said base station to a new remote terminal using said time slot.

7. The method according to claim 1, wherein said used time slot for said new connection is selected according to criteria comprising: said time slot may be selected if it has low traffic, or said time slot is already used by no more than one remote station.

8. The method according to claim 1, wherein said used time slot for said new connection is selected according to criteria comprising: a power level received at a remote station already using said time slot is within 10 dB of said new remote station using said time slot if both of said remote stations are DARP capable.

9. The method according to claim 1, wherein a non-DARP capable remote station has a desired signal substantially $\leq 10$ dB higher than said DARP capable remote station's desired signal.

10. The method according to claim 1, further comprising:
    generating a first data and a second data;
    generating said existing connection's training sequence and said different training sequence;
    combining the existing connection's training sequence with the first data to produce a first combined data and combining the different training sequence with the second data to produce a second combined data; and
    modulating and transmitting both said first combined data and said second combined data using said same channel frequency and said same used time slot to produce first and second transmitted signals.

11. A method to produce first and second signals which share a channel, the method comprising:
    generating a first data and a second data;
    generating a first training sequence and a second training sequence;
    combining the first training sequence with the first data to produce a first combined data and combining the second training sequence with the second data to produce a second combined data;
    modulating and transmitting both said first combined data and said second data combined data using a same carrier frequency and a same time slot to produce first and second transmitted signals, and
    using both said training sequences in the same time slot on the same carrier frequency by one base station.

12. The method according to claim 11, wherein said same time slot is selected according to criteria comprising: said same time slot may be selected if it has low traffic, said same time slot is already used by no more than one remote station, said training sequence is not used by a cell or a sector for said channel frequency comprising said used time slot, or said training sequence is not used on the said channel frequency by a nearby said cell or said sector.

13. The method according to claim 11, further comprising phase shifting symbols of said first combined data with respect to said second combined data.

14. The method according to claim 13, wherein said phase shift is evenly distributed.

15. The method according to claim 11, further comprising generating and sending a command to a base station to assign said same carrier frequency said same time slot and said training sequences to one remote station.

16. The method according to claim 11, wherein said same time slot is selected according to criteria comprising: said same time slot is used by a remote station having a distance from a base station similar to said distance from said base station to a new remote station using said same time slot.

17. The method according to claim 11, wherein said same time slot is selected according to criteria comprising: a power level received at a remote station already using said time slot is within 10 dB of said new remote station using said time slot if both of said remote stations are DARP capable.

18. The method according to claim 11, wherein a non-DARP capable remote terminal has a desired signal $\leq 10$ dB higher than said DARP capable remote terminal's desired signal.

19. An apparatus, comprising:
    a controller processor;
    a memory subsystem;
    a data bus operably connected between said controller processor and said memory, wherein said controller processor communicates via said data bus with said memory subsystem to send and receive values for parameters to and from said memory subsystem; and code comprising software stored in said memory subsystem, wherein said memory subsystem comprises at least one table of data, wherein said data comprises values of a parameter for at least one set of remote stations values of training sequence, values of time slot number and values of channel frequency;

wherein said software comprises instructions to produce first and second signals which share a channel, said instructions configured to:

generate a first data and a second data;

generate a first training sequence and a second training sequence;

combine the first training sequence with the first data to produce a first combined data;

combine the second training sequence with the second data to produce a second combined data;

modulate and transmit both said first combined data and said second combined data using a same carrier frequency and a same time slot to produce first and second transmitted signals, and use both said training sequences in the same time slot on the same carrier frequency by one base station.

20. The apparatus of claim 19, wherein said software comprises instructions to share signals on a single channel; comprising:

set up a new connection;

select a used time slot for said new connection to share with an existing connection;

select a different training sequence for said new connection from said existing connection's training sequence; and use both said training sequences in the same time slot on the same channel frequency by one base station.

21. The apparatus of claim 20, further comprising: allocating a new time slot if there is an unused time slot on said channel frequency; and wherein said used time slot for said new connection to share with an existing connection is selected if there is not an unused time slot on said channel frequency.

22. The apparatus of claim 20, further comprising at least one instruction to phase shift symbols of said new connection with respect to said existing connection.

23. The apparatus of claim 22, wherein said phase shift is evenly distributed.

24. The apparatus of claim 20, further comprising at least one instruction to generate and send a command to a base station to assign said channel frequency, said time slot, and said training sequence to a remote station.

25. The apparatus of claim 20, wherein said used time slot for said new connection is selected according to criteria comprising: said time slot is used by a remote station having a distance from a base station similar to said distance from said base station to a new remote station using said time slot.

26. The apparatus of claim 20, wherein said used time slot for said new connection is selected according to criteria comprising: said time slot may be selected if it has low traffic, or said time slot is already used by no more than one remote station.

27. The apparatus of claim 20, wherein said used time slot for said new connection is selected according to criteria comprising: a power level received at a remote station already using said time slot is within 10 dB of said new remote station using said time slot if both of said remote station are DARP capable.

28. The apparatus of claim 20, wherein a non-DARP capable remote station has a desired signal $\leq 10$ dB higher than said DARP capable remote station's desired signal.

29. The apparatus of claim 20, further comprising instructions to: generate a first data and a second data;

generate said existing connection's training sequence and said different training sequence;

combine the existing connection's training sequence with the first data to produce a first combined data;

combine the different training sequence with the second data to produce a second combined data; and modulate and transmit both said first combined data and said second data combined data using said same channel frequency and said same used time slot to produce first and second transmitted signals.

30. The apparatus of claim 19, further comprising:

a plurality of data sources;

at least one sequence generator having a plurality of outputs;

a plurality of combiners, each having a plurality of inputs and at least one output, wherein a first of said inputs is operably connected to one of said outputs of one of said data sources and a second of said inputs is operably connected to one of said outputs of said sequence generator, whereby at least one training sequence is combined with at least one data to produce at least one combined data; and a transmitter modulator having a plurality of inputs and at least one output.

31. The apparatus of claim 30, wherein said transmitter modulator phase shifts symbols of said at least one combined data such that a first said combined data is phase shifted with respect to a second said combined data.

32. The apparatus of claim 31, wherein said phase shift is evenly distributed.

33. The apparatus of claim 30, wherein said at least one sequence generator comprises a plurality of sequence generators.

34. An apparatus, comprising:

a controller processor;

an antenna;

a duplexer switch operably connected to said base station antenna;

a receiver front end operably connected to said duplexer switch;

a receiver demodulator operably connected to said receiver front end;

a channel decoder and de-interleaver operably connected to said receiver demodulator and said controller processor;

a base station controller interface operably connected to said controller processor;

a coder and interleaver operably connected to said controller processor;

a transmitter modulator operably connected to said coder and interleaver;

a transmitter front end module operably connected to said transmitter modulator and operably connected to said duplexer switch;

a data bus operably connected between said controller processor and said channel decoder and de-interleaver, said receiver demodulator, said receiver front end, said transmitter modulator and said transmitter front end; and software stored in said memory, wherein said memory comprises at least one table of data, wherein said data comprises values of a parameter for at least one set of remote stations, values of training sequence, values of time slot number, and values of channel frequency.

35. The apparatus of claim 34, wherein said software comprises instructions to produce first and second signals which share a channel, comprising:
generate a first data and a second data;
generate a first training sequence and a second training sequence;
combine the first training sequence with the first data to produce a first combined data;
combine the second training sequence with the second data to produce a second combined data;
modulate and transmit both said first combined data and said second combined data using a same carrier frequency and a same time slot to produce first and second transmitted signals, and
use both said training sequences in the same time slot on the same carrier frequency by one base station.

36. The apparatus of claim 34, wherein said software comprises instructions to share signals on a single channel said instructions, when executed by a processor, perform operations to:
set up a new connection;
select a used time slot for said new connection to share with an existing connection;
select a different training sequence code for said new connection from said existing connection's training sequence; and
use both said training sequences in the same time slot on the same carrier frequency by one base station.

37. The apparatus of claim 36, further comprising: allocating a new time slot if there is an unused time slot on said carrier frequency; and wherein said used time slot for said new connection to share with an existing connection is selected if there is not an unused time slot on said channel frequency.

38. The apparatus of claim 36, further comprising at least one instruction to phase shift symbols of said new connection with respect to said existing connection.

39. The apparatus of claim 38, wherein said phase shift is evenly distributed.

40. The apparatus of claim 36, wherein said used time slot for said new connection is selected according to criteria comprising: said time slot is used by a remote station having a distance from a base station similar to said distance from said base station to a new said remote station using said time slot.

41. The apparatus of claim 36, wherein said used time slot for said new connection is selected according to criteria comprising: said time slot may be selected if it has low traffic, or said time slot is already used by no more than one remote station.

42. The apparatus of claim 36, wherein said used time slot for said new connection is selected according to criteria comprising: a power level received at a remote station already using said time slot is within 10 dB of said new remote station using said time slot if both of said remote stations are DARP capable.

43. The apparatus of claim 36, wherein a non-DARP capable remote station has a desired signal ≦10 dB higher than said DARP capable remote station's desired signal.

44. The apparatus of claim 36, further comprising instructions to:
generate a first data and a second data;
generate said existing connection's training sequence and said different training sequence;
combine the existing connection's training sequence with the first data to produce a first combined data;
combine the different training sequence with the second data to produce a second combined data; and
modulate and transmit both said first combined data and said second data combined data using said same channel frequency and said same used time slot to produce first and second transmitted signals.

45. The apparatus of claim 34, further comprising:
a plurality of data sources;
at least one sequence generator having a plurality of outputs;
a plurality of combiners, each having a plurality of inputs and at least one output, wherein a first of said inputs is operably connected to one of said outputs of one of said data sources and a second of said inputs is operably connected to one of said outputs of said sequence generator, whereby at least one training sequence is combined with at least one data to produce at least one combined data; and
said transmitter modulator having a plurality of inputs and at least one output.

46. The apparatus of claim 45, wherein said transmitter modulator phase shifts symbols of said at least one combined data such that a first said combined data is phase shifted with respect to a second said combined data.

47. The apparatus of claim 46, wherein said phase shift is evenly distributed.

48. The apparatus of claim 45, wherein said at least one sequence generator comprises a plurality of sequence generators.

49. An apparatus to produce first and second signals sharing a channel, comprising:
a plurality of data sources;
at least one sequence generator having a plurality of outputs;
a plurality of combiners, each having a plurality of inputs and at least one output, wherein a first of said inputs is operably connected to one of said outputs of one of said data sources and a second of said inputs is operably connected to one of said outputs of said sequence generator, whereby at least one training sequence is combined with at least one data to produce at least one combined data; and
a transmitter modulator having a plurality of inputs and at least one output.

50. The apparatus according to claim 49, wherein said transmitter modulator phase shifts symbols of said at least one combined data such that a first said combined data is phase shifted with respect to a second said combined data.

51. The apparatus according to claim 50, wherein said phase shift is evenly distributed.

52. The apparatus according to claim 49 wherein said at least one sequence generator comprises a plurality of sequence generators.

53. An apparatus for sharing signals on a single channel; comprising:
processing means for setting up a new connection with a communication device;
processing means for selecting a used time slot on a channel frequency for said new connection to share with an existing connection;
processing means for selecting a different training sequence code for said new connection from said existing connection's training sequence code; and
processing means for using both said training sequences in said same used time slot on said same channel frequency by one base station.

54. The apparatus according to claim 53, further comprising means for allocating a new time slot if there is an unused time slot on said channel frequency; and wherein said used time slot for said new connection to share with an existing connection is selected if there is not an unused time slot on said channel frequency.

55. The apparatus according to claim 53, further comprising means for phase shifting symbols of said new connection with respect to said existing connection.

56. The apparatus according to claim 55, wherein said phase shift is evenly distributed.

57. The apparatus according to claim 53, further comprising means for generating and sending a command to a base station to assign said channel frequency, said time slot, and said training sequence to one remote station.

58. The apparatus according to claim 53, further comprising means for selecting said used time slot for said new connection according to criteria comprising: said time slot is used by a remote station having a distance from a base station similar to said distance from said base station to a new said remote station using said time slot.

59. The apparatus according to claim 53, further comprising means for selecting said used time slo for said new connection according to criteria comprising: said time slot may be selected if it has low traffic, or said time slot is already used by no more than one remote station.

60. The apparatus according to claim 53, further comprising means for selecting said used time slot set for said new connection according to criteria comprising: a power level received at a remote station already using said time slot is within 10 dB of said new remote station using said time slot if both of said remote stations are DARP capable.

61. The apparatus according to claim 53, wherein a non-DARP capable remote station has a desired signal ≦10 dB higher than said DARP capable remote station's 124 desired signal.

62. The apparatus according to claim 53, further comprising:
processing means for generating a first data and a second data;
processing means for generating said existing connection's training sequence and said different training sequence;
processing means for combining the existing connection's training sequence with the first data to produce a first combined data and combining the different training sequence with the second data to produce a second combined data; and
processing means for modulating and transmitting both said first combined data 408 and said second data combined data using said same channel frequency and said same used time slot to produce first and second transmitted signals.

63. An apparatus for producing first and second signals which share a channel, comprising:
means for generating a first data and a second data;
means for generating a first training sequence and a second training sequence;
means for combining the first training sequence with the first data to produce a first combined data and combining the second training sequence 405 with the second data to produce a second combined data;
means for modulating and transmitting both said first combined data and said second combined data using a same carrier frequency and a same time slot to produce first and second transmitted signals, and
means for using both said training sequences in the same time slot on the same carrier frequency by one base station.

64. The apparatus according to claim 63, further comprising means for selecting said same time slot according to criteria comprising: said same time slot may be selected if it has low traffic, said same time slot is already used by no more than one remote station, said training sequence is not used by a cell or a sector for said channel frequency comprising said used time slot, or said training sequence is not used on the said channel frequency by a nearby said cell or said sector.

65. The apparatus according to claim 63, further comprising means for phase shifting symbols of said first combined data with respect to said second combined data.

66. The apparatus according to claim 65, wherein said phase shift is evenly distributed.

67. The apparatus according to claim 63, further comprising means for generating and sending a command to a base station to assign said same carrier frequency, said same time slot and said training sequences to one remote station.

68. The apparatus according to claim 63, further comprising means for selecting said same time slot according to criteria comprising: said same time slot is used by a remote station having a distance from a base station similar to said distance from said base station to said a new said remote station using said same time slot.

69. The apparatus according to claim 63, further comprising means for selecting said same time slot 412 according to criteria comprising: a power level received at a remote station already using said time slot is within 10 dB of said new remote station using said time slot if both of said remote stations are DARP capable.

70. The apparatus according to claim 63, wherein a non-DARP capable remote station has a desired signal ≦10 dB higher than said DARP capable remote station's desired signal.

71. A computer program product, comprising:
a computer-readable storage medium comprising:
code for causing a computer to produce first and second signals which share a channel, comprising instructions to:
generate a first data and a second data;
generate a first training sequence and a second training sequence;
combine the first training sequence with the first data to produce a first combined data;
combine the second training sequence with the second data to produce a second combined data;
modulate and transmit both said first combined data and said second combined data using a same channel frequency and a same time slot to produce first and second transmitted signals, and
use both said training sequences in the same time slot on the same channel frequency by one base station.

72. A computer program product, comprising:
a computer-readable storage medium comprising:
code for causing a computer to share signals on a single channel, comprising instructions to:
set up a new connection;
select a used time slot for said new connection to share with an existing connection;
select a different training sequence code for said new connection from said existing connection's training sequence; and
use both said training sequences in the same time slot on a same channel frequency by one base station.

73. A method to share signals on a single channel; comprising:
    setting up a new connection with a communication device;
    selecting, with a processor, a used time slot on a channel frequency for said new connection to share with an existing connection;
    selecting, with a processor, a different training sequence for said new connection from said existing connection's training sequence, wherein a cross-correlation ratio between the different training sequence and the existing connection's training sequence is low; and
    using both said training sequences in the same time slot on the same channel frequency by one base station.

74. The method according to claim 73, wherein said different training sequence has said cross-correlation ratio of between 2/16 and 4/16 when correlated against the existing connection's training sequence.

75. The method according to claim 73, wherein said different training sequence is complementary to said existing connection's training sequence.

76. The method according to claim 73, wherein said existing connection's training sequence comprises a set of said training sequences comprising: 00100 1011100001000100 10111, 00101 1011101111000101 10111, 01000 0111011101001000 01110, 01000 1111011010001000 11110, 00011 0101110010000011 01011, 01001 1101011000001001 11010, and 10100 1111101100010100 11111.

77. The method according to claim 76, wherein said different connection training sequence comprises said set of said training sequences complementary to said existing connection's training sequence comprising: 01111 1100110101001111 11001, 01100 1111110010101100 11111, 01110 1101111010001110 11011, 01101 1110100011101101 11101, 11110 1101110001011110 11011, 01010 1100111111001010 11001, 01101 1100101000001101 11001, and 11100 1101010011111100 11010.

78. The method according to claim 76, wherein said different training sequence comprises said set of said training sequences complementary to said existing connection's sequence comprising: 01111 1100110101001111 11001, 01101 1100010111101101 11000, 00101 1110110111000101 11101, 11110 1101110001011110 11011, 01100 1111110010101100 11111, 01010 0000110111001010 00001, 01000 0101110001001000 01011 and 11100 1011111011111100 10111.

79. The method according to claim 73, wherein said different connection's training sequence comprises said set of said training sequences comprising: 01111 1100110101001111 11001, 01100 1111110010101100 11111, 01110 1101111010001110 11011, 01101 1110100011101101 11101, 11110 1101110001011110 11011, 01010 1100111111001010 11001, 01101 1100101000001101 11001, and 11100 1101010011111100 11010.

80. The method according to claim 73, wherein said different training sequence comprises said set of said training sequences comprising: 01111 1100110101001111 11001, 01101 1100010111101101 11000, 00101 1110110111000101 11101, 11110 1101110001011110 11011, 01100 1111110010101100 11111, 01010 0000110111001010 00001, 01000 0101110001001000 01011 and 11100 1011111011111100 10111.

81. A method to produce first and second signals which share a channel, the method comprising:
    generating a first data and a second data;
    generating a first training sequence and a second training sequence;
    combining the first training sequence with the first data to produce a first combined data and combining the second training sequence with the second data to produce a second combined data;
    modulating and transmitting both said first combined data and said second data combined data using a same carrier frequency and a same time slot to produce first and second transmitted signals, and
    using both said training sequences in the same time slot on the same carrier frequency by one base station, wherein a cross-correlation ratio between said first training sequence and said second training sequence is low.

82. The method according to claim 81, wherein said second training sequence has said cross-correlation ratio of between 2/16 and 4/16 when correlated against the first training sequence.

83. The method according to claim 81, wherein said second training sequence is complementary to said first training sequence.

84. The method according to claim 81, wherein said first training sequence comprises a set of said training sequences comprising: 00100 1011100001000100 10111, 00101 1011101111000101 10111, 01000 0111011101001000 01110, 01000 1111011010001000 11110, 00011 0101110010000011 01011, 01001 1101011000001001 11010, and 10100 1111101100010100 11111.

85. The method according to claim 84, wherein said second training sequence code comprises said set of said training sequences complementary to said first training sequence code comprising: 01111 1100110101001111 11001, 01100 1111110010101100 11111, 01110 1101111010001110 11011, 01101 1110100011101101 11101, 11110 1101110001011110 11011, 01010 1100111111001010 11001, 01101 1100101000001101 11001, and 11100 1101010011111100 11010.

86. The method according to claim 84, wherein said second training sequence code comprises said set of said training sequences complementary to said first sequence code comprising: 01111 1100110101001111 11001, 01101 1100010111101101 11000, 00101 1110110111000101 11101, 11110 1101110001011110 11011, 01100 1111110010101100 11111, 01010 0000110111001010 00001, 01000 0101110001001000 01011 and 11100 1011111011111100 10111.

87. The method according to claim 81, wherein said second training sequence comprises said set of said training sequences comprising: 01111 1100110101001111 11001, 01100 1111110010101100 11111, 01110 1101111010001110 11011, 01101 1110100011101101 11101, 11110 1101110001011110 11011, 01010 1100111111001010 11001, 01101 1100101000001101 11001, and 11100 1101010011111100 11010.

88. The method according to claim 81, wherein said second training sequence comprises said set of said training sequences comprising: 01111 1100110101001111 11001, 01101 1100010111101101 11000, 00101 1110110111000101 11101, 11110 1101110001011110 11011, 01100 1111110010101100 11111, 01010 0000110111001010 00001, 01000 0101110001001000 01011 and 11100 1011111011111100 10111.

89. A base station controller, comprising:
- a controller processor;
- a memory subsystem
- a data bus operably connected between said controller processor and said memory, wherein said controller processor communicates via said data bus with said memory subsystem to send and receive values for parameters to and from said memory subsystem; and
- software stored in said memory subsystem, wherein said memory subsystem comprises at least one table of data, wherein said data comprises values of a parameter for at least one set of remote stations, values of training sequence, values of time slot number, and values of channel frequency, wherein said values of training sequence comprise a first training sequence and a second training sequence with a cross-correlation ratio which is low.

90. The base station controller according to claim 89, wherein said software comprises instructions to produce first and second signals which share a channel, said instructions, when executed by a processor, perform operations to:
- generate a first data and a second data;
- generate said first training sequence and said second training sequence;
- combine the first training sequence with the first data to produce a first combined data;
- combine the second training sequence with the second data to produce a second combined data;
- modulate and transmit both said first combined data and said second data combined data using the same channel frequency and a same time slot to produce first and second transmitted signals, and
- use both said training sequences in the same time slot on the same channel frequency by one base station.

91. The base station controller according to claim 89, wherein said software comprises instructions to share signals on a single channel, said instructions, when executed by a processor, perform operations to:
- set up a new connection;
- select a used time slot for said new connection to share with an existing connection;
- select said second training sequence for said new connection from said first training sequence; and
- use both said training sequences in the same time slot on the same channel frequency by one base station.

92. The base station controller according to claim 89, further comprising
- a plurality of data sources; whereby a plurality of data is generated;
- at least one sequence generator having a plurality of outputs;
- a plurality of combiners, each having a plurality of inputs and at least one output, wherein a first of said inputs is operably connected to one of said outputs of one of said data sources and a second of said inputs is operably connected to one of said outputs of said sequence generator, whereby at least one training sequence is combined with at least one data to produce at least one combined data; and
- a transmitter modulator having a plurality of inputs and at least one output.

93. The base station controller according to claim 89, wherein said second training sequence has said cross-correlation ratio of between 2/16 and 4/16 when correlated against said first training sequence.

94. The base station controller according to claim 89, wherein said second training sequence is complementary to said first training sequence.

95. The base station controller according to claim 89, wherein said first training sequence comprises a set of said training sequences comprising: 00100 10111000010001000 10111, 00101 1011101111000101 10111, 01000 0111011101001000 01110, 01000 1111011010001000 11110, 00011 0101110010000011 01011, 01001 1101011000001001 11010, and 10100 1111101100010100 11111.

96. The base station controller according to claim 95, wherein said second training sequence comprises said set of said training sequences complementary to said first training sequence comprising: 01111 1100110101001111 11001, 01100 1111110010101100 11111, 01110 1101111010001110 11011, 01101 1110100011101101 11101, 11110 1101110001011110 11011, 01010 1100111111001010 11001, 01101 1100101000001101 11001, and 11100 1101010011111100 11010.

97. The base station controller according to claim 95, wherein said second training sequence comprises said set of said training sequences complementary to said first training sequence comprising: 01111 1100110101001111 11001, 01101 1100010111101101 11000, 00101 1110110111000101 11101, 11110 1101110001011110 11011, 01100 1111110010101100 11111, 01010 0000110111001010 00001, 01000 0101110001001000 01011 and 11100 1011111011111100 10111.

98. The base station controller according to claim 89, wherein said second training sequence comprises a set of said training sequences comprising: 01111 1100110101001111 11001, 01100 1111110010101100 11111, 01110 1101111010001110 11011, 01101 1110100011101101 11101, 11110 1101110001011110 11011, 01010 1100111111001010 11001, 01101 1100101000001101 11001, and 11100 1101010011111100 11010.

99. The base station controller according to claim 89, wherein said second training sequence comprises a set of said training sequences comprising: 01111 1100110101001111 11001, 01101 1100010111101101 11000, 00101 1110110111000101 11101, 11110 1101110001011110 11011, 01100 1111110010101100 11111, 01010 0000110111001010 00001, 01000 0101110001001000 01011 and 11100 1011111011111100 10111.

100. A base station, comprising:
- a controller processor;
- an antenna;
- a duplexer switch operably connected to said base station antenna;
- a receiver front end operably connected to said duplexer switch which conditions the signal (for example by means of down-converting, filtering, and amplifying;
- a receiver demodulator operably connected to said receiver front end demodulates the conditioned signal and outputs the demodulated signal to
- a channel decoder and de-interleaver operably connected to said receiver demodulator and said controller processor;
- a base station controller interface operably connected to said controller processor;
- a coder and interleaver operably connected to said controller processor;
- a transmitter modulator operably connected to said coder and interleaver;

a transmitter front end module operably connected to said transmitter modulator and operably connected to said duplexer switch;

a data bus operably connected between said controller processor and said channel decoder and de-interleaver, said receiver demodulator, said receiver front end, said transmitter modulator and said transmitter front end; and software stored in said memory, wherein said memory comprises at least one table of data, wherein said data comprises values of a parameter for at least one set of remote stations, values of training sequence, values of time slot number, and values of channel frequency, wherein said values of training sequence comprise a first training sequence and a second training sequence with a cross-correlation ratio which is low.

101. The base station according to claim 100, wherein said software comprises instructions to produce first and second signals which share a channel, said instructions, when executed by a processor, perform operations to:
generate a first data and a second data;
generate said first training sequence and said second training sequence;
combine the first training sequence with the first data to produce a first combined data;
combine the second training sequence with the second data to produce a second combined data;
modulate and transmit both said first combined data and said second data combined data using a same carrier frequency and a same time slot to produce first and second transmitted signals, and
use both said training sequences in the same time slot on the same channel frequency by one base station.

102. The base station according to claim 100, wherein said software comprises instructions to share signals on a single channel; comprising:
set up a new connection;
select a used time slot for said new connection to share with an existing connection;
select said second training sequence code for said new connection; and
use both said training sequences in the same time slot on the same channel frequency by one base station.

103. The base station according to claim 100, further comprising:
a plurality of data sources; whereby a plurality of data is generated;
at least one sequence generator having a plurality of outputs;
a plurality of combiners, each having a plurality of inputs and at least one output, wherein a first of said inputs is operably connected to one of said outputs of one of said data sources and a second of said inputs is operably connected to one of said outputs of said sequence generator, whereby at least one training sequence is combined with at least one data to produce at least one combined data; and
a transmitter modulator having a plurality of inputs and at least one output.

104. The base station according to claim 100, wherein said second training sequence has said cross-correlation ratio of between 2/16 and 4/16 when correlated against said first training sequence.

105. The base station according to claim 100, wherein said second training sequence is complementary to said first training sequence.

106. The base station according to claim 100, wherein said first training sequence comprises a set of said training sequences comprising: 00100 1011100001000100 10111, 00101 1011101111000101 10111, 01000 0111011101001000 01110, 01000 1111011010001000 11110, 00011 0101110010000011 01011, 01001 1101011000001001 11010, and 10100 1111101100010100 11111.

107. The base station according to claim 106, wherein said second training sequence comprises said set of said training sequences complementary to said first training sequence comprising: 01111 1100110101001111 11001, 01100 1111110010101100 11111, 01110 1101111010001110 11011, 01101 1110100011101101 11101, 11110 1101110001011110 11011, 01010 1100111111001010 11001, 01101 1100101000001101 11001, and 11100 1101010011111100 11010.

108. The base station according to claim 106, wherein said second training sequence comprises said set of said training sequences complementary to said first training sequence comprising: 01111 1100110101001111 11001, 01101 1100010111101101 11000, 00101 1110110111000101 11101, 11110 1101110001011110 11011, 01100 1111110010101100 11111, 01010 0000110111001010 00001, 01000 0101110001001000 01011 and 11100 1011111011111100 10111.

109. The base station according to claim 100, wherein said second training sequence comprises a set of said training sequences comprising: 01111 1100110101001111 11001, 01100 1111110010101100 11111, 01110 1101111010001110 11011, 01101 1110100011101101 11101, 11110 1101110001011110 11011, 01010 1100111111001010 11001, 01101 1100101000001101 11001, and 11100 1101010011111100 11010.

110. The base station according to claim 100, wherein said second training sequence comprises a set of said training sequences comprising: 01111 1100110101001111 11001, 01101 1100010111101101 11000, 00101 1110110111000101 11101, 11110 1101110001011110 11011, 01100 1111110010101100 11111, 01010 0000110111001010 00001, 01000 0101110001001000 01011 and 11100 1011111011111100 10111.

111. An apparatus to produce first and second signals sharing a channel, comprising:
a plurality of data sources; whereby a plurality of data is generated;
at least one sequence generator having a plurality of outputs, whereby a plurality of training sequences is generated, wherein said plurality of training sequences comprise a first training sequence and a second training sequence with a cross-correlation ratio which is low;
a plurality of combiners, each having a plurality of inputs and at least one output, wherein a first of said inputs is operably connected to one of said outputs of one of said data sources and a second of said inputs is operably connected to one of said outputs of said sequence generator, whereby at least one training sequence is combined with at least one data to produce at least one combined data; and
a transmitter modulator having a plurality of inputs and at least one output.

112. The apparatus according to claim 111, wherein said second training sequence has said cross-correlation ratio of between 2/16 and 4/16 when correlated against said first training sequence.

113. The apparatus according to claim 111, wherein said second training sequence is complementary to said first training sequence.

114. The apparatus according to claim 111, wherein said first training sequence comprises a set of said training sequences comprising: 00100 1011100001000100 10111, 00101 1011101111000101 10111, 01000 0111011101001000 01110, 01000 1111011010001000 11110, 00011 0101110010000011 01011, 01001 1101011000001001 11010, and 10100 1111101100010100 11111.

115. The apparatus according to claim 114, wherein said second training sequence comprises said set of said training sequences complementary to said first training sequence comprising: 01111 1100110101001111 11001, 01100 1111110010101100 11111, 01110 1101111010001110 11011, 01101 1110100011101101 11101, 11110 1101110001011110 11011, 01010 1100111111001010 11001, 01101 1100101000001101 11001, and 11100 1101010011111100 11010.

116. The apparatus according to claim 114, wherein said second training sequence comprises said set of said training sequences complementary to said first training sequence comprising: 01111 1100110101001111 11001, 01101 1100010111101101 11000, 00101 1110110111000101 11101, 11110 1101110001011110 11011, 01100 1111110010101100 11111, 01010 0000110111001010 00001, 01000 0101110001001000 01011 and 11100 1011111011111100 10111.

117. The apparatus according to claim 111, wherein said second training sequence comprises a set of said training sequences comprising: 01111 1100110101001111 11001, 01100 1111110010101100 11111, 01110 1101111010001110 11011, 01101 1110100011101101 11101, 11110 1101110001011110 11011, 01010 1100111111001010 11001, 01101 1100101000001101 11001, and 11100 1101010011111100 11010.

118. The apparatus according to claim 111, wherein said second training sequence comprises a set of said training sequences comprising: 01111 1100110101001111 11001, 01101 1100010111101101 11000, 00101 1110110111000101 11101, 11110 1101110001011110 11011, 01100 1111110010101100 11111, 01010 0000110111001010 00001, 01000 0101110001001000 01011 and 11100 1011111011111100 10111.

119. An apparatus for sharing signals on a single channel; comprising:
processing means for setting up a new connection;
processing means for selecting a used time slot on a channel frequency for said new connection to share with an existing connection;
processing means for selecting a different training sequence for said new connection from said existing connection's training sequence, wherein a cross-correlation ratio between the different training sequence and the existing connection's training sequence is low; and
processing means for using both said training sequences in the same time slot on the same channel frequency by one base station.

120. The apparatus according to claim 119, wherein said different training sequence has said cross-correlation ratio of between 2/16 and 4/16 when correlated against the existing connection's training sequence.

121. The apparatus according to claim 119, wherein said different training sequence is complementary to said existing connection's training sequence code.

122. The apparatus according to claim 119, wherein said existing connection's training sequence comprises a set of said training sequences comprising: 00100 1011100001000100 10111, 00101 1011101111000101 10111, 01000 0111011101001000 01110, 01000 1111011010001000 11110, 00011 0101110010000011 01011, 01001 1101011000001001 11010, and 10100 1111101100010100 11111.

123. The apparatus according to claim 122, wherein said different connection training sequence comprises said set of said training sequences complementary to said existing connection's training sequence code comprising: 01111 1100110101001111 11001, 01100 1111110010101100 11111, 01110 1101111010001110 11011, 01101 1110100011101101 11101, 11110 1101110001011110 11011, 01010 1100111111001010 11001, 01101 1100101000001101 11001, and 11100 1101010011111100 11010.

124. The apparatus according to claim 122, wherein said different training sequence comprises said set of said training sequences complementary to said existing connection's sequence comprising: 01111 1100110101001111 11001, 01101 1100010111101101 11000, 00101 1110110111000101 11101, 11110 1101110001011110 11011, 01100 1111110010101100 11111, 01010 0000110111001010 00001, 01000 0101110001001000 01011 and 11100 1011111011111100 10111.

125. The apparatus according to claim 119, wherein said different connection training sequence comprises said set of said training sequences comprising: 01111 1100110101001111 11001, 01100 1111110010101100 11111, 01110 1101111010001110 11011, 01101 1110100011101101 11101, 11110 1101110001011110 11011, 01010 1100111111001010 11001, 01101 1100101000001101 11001, and 11100 1101010011111100 11010.

126. The apparatus according to claim 119, wherein said different training sequence comprises said set of said training sequences comprising: 01111 1100110101001111 11001, 01101 1100010111101101 11000, 00101 1110110111000101 11101, 11110 1101110001011110 11011, 01100 1111110010101100 11111, 01010 0000110111001010 00001, 01000 0101110001001000 01011 and 11100 1011111011111100 10111.

127. An apparatus for producing first and second signals which share a channel, comprising:
means for generating a first data and a second data;
means for generating a first training sequence and a second training sequence;
means for combining the first training sequence with the first data to produce a first combined data;
means for combining the second training sequence with the second data to produce a second combined data;
means for modulating and transmitting both said first combined data and said second data combined data using a same carrier frequency and a same time slot to produce first and second transmitted signals, and
means for using both said training sequence in the same time slot on the same carrier frequency in a same cell by one base station, wherein a cross-correlation ratio between said first training sequence and said second training sequence is low.

128. The apparatus according to claim 127, wherein said second training sequence has said cross-correlation ratio of between 2/16 and 4/16 when correlated against the first training sequence.

129. The apparatus according to claim 127, wherein said second training sequence is complementary to said first training sequence.

130. The apparatus according to claim 127, wherein said first training sequence comprises a set of said training sequences comprising: 00100 1011100001000100 10111, 00101 1011101111000101 10111, 01000 0111011101001000 01110, 01000 1111011010001000 11110, 00011 0101110010000011 01011, 01001 1101011000001001 11010, and 10100 1111101100010100 11111.

131. The apparatus according to claim 130, wherein said second training sequence comprises said set of said training sequences complementary to said first training sequence comprising: 01111 1100110101001111 11001, 01100 1111110010101100 11111, 01110 1101111010001110 11011, 01101 1110100011101101 11101, 11110 1101110001011110 11011, 01010 1100111111001010 11001, 01101 1100101000001101 11001, and 11100 1101010011111100 11010.

132. The apparatus according to claim 130, wherein said second training sequence comprises said set of said training sequences complementary to said first sequence comprising: 01111 1100110101001111 11001, 01101 1100010111101101 11000, 00101 1110110111000101 11101, 11110 1101110001011110 11011, 01100 1111110010101100 11111, 01010 0000110111001010 00001, 01000 0101110001001000 01011 and 11100 1011111011111100 10111.

133. The apparatus according to claim 127, wherein said second training sequence comprises said set of said training sequences comprising: 01111 1100110101001111 11001, 01100 1111110010101100 11111, 01110 1101111010001110 11011, 01101 1110100011101101 11101, 11110 1101110001011110 11011, 01010 1100111111001010 11001, 01101 1100101000001101 11001, and 11100 1101010011111100 11010.

134. The apparatus according to claim 127, wherein said second training sequence comprises said set of said training sequences comprising: 01111 1100110101001111 11001, 01101 1100010111101101 11000, 00101 1110110111000101 11101, 11110 1101110001011110 11011, 01100 1111110010101100 11111, 01010 0000110111001010 00001, 01000 0101110001001000 01011 and 11100 1011111011111100 10111.

135. A computer program product, comprising:
a computer-readable storage medium comprising:
code for causing a computer to produce first and second signals which share a channel, comprising instructions to:
generate a first data and a second data;
generate a first training sequence and a second training sequence;
combine the first training sequence with the first data to produce a first combined data;
combine the second training sequence with the second data to produce a second combined data;
modulate and transmit both said first combined data and said second data combined data using a same channel frequency and a same time slot to produce first and second transmitted signals, and
use both said training sequences in the same time slot on the same channel frequency by one base station, wherein a cross-correlation ratio between said first training sequence and said second training sequence is low.

136. A computer program product, comprising:
a computer-readable storage medium comprising:
code for causing a computer to share signals on a single channel, comprising instructions to:
set up a new connection;
select a used time slot on a channel frequency for said new connection to share with an existing connection;
select a different training sequence code for said new connection from said existing connection's training sequence code, wherein a cross-correlation ratio between the different training sequence code and the existing connection's training sequence code is low; and
use both said training sequences in the same time slot on the same channel frequency by one base station.

137. A communications device comprising: a processor configured to:
set up a first connection for communicating with a communication device;
select a time slot on a channel frequency for the first connection to share with a second connection;
select a first training sequence for said first connection, the first training sequence being different than a second training sequence associated with the second connection; and
use the first and second training sequences in the same time slot on the same channel frequency.

138. The communications device of claim 137, further comprising at least one antenna module configured to receive or transmit wireless signals, the antenna module operatively coupled to the processor.

139. The communications device of claim 137, wherein the first training sequence has a cross-correlation ratio between 2/16 and 4/16 relative to the second training sequence.

140. The communications device of claim 137, wherein the first training sequence is complimentary to the second training sequence.

141. The communications device of claim 137, further comprising at least one sequence generator to generate the first and second training sequences.

142. The communications device of claim 137, wherein the processor is further configured to allocate a new time slot if there is an unused time slot on the channel frequency; and wherein the used time slot for said new connection to share with an existing connection is selected if there is not an unused time slot on the channel frequency.

143. The communications device of claim 137, wherein the device is configured to phase shift symbols of the first connection with respect to said second connection.

144. The communications device of claim 137, being either a base station or a base station controller.

145. In a communication system comprising one or more devices configured for wireless communication, a communication device comprising:
a memory for storing a first training sequence;
a receiver configured to receive data from another communication device, the data comprising at least two training sequences, a second training sequence and a third training sequence; and
a processor configured to compare the first training sequence to the received second and third training sequences, to select data that is associated with a training sequence that matches the first training sequence, and to reject data associated with a training sequence that does not match the first training sequence.

146. The communications device of claim 145, further comprising a sequence generator configured to generate the first training sequence.

147. The communications device of claim 145, further comprising an equalizer configured to determine how at least one of the received training sequences is affected by channel conditions.

148. The communications device of claim 145, wherein the communications device is configured to communicate that the communications device supports sets of training sequences.

149. The communications device of claim 145, wherein the communications device is configured to communicate with at least one of a base station or a base station controller.

150. The communications device of claim 145, further comprising an antenna configured to transmit and receive data from other communication devices.

151. The communications device of claim 145, wherein the communications device is configured to communicate with multiple base stations simultaneously.

152. The communications device of claim 145, wherein the first training sequence is uniquely assigned to the communications device.

153. The communications device of claim 145, wherein the communications device is configured to use the same channel and time slot as another communications device for communication.

154. The communications device of claim 145, wherein the communications device is configured to request channel access for communication.

155. The communications device of claim 145, wherein the first training sequence is an orthogonal training sequence.

* * * * *